US006950827B2

(12) United States Patent
Jung

(10) Patent No.: US 6,950,827 B2
(45) Date of Patent: Sep. 27, 2005

(54) METHODS, APPARATUS AND DATA STRUCTURES FOR PROVIDING A UNIFORM REPRESENTATION OF VARIOUS TYPES OF INFORMATION

(75) Inventor: Edward K. Jung, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 10/365,781

(22) Filed: Feb. 13, 2003

(65) Prior Publication Data

US 2003/0126151 A1 Jul. 3, 2003

Related U.S. Application Data

(62) Division of application No. 09/325,166, filed on Jun. 3, 1999, now Pat. No. 6,539,374.

(51) Int. Cl.[7] ............................................. G06F 17/30
(52) U.S. Cl. ......................................... 707/102; 707/3
(58) Field of Search .................... 707/1–10, 100–104.1, 707/200–205

(56) References Cited

U.S. PATENT DOCUMENTS

| | | | | |
|---|---|---|---|---|
| 3,997,880 A | * | 12/1976 | Chen et al. ..................... | 707/7 |
| 5,511,197 A | | 4/1996 | Hill et al. ..................... | 709/328 |
| 5,581,760 A | | 12/1996 | Atkinson et al. ........... | 717/108 |
| 5,682,536 A | | 10/1997 | Atkinson et al. ........... | 717/165 |
| 5,689,703 A | | 11/1997 | Atkinson et al. ........ | 707/103 R |
| 5,710,925 A | | 1/1998 | Leach et al. ................ | 709/316 |
| 5,724,588 A | | 3/1998 | Hill et al. ..................... | 709/328 |
| 5,740,439 A | | 4/1998 | Atkinson et al. ........... | 709/320 |
| 5,745,764 A | | 4/1998 | Leach et al. ................ | 709/316 |
| 5,970,490 A | * | 10/1999 | Morgenstern ................ | 707/10 |
| 6,052,691 A | | 4/2000 | Ardoin et al. .............. | 707/102 |
| 6,067,548 A | | 5/2000 | Cheng ........................ | 707/103 |

OTHER PUBLICATIONS

Peter Pin–Shan Chen, "The Entity–Relationship Model—Toward a Unified View of Data", *ACM Transactions on Database Systems*, vol. 1, No. 1, Mar. 9, 1976, (© 1976, Association for Computing Machinery, Inc.), pps. 9–36 (reprinted as pps. 741–754).

W3C User Interface Domain, "Document Object Model (DOM)", downloaded on Sep. 18, 1998 from http://www.w3org/DOM/, pps. 1–2.

W3C, WD–rdf–schema–19980819, "Resource Description Framework (RDF) Model and Syntax Specification", W3C Working Draft Aug. 19, 1998, downloaded on Sep. 18, 1998, from http://www.w3org/TR/WD–rdf–syntax/, pps. 1–35.

W3C, WD–rdf–schema–19980814, "Resource Description Framework (RDF) Schema Specification" W3C Working Draft Aug. 14, 1998, downloaded on Sep. 18, 1998 from http://www.w3org/TR/WD–rdf–schema/, pps. 1–18.

W3C, WD–DOM–19980720, "Level 1 Document Object Model Specification", Version 1.0, W3C Working Draft Jul. 20, 1998, downloaded on Sep. 18, 1998 from http://www.w3.org/TR/WD–DOM/, pps. 1–3.

J. Robie, "What is the Document Object Model?", downloaded on Sep. 18, 1998 from http://www.w3org/TR/WD-DOM/introduction.html, pps. 1–4.

\* cited by examiner

*Primary Examiner*—Mohammad Ali
(74) *Attorney, Agent, or Firm*—Westman, Champlin & Kelly, P.A.

(57) ABSTRACT

Methods and apparatus for analyzing tasks performed by computer users by (i) gathering usage data, (ii) converting logged usage data into a uniform format, (iii) determining or defining task boundaries, and (iv) determining a task analysis model by "clustering" similar tasks together. The task analysis model may be used to (i) help users complete a task (such help, for example, may be in the form of a gratuitous help function), and/or (ii) to target marketing information to users based on user inputs and the task analysis model. The present invention also provides a uniform semantic network for representing different types of objects in a uniform way.

32 Claims, 46 Drawing Sheets

|  | TASK/CLUSTER | | | | |
|---|---|---|---|---|---|
| | | 1 | 2 | 3 | 4 | 5 |
| TASK/ CLUSTER | 1 | * | - | - | - | - |
| | 2 | 2.0 | * | - | - | - |
| | 3 | 7.0 | 1.0 | * | - | - |
| | 4 | 0.5 | 1.0 | 2.0 | * | - |
| | 5 | 3.0 | 8.0 | 7.0 | 5.0 | * |

|  | TASK/CLUSTER | | | |
|---|---|---|---|---|
| | | 1,4 | 2 | 3 | 5 |
| TASK/ CLUSTER | 1,4 | * | - | - | - |
| | 2 | 2.0 | * | - | - |
| | 3 | 7.0 | 1.0 | * | - |
| | 5 | 6.0 | 8.0 | 7.0 | * |

|  | TASK/CLUSTER | | |
|---|---|---|---|
| | | 1,4 | 2,3 | 5 |
| TASK/ CLUSTER | 1,4 | * | - | - |
| | 2,3 | 7.0 | * | - |
| | 5 | 6.0 | 8.0 | * |

|  | TASK/CLUSTER | |
|---|---|---|
| | | 1,4,5 | 2,3 |
| TASK/ CLUSTER | 1,4,5 | * | - |
| | 2,3 | 8.0 | * |

Mary ate the tasty cake.

Mary ate the tasty cake.

event(v) ^ contains(v, cake(c)^eat(e)^agent(e, Mary)^patient(e, c)^attribute(c, tasty)) ^ time-of(v, PAST)

3410

3450

| Name | Age | Extension |
|------|-----|-----------|
| John | 21 | 8272 |
| Jane | 32 | 7293 |

3510 one, two, three

3600

3710

3750

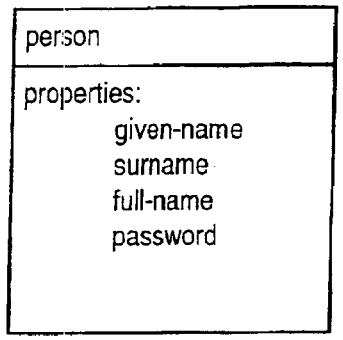
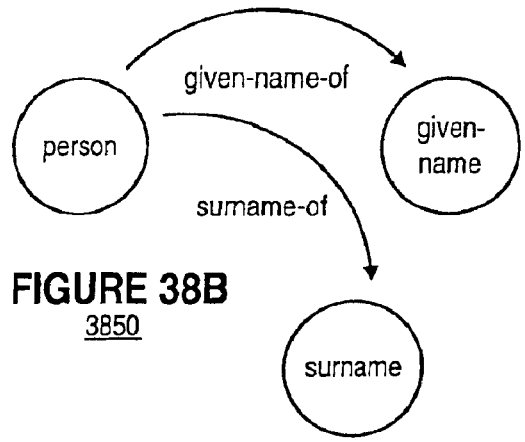
FIGURE 38A
3800
FIGURE 38B
3850
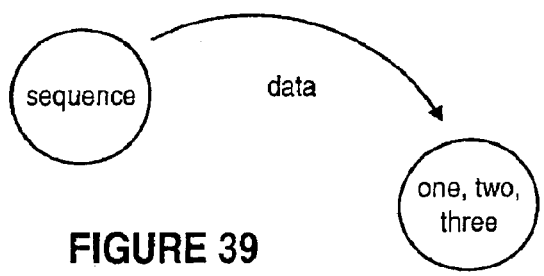
FIGURE 39
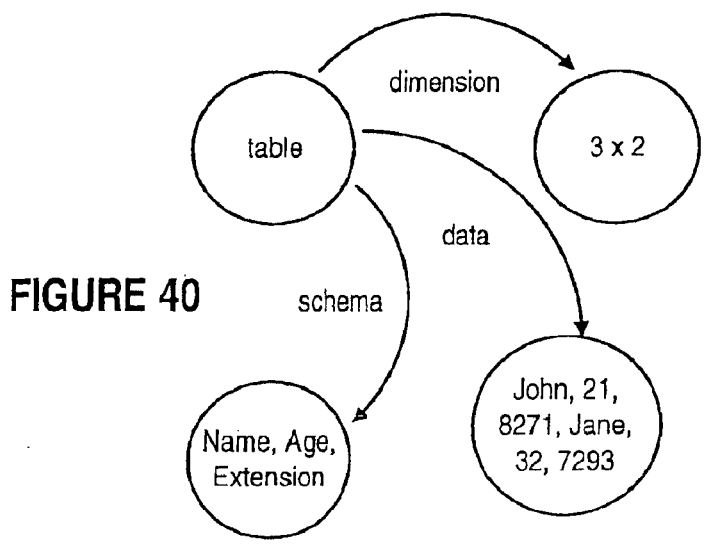
FIGURE 40 max(a, b) : if a>=b (a) else (b)
age(p, a) : a = now() - p.birthday
<u>4110</u>   <u>4120</u>
FIGURE 41
husband(x) ^ person(x) ^ equals(sex(x), male)
<u>4130</u>
FIGURE 42A
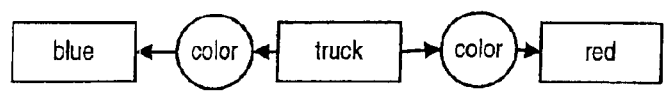
the truck is blue
the truck is red
FIGURE 42B
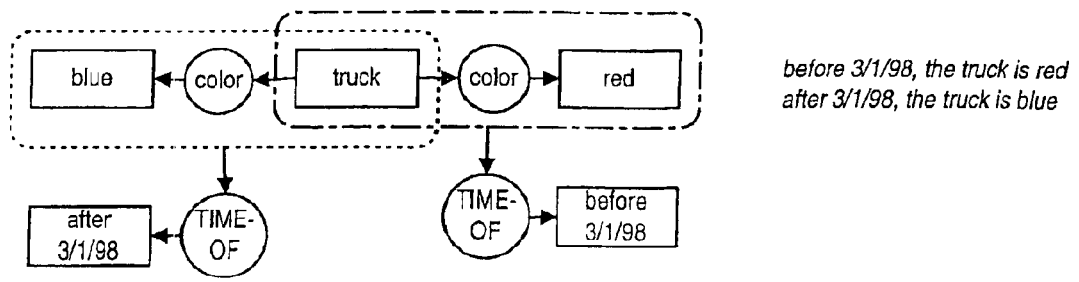
before 3/1/98, the truck is red
after 3/1/98, the truck is blue

METHODS, APPARATUS AND DATA STRUCTURES FOR PROVIDING A UNIFORM REPRESENTATION OF VARIOUS TYPES OF INFORMATION

The present application is a divisional of and claims priority of U.S. patent application Ser. No. 09/325,166, filed Jun. 3, 1999, now U.S. Pat. No. 6,539,374, the content of which is hereby incorporated by reference in its entirety.

[§] 1. BACKGROUND OF THE INVENTION

[§] 1.1 Field of the Invention

The present invention concerns analyzing computer-based tasks to (i) define and infer tasks and end goals from usage data, (ii) cluster similar tasks together, (iii) determine probabilities that certain tasks will be performed, (iv) determine the different ways in which users go about completing a given task, (v) use models of clustered tasks and probabilities of clustered tasks to help computer users to perform such tasks more effectively and efficiently, and (vi) target marketing information to computer users based on a task being performed. The present invention also concerns providing a uniform semantic network for representing different types of objects (or information) in a uniform way.

[§] 1.2 Related Art

[§] 1.2.1 Task Performance

A task may be defined as a goal achieved by performing a sequence of steps. People often rely on computers to complete tasks. Different computer applications are tailored to help people perform different tasks. For example: a word processing application may be used to generate a letter, generate a food recipe card, or generate a table of contents for a paper; a spreadsheet application may be used to determine an accounts receivable value or determine a taxable income value; a drafting application may be used to generate an organizational chart, prepare a block diagram, or layout a floor plan for a new kitchen; a database or Internet browser application may be used to find crash test results for new cars, get a stock quote, plan an evening out with a diner and a movie, or find an employee's telephone extension.

Computer applications are designed based on predictions of how likely most users will want to perform certain tasks. Special provisions (e.g., toolbars, hierarchical menus, special keyboard keys, etc.) to assist the user in performing such tasks are provided based on assumptions made by the application designer(s). Thus, for example, in the context of a word processing application, a spell checking task may be designed to be easier to perform than a bibliography generating task because it is assumed that users will more likely want to perform a spell check task than a bibliography generation task. Similarly, a keyboard may be provided with an addition ("+") key but not an integration ("∫") key because it is assumed that it is more likely that users will want to include a "+" sign in a document than a "∫" sign in a document. In the context of the browsing contents of an Internet "site" or "website" (i.e., an Internet resource server), a topology of the Internet site may be designed based on expected usage of (e.g., requests for) various resources. Thus, for example, reviews of newly released movies may be easier to request (or navigate to) than reviews of older movies.

Assumptions about what tasks people want to perform and how people intuitively go about performing tasks are reflected in the design of computer applications, the topology of resource servers, such as Internet sites for example, and user interface methods (such as forms and frames) used in interactive applications and resource servers. Unfortunately, once designed, a computer application is relatively fixed. Similarly, the topology of most Internet sites is relatively static. Consequently, computer applications and Internet site topologies are typically only as good as the assumptions which underlay their design. Even if the design of computer application and Internet site topologies are based on well founded assumptions about what types of tasks users will likely want to perform and how they will go about performing such tasks, such assumptions may become stale as people want to perform different tasks.

Moreover, certain tasks will often span various to computer applications. For example, a task may be to generate an annual report. Generating such a report may involve entering text by means of a word processing application, determining financial figures with a spreadsheet application, and generating a block diagram using a drafting application. It is difficult for designers of individual applications to anticipate such inter-application tasks and design their applications accordingly.

In view of the foregoing problems with computer-based tools for performing various tasks, methods and apparatus for analyzing what computer users are doing—more specifically what tasks are being performed by users and how such tasks are being performed—are needed. Moreover, methods and apparatus are needed for using such task analysis to help computer users to effectively perform desired tasks.

[§] 1.2.2 Marketing Information Dissemination

As discussed above, resource servers, such as Internet websites for example, permit people to access a great deal of information. In addition to their function of providing resources to computer users, Internet sites provide a new conduit for disseminating marketing information to people. Often, marketing information is closely related to the resources requested. For example, an Internet resource providing stock quotations may include an advertisement for a stockbroker, or an Internet resource providing sports scores may include an advertisement for a baseball game to be televised. However, such marketing information is related to the characteristics of the Internet resource itself, not to the task being performed by the user requesting the resources. Thus methods and apparatus for providing marketing information relevant to a task being performed are needed.

[§] 1.2.3 Object (or Information) Representation

Computer users may use various types of applications and software services. The applications and software services, in turn, may use different types of stored objects (as information, data, or executable code). For example, some objects, such as relational database structures, XML (Extensible Markup Language), and RDF (Resource Description Framework), for example, may be characterized as "structured objects". More specifically, relational databases are defined by elements structured into rows and columns of tables. XML defines trees based on containment relationships (e.g., an organization contains groups, and each of the groups contains members). Other objects, such as DCOM and JAVA runtime objects for example, may be characterized as "active objects". Active objects may be objects that define methods and/or variables, in the object oriented language sense. Further, techniques are available (See, e.g., U.S. Pat. Nos. 5,740,439, 5,682,536, 5,689,703, and 5,581,760, each of which is incorporated herein by reference) to "expose" machine executable instructions as objects. Still other objects, such as text documents for example, may be characterized as "linear objects." Some objects may have more that one type. For example, HTML (Hyper-Text Markup Language) documents may include linear text, and may include hyper-text links defining a hierarchical structure.

To reiterate, applications and application services are typically tailored to only those underlying object or information type(s) that are relevant to the particular application or application service. Unfortunately, it is not easy to implement inter-application services, such as analyzing tasks discussed above, which user various types of objects. Thus, a uniform representation of various types of objects (or information) would be useful.

[§] 2 SUMMARY OF THE INVENTION

The present invention provides methods and apparatus for analyzing tasks performed by computer users. First, the present invention includes methods and apparatus to gather usage data. That is, when performing tasks, users will interact with the computer and perform a number of steps (i.e., user inputs) in an attempt to complete the task. These steps (user inputs) are logged in a usage log for further analysis. Second, the present invention includes methods, apparatus, and data structures to convert logged usage data into a uniform format. More specifically, objects (e.g., machine executable instructions, various types of database resources, text files, etc.) invoked pursuant to the user inputs may be expressed with a uniform representation. The present invention defines a uniform representation which may be used and provides methods and apparatus for mapping between objects (or information) having a specific type, and the same objects (or information) expressed with the uniform representation. Third, the present invention includes methods and apparatus to determine or define task boundaries. That is, a computer user may interact with a computer to perform a number of tasks during a single session or may perform a single task over a number of sessions. Fourth, the present invention includes methods and apparatus to define task boundaries from the converted (or non-converted, uniform) usage data. Finally, the present invention includes methods and apparatus to generate a task analysis model from the defined tasks. More specifically, the present invention may function to "cluster" similar tasks together. The task model may use a limit on (a) the number of clusters, and/or (b) the distance (i.e., "dissimilarity") between the clusters, when generating the model.

The present invention also includes methods and apparatus which use the task analysis model. First, the present invention includes methods and apparatus for designing application user interfaces such as tool bars, hierarchical menus, gratuitous help, etc. In this instance, probabilities of tasks from the task analysis model may be used to determine what tasks users will likely want to perform. Human design factors, such as how many functions users like on a toolbar or how many levels of menus they like may be used when generating the task analysis model to determine how many clusters the model should have.

The present invention also includes methods and apparatus which use the task analysis model for designing a topology of a resource server, such as an Internet website for example. As was the case with designing application user interfaces, in this instance, probabilities of tasks from the task analysis model may be used to determine what tasks users will likely want to perform. Human design factors, such as how many hyper-text links or query boxes on a single web page users like may be used when determining the topology of the resource server interface.

The present invention also includes methods and apparatus to help users complete a task based on the task analysis model. Such help, for example, may be in the form of a gratuitous help function. Basically, a run-time application will look at steps being performed by the user and determine if such steps "belong to" a task cluster of the task analysis model. If the steps performed by the user appear to "belong to" a task cluster, the user may be provided with gratuitous help. For example, the application may communicate to the user, "It seems that you are trying to generate an annual report. May I help you complete this task?" Alternatively, when it can be established, with a requisite degree of certainty, that the user is trying to perform a particular task, the application may automatically complete that task without further input from the user or the application may guide the user through remaining steps for completing the task in an efficient manner.

Finally, the present invention includes methods and apparatus to target marketing information to users based on user inputs and a task analysis model. For example, the Internet has permitted companies to target marketing information to narrow niches of potential customers. For example, a web page providing stock quotes may advertise a stock broker, a web page providing telephone numbers may advertise a long distance telephone carrier, etc. However, the present invention permits tasks to be more generalized. For example, it may recognize that an Internet user submitting queries for a restaurant in a certain neighborhood may be planning a date including dinner and a movie. Thus, in this case, the present invention might function to provide movie advertisements along with the restaurant information resources.

[§] 3 BRIEF DESCRIPTION OF DRAWINGS

FIGS. 23A through 23D each depict exemplary distance matrix data which is used to illustrate a task clustering process which may be used by the present invention.

Figure 24:
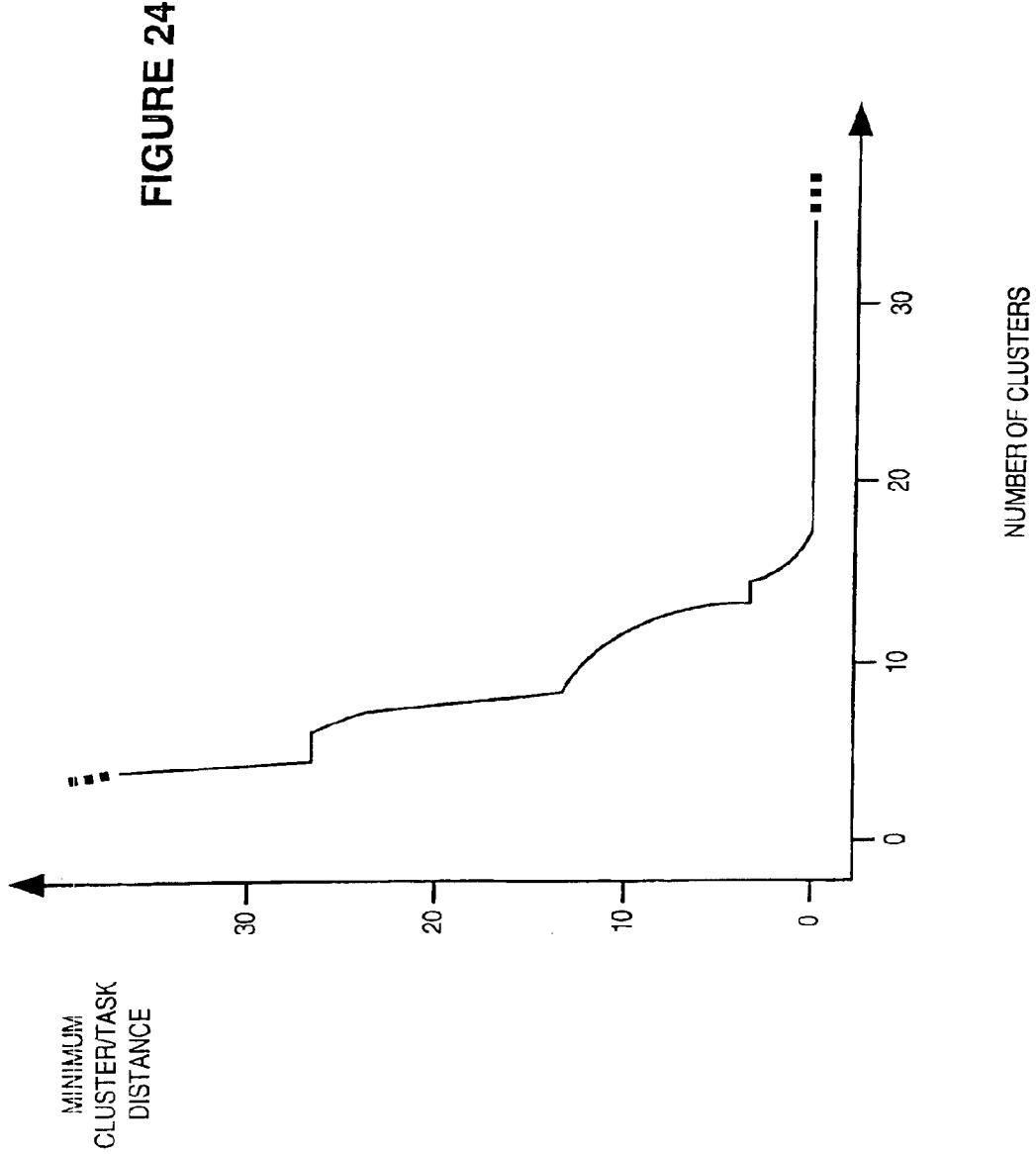

FIG. 24 is a graph of task/cluster distance versus a number of clusters.

Figure 1A:
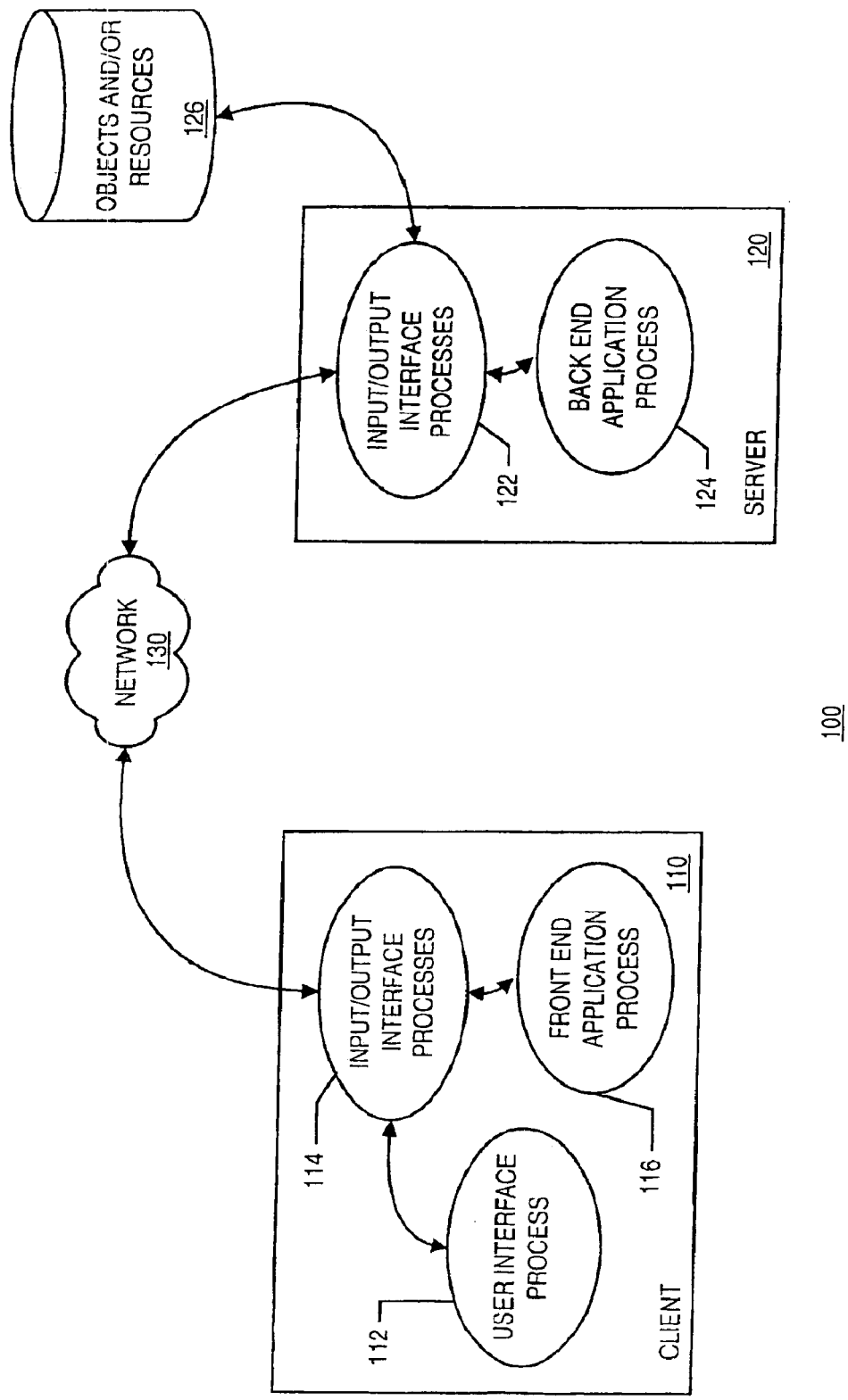
FIG. 1A is diagram of processes of a first exemplary environment in which the present invention may operate.
Figure 25:
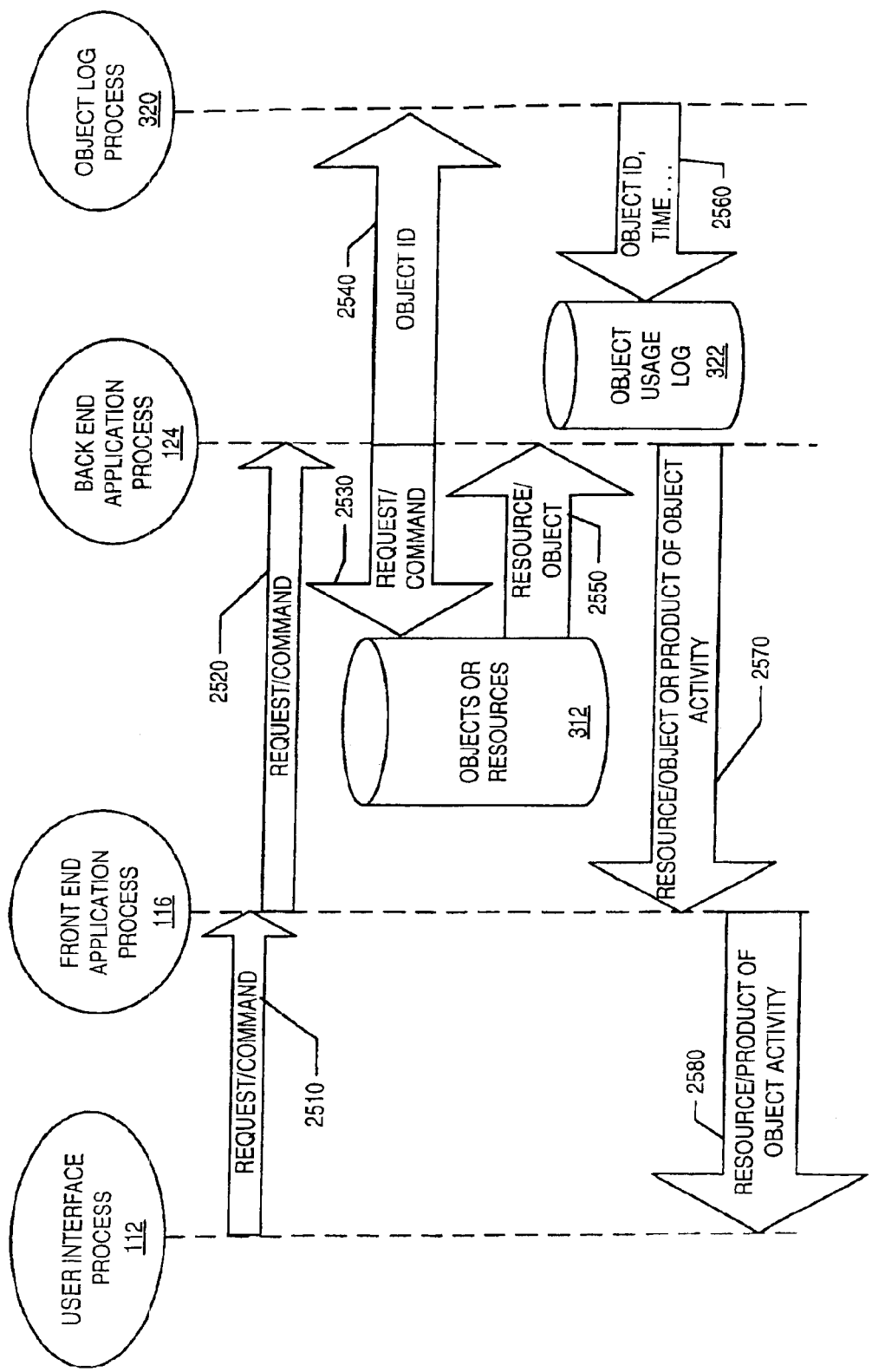

FIG. 25 is a high level messaging diagram depicting inter-process communications which may occur when logging object or resource usage in a client-server environment such as that depicted in FIG. 1A.

Figure 1B:
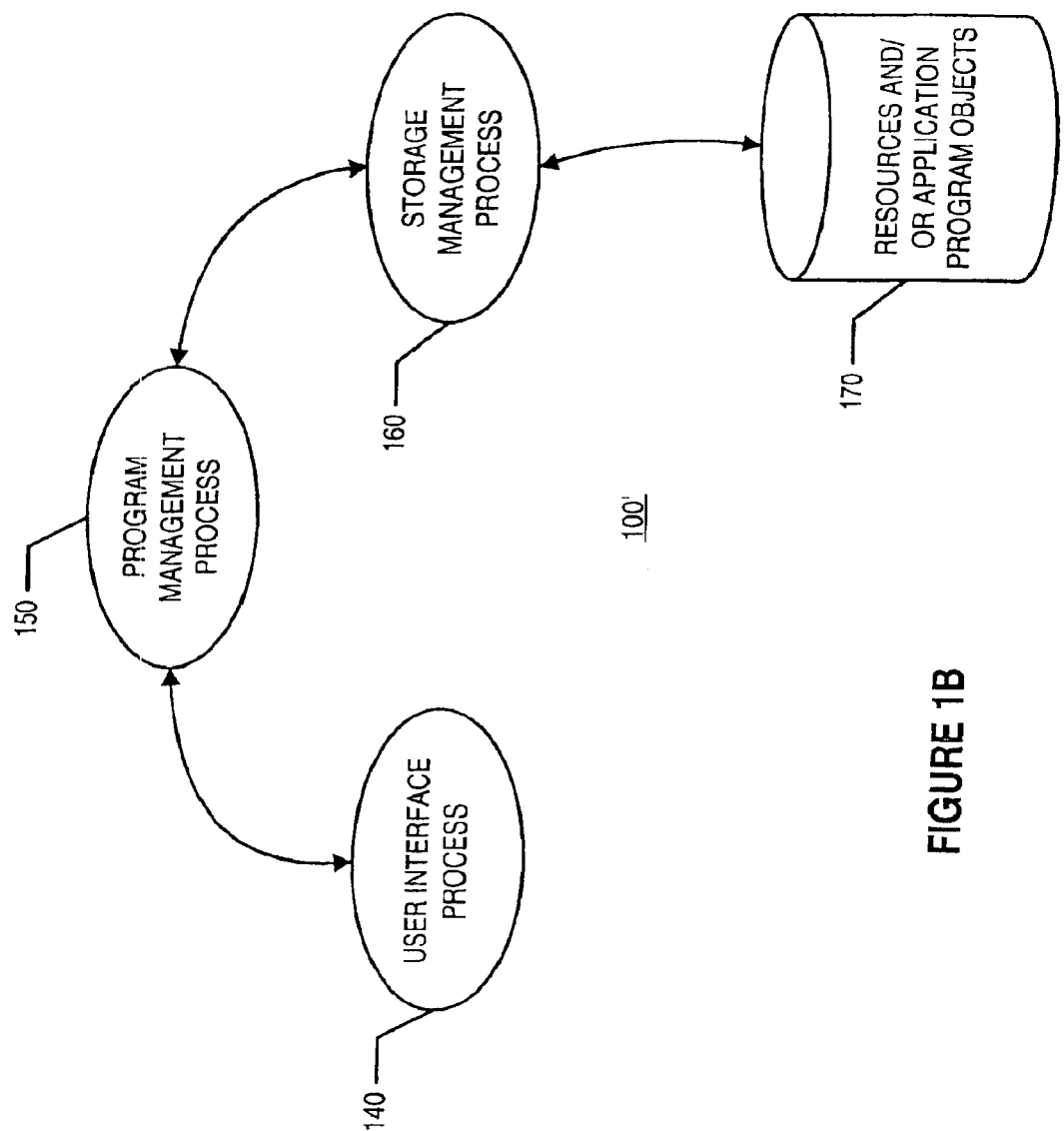
FIG. 1B is a diagram of processes of a second exemplary environment in which the present invention may operate.
Figure 26:
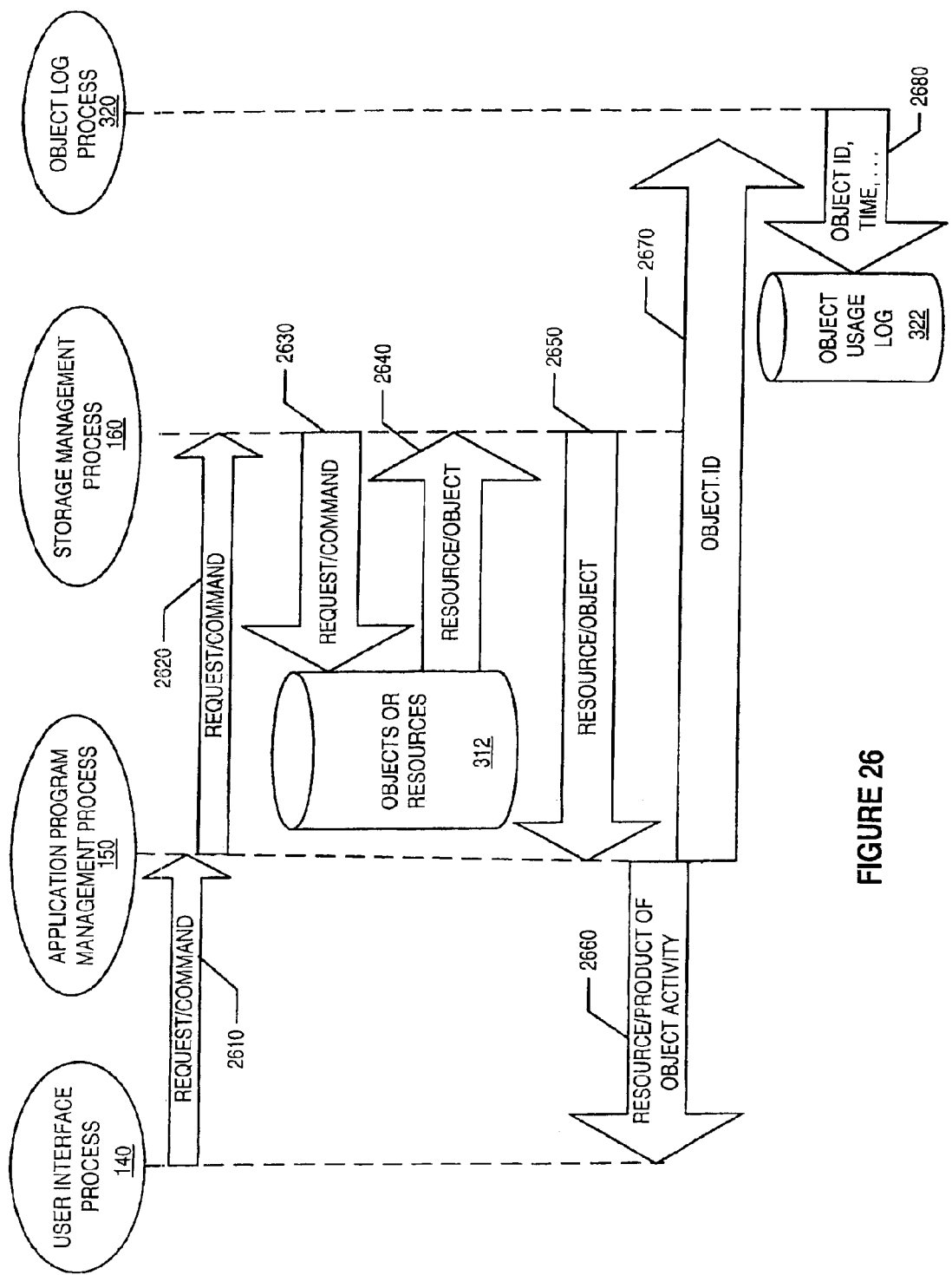

FIG. 26 is a high level messaging diagram depicting inter-process communications which may occur when logging object or resource usage in a desktop environment such as that depicted in FIG. 1B.

Figure 27:
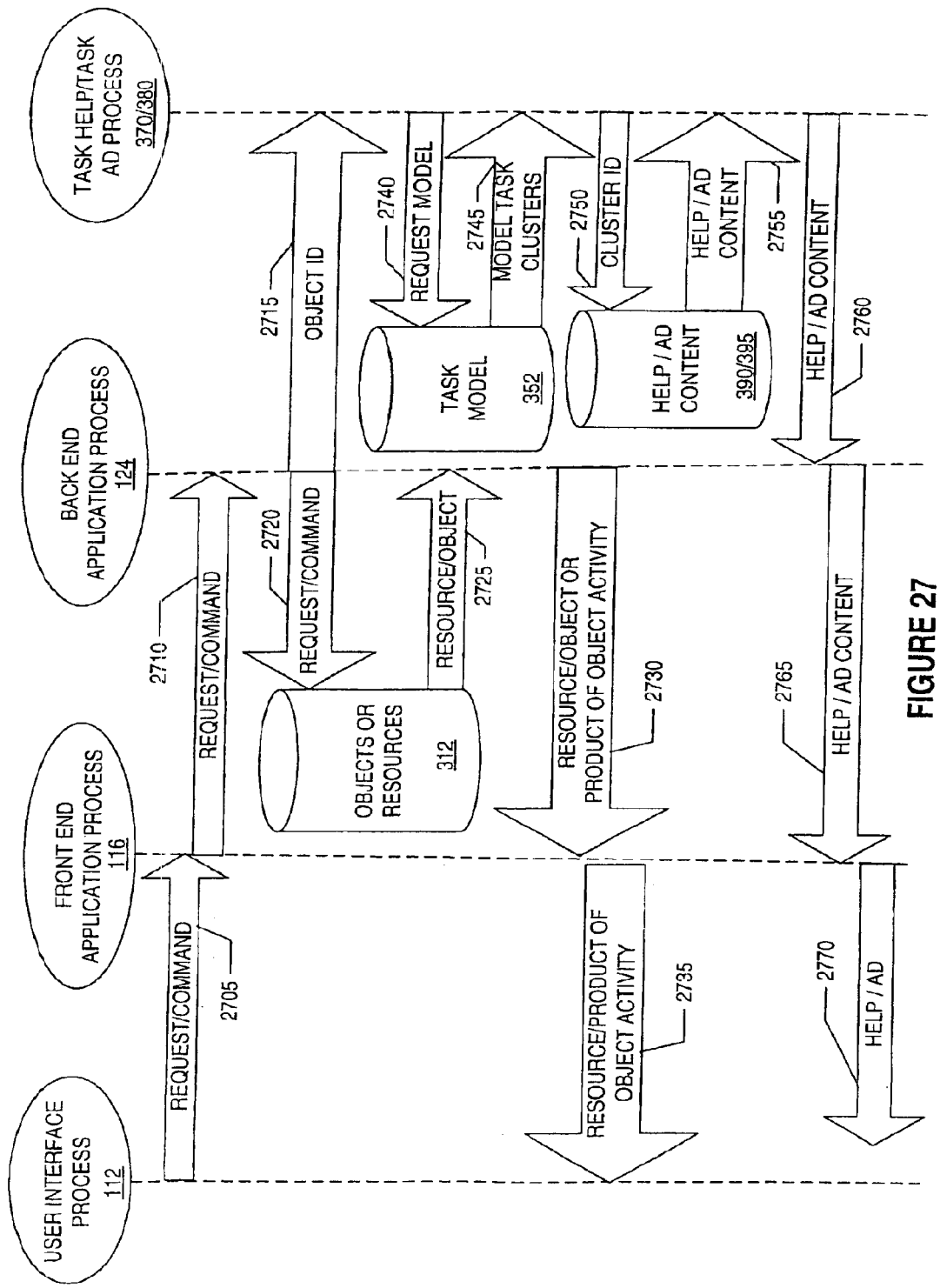

FIG. 27 is a high level messaging diagram depicting inter-process communications which may occur when providing task help and/or task-based marketing information in a client-server environment such as that depicted in FIG. 1A.

Figure 28:
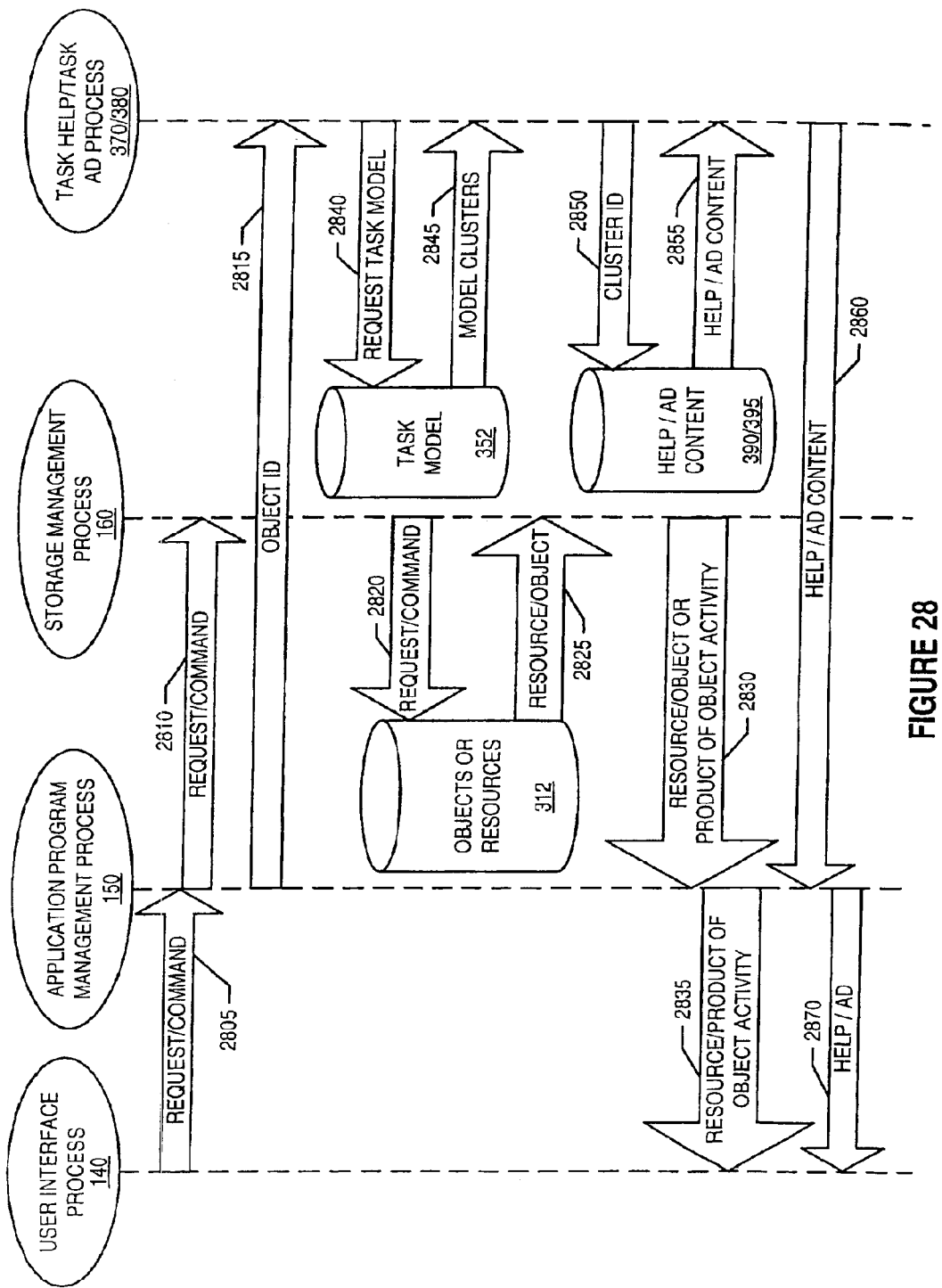

FIG. 28 is a high level messaging diagram depicting inter-process communications which may occur when providing task help and/or task-based marketing information in a desktop environment such as that depicted in FIG. 1B.

Figure 29:
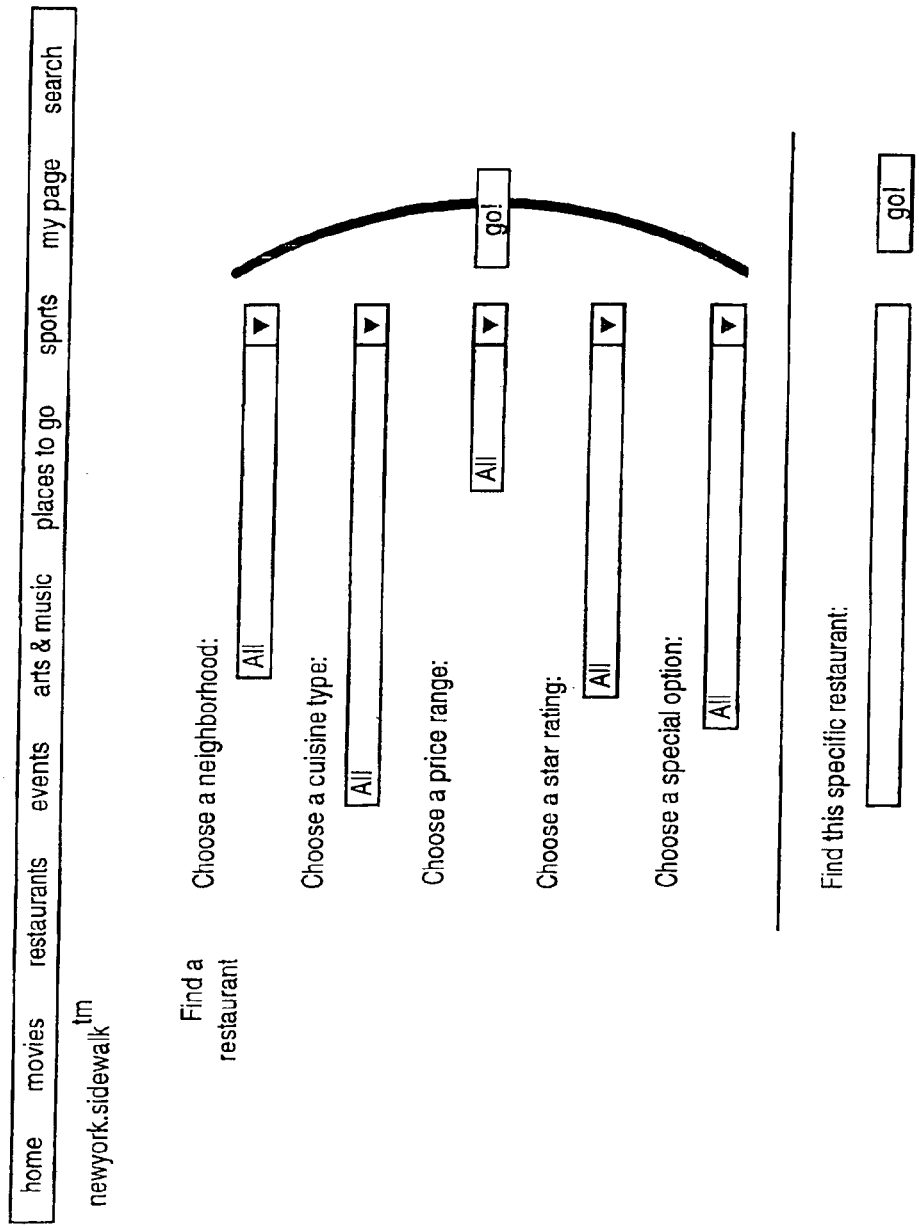

FIG. 29 is a query interface for finding restaurants in New York City. The query interface constrains the queries such that it is easy to represent entered queries in canonical form.

Figure 30A:
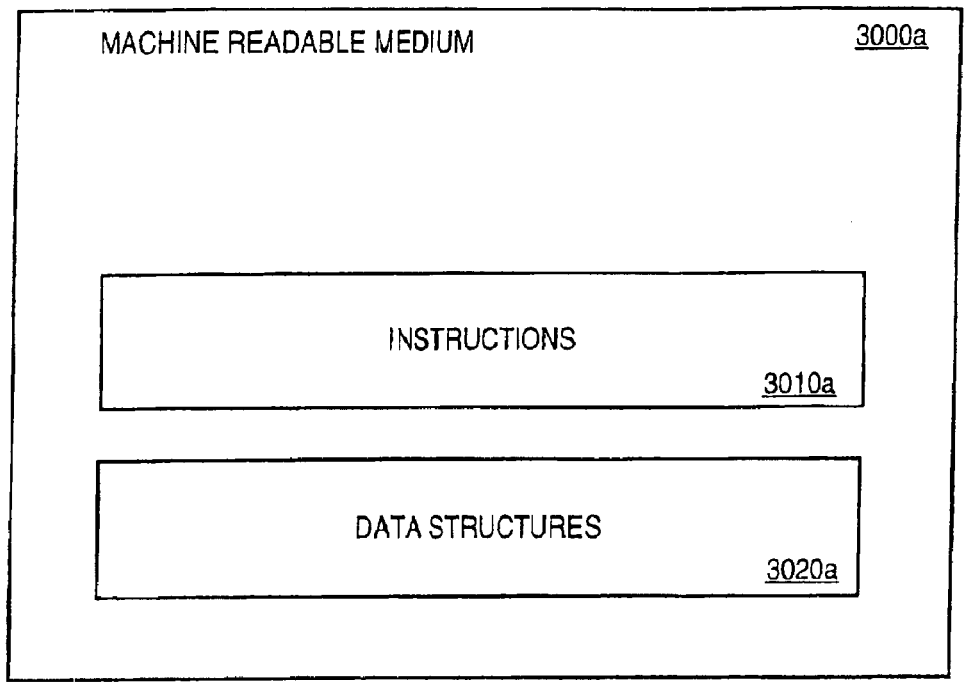
Figure 30B:
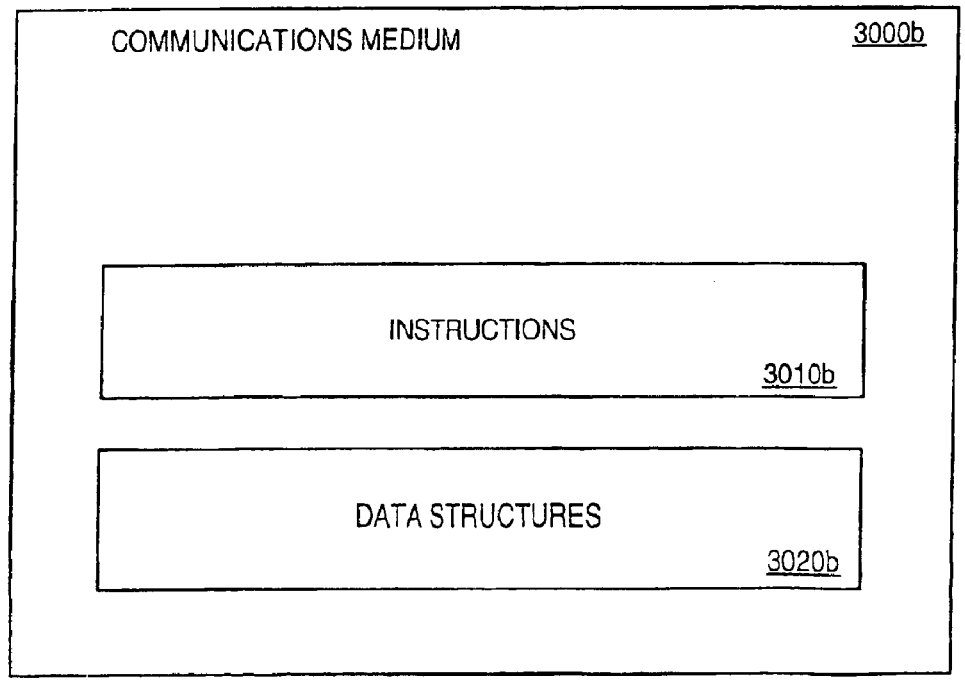

FIGS. 30A and 30B are block diagrams of instructions and data structures stored on a machine readable medium and carried over a communications medium, respectively.

Figure 31:
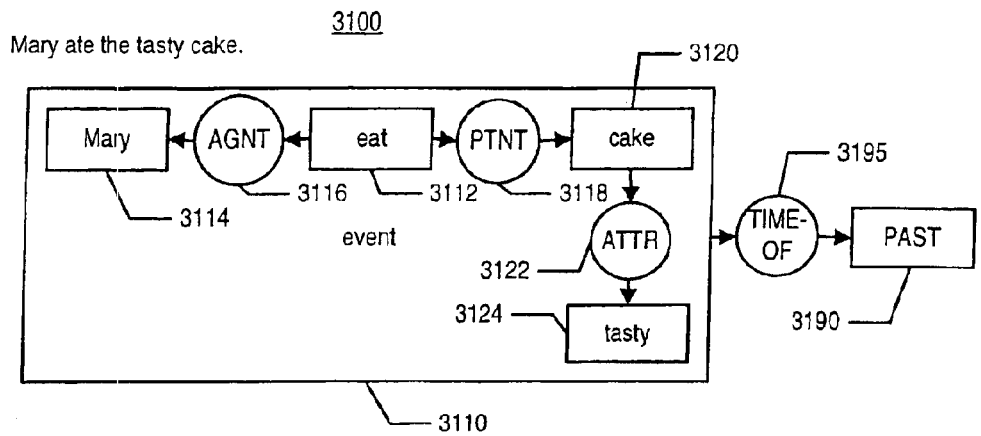

FIG. 31 is a graph which illustrates a uniform representation of information.

Figure 32:
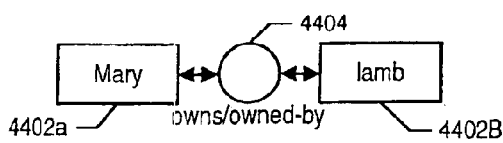

FIG. 32 is a predicate list that illustrates a uniform representation of information.

Figure 33A:
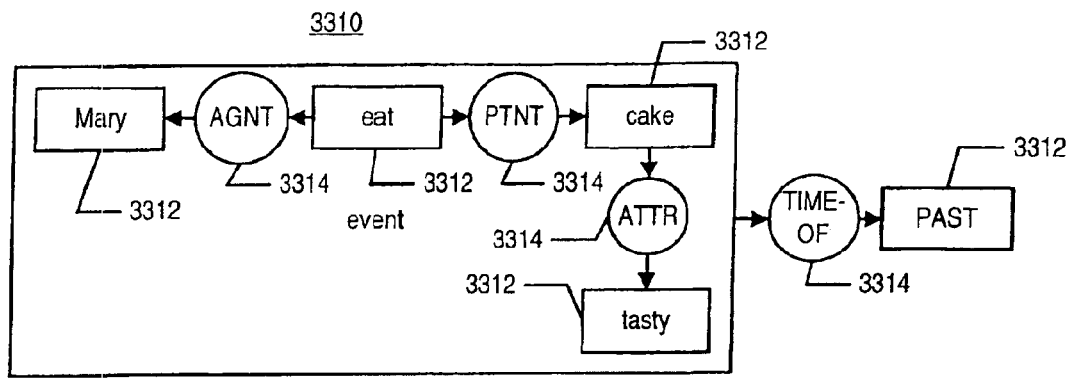
Figure 33B:
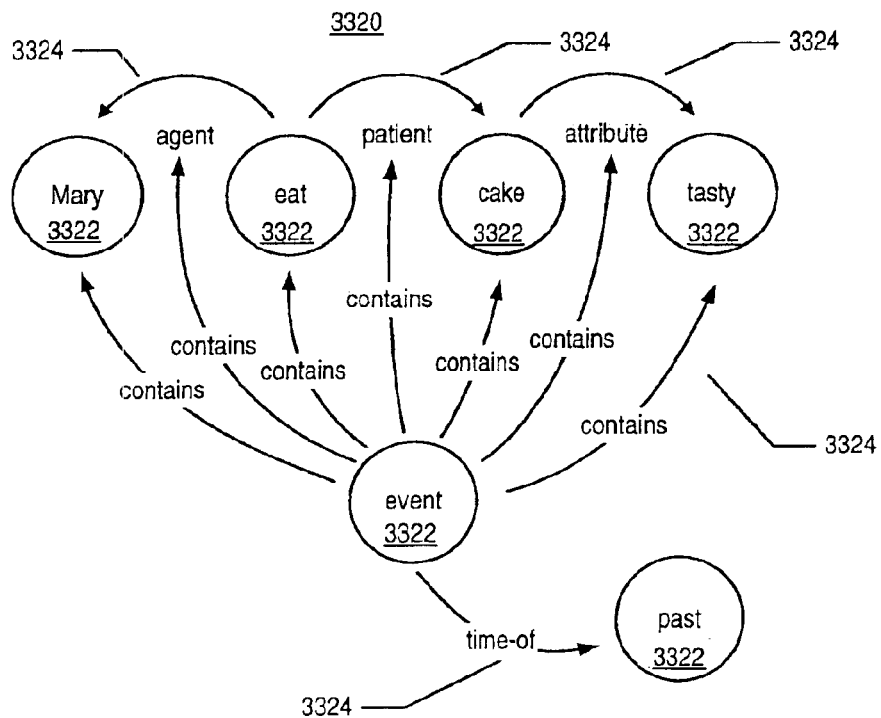

FIGS. 33A and 33B illustrate representing a graph as a directed hypergraph.

Figure 34A:
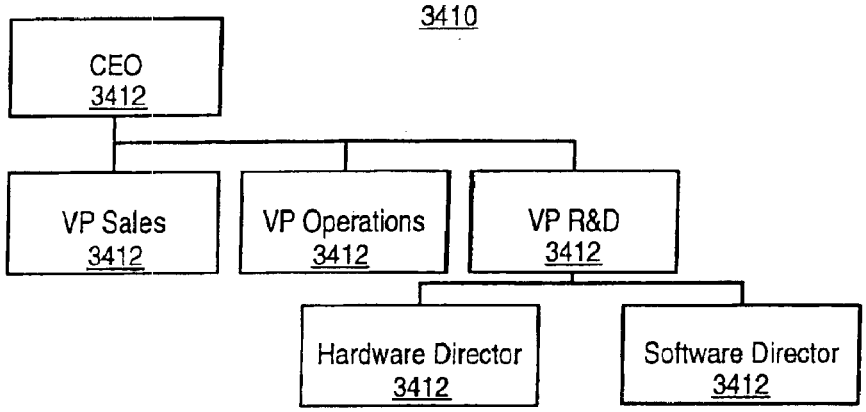
Figure 34B:
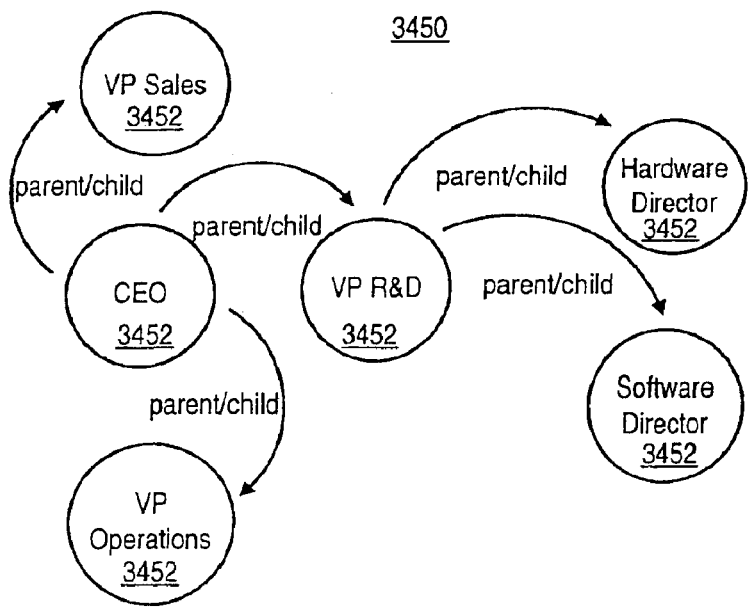

FIGS. 34A and 34B illustrate representing a hierarchy as a directed hypergraph.

Figures 35A, 36:
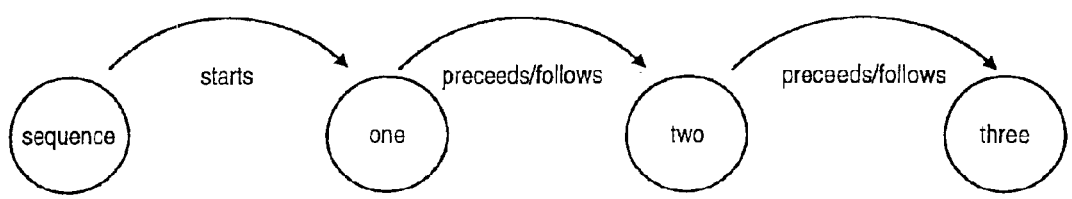
Figure 35B:
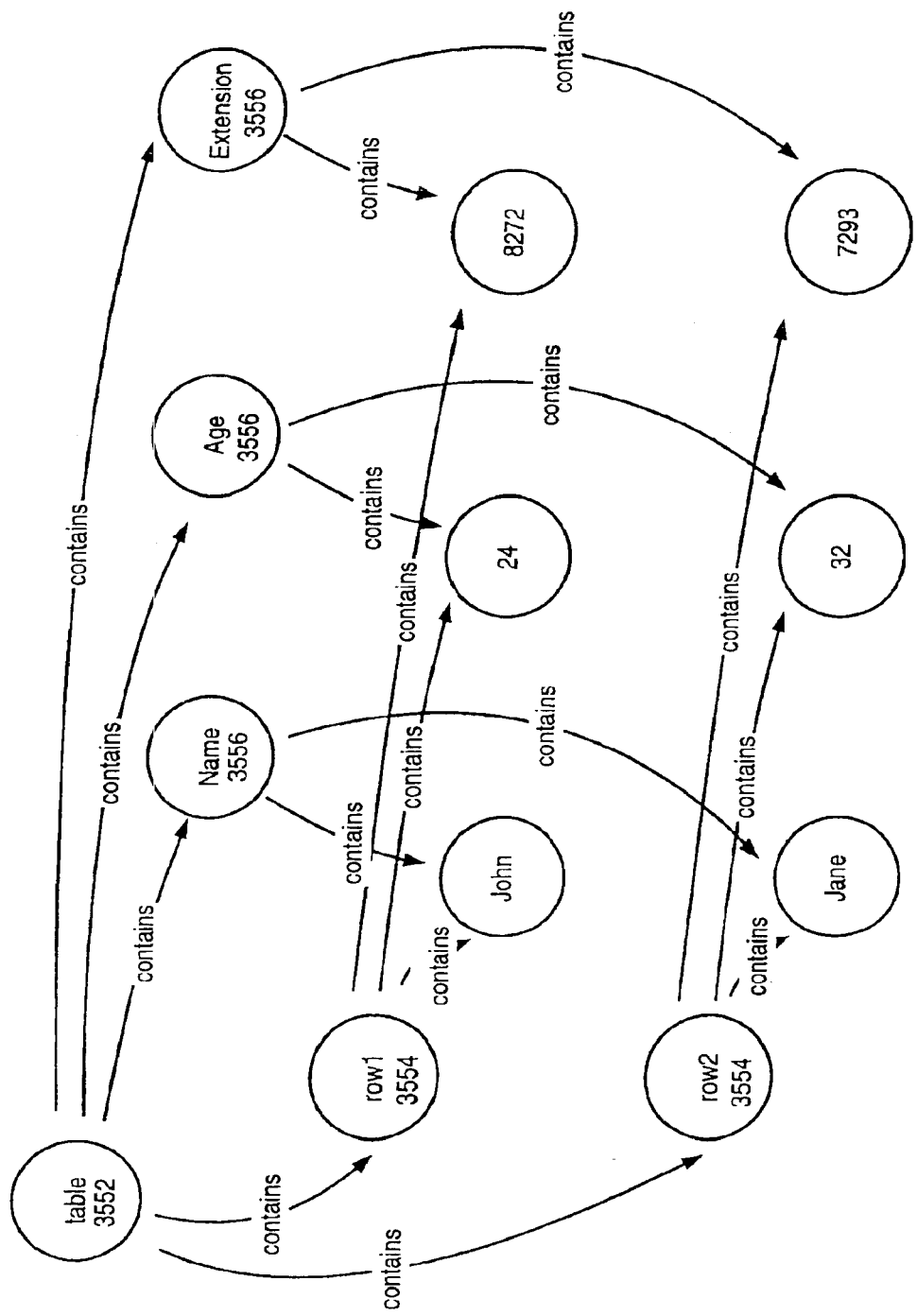

FIGS. 35A and 35B illustrate representing a table as a directed hypergraph.

FIG. 36 illustrates representing linear information as a directed hypergraph.

Figure 37A:
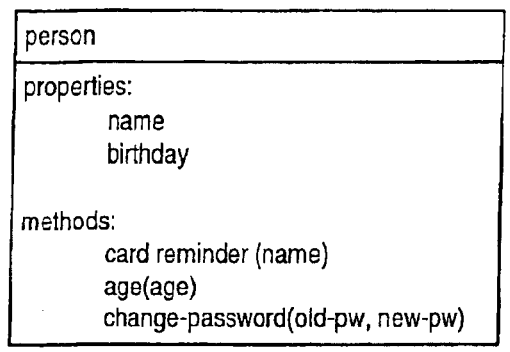
Figure 37B:
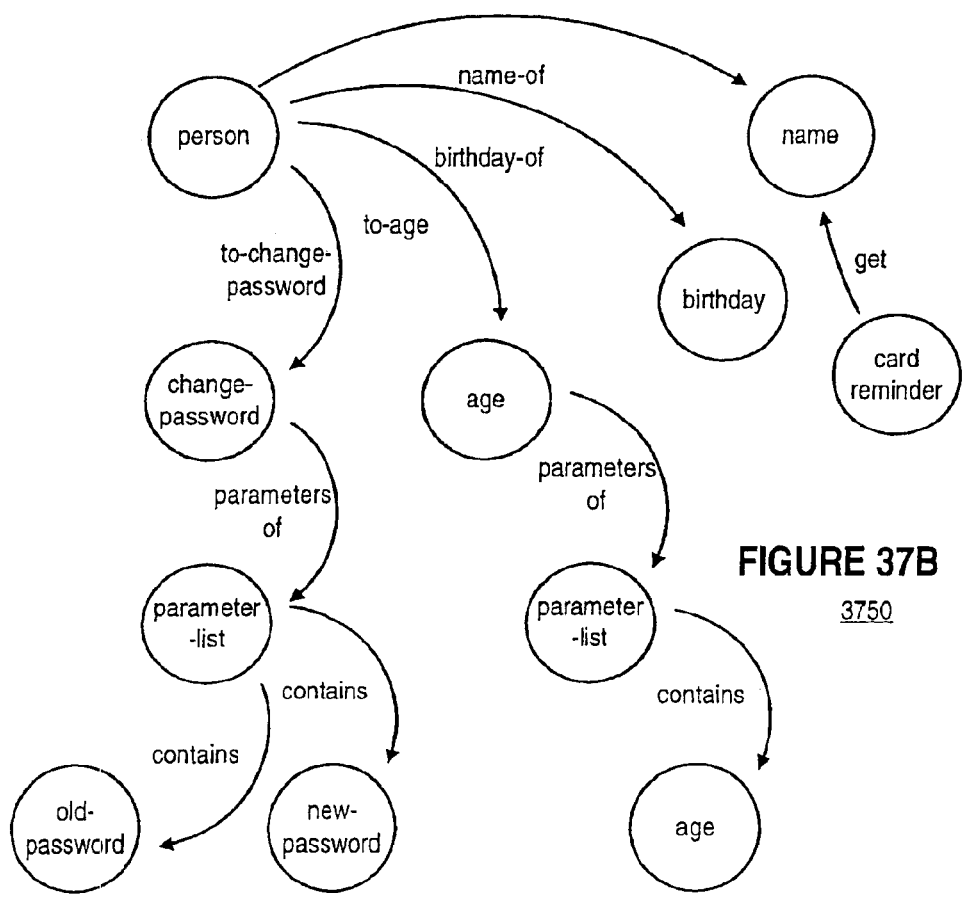

FIGS. 37A and 37B illustrate representing an active object (or active information), including methods, as a directed hypergraph.

FIGS. 38A and 38B illustrate representing an active object (or active information), not including methods, as a directed hypergraph.

FIG. 39 illustrates compressing a hypergraph representation of a sequence.

FIG. 40 illustrates compressing a hypergraph representation of a table.

FIG. 41 illustrates the concept of intentional definitions.

Figure 42C:
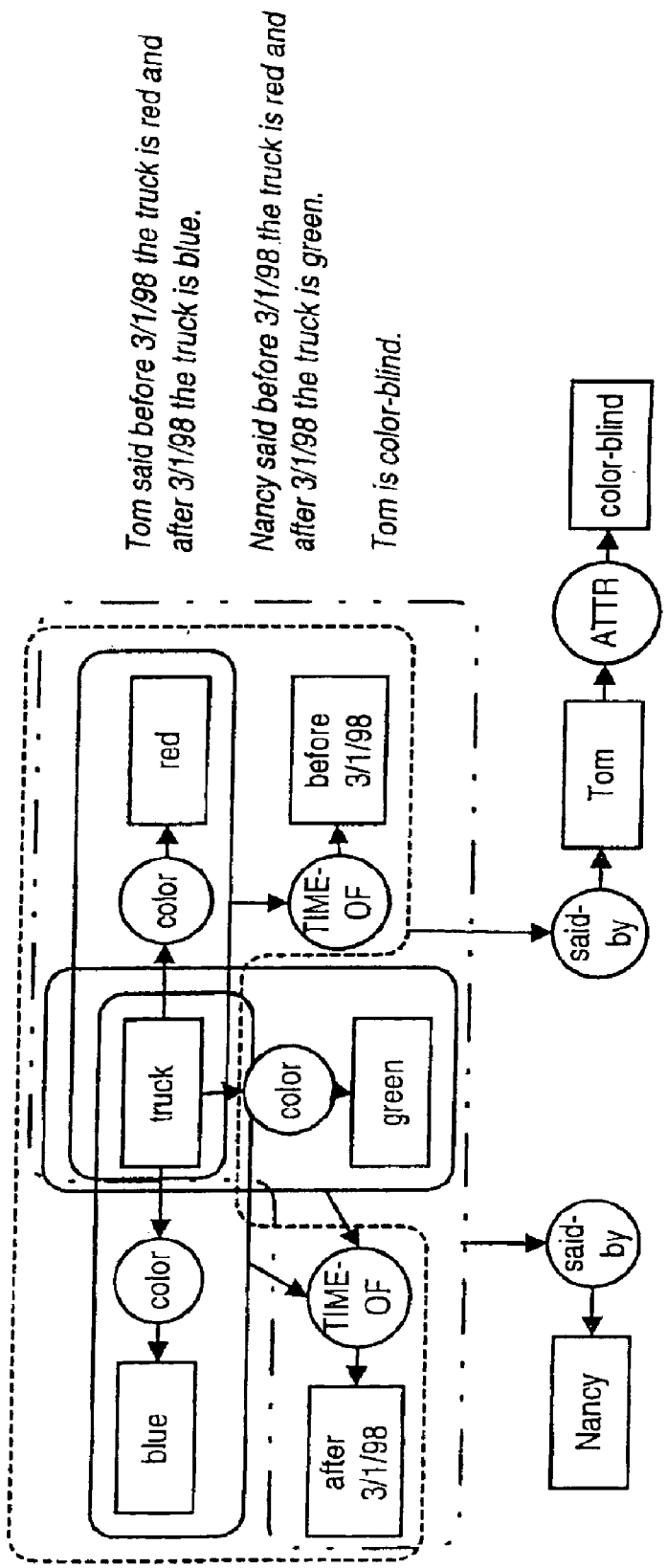

FIG. 42A illustrates the concept of logical inconsistency. FIG. 42B illustrates a way in which additional attribution is used to eliminate a logical inconsistency. FIG. 42C illustrates a way in which contextual information and additional attribution are used to eliminate a logical inconsistency.

Figure 43:
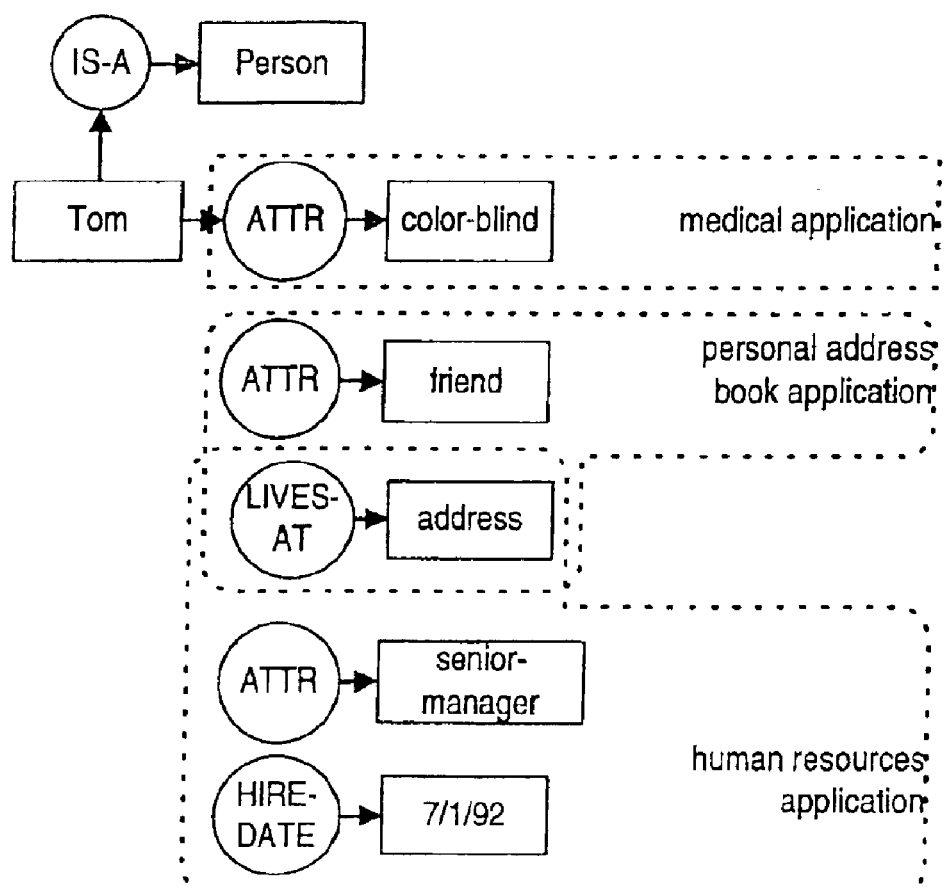

FIG. 43 illustrates the concept of multiple attribution.

Figure 44A:
Figure 44C:
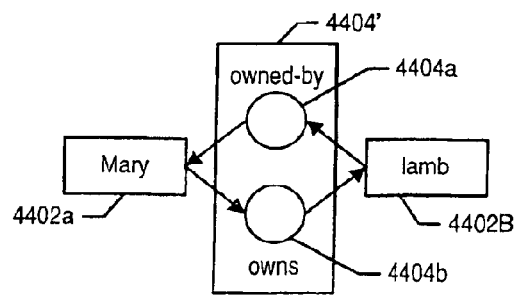
Figure 44B:

FIG. 44A illustrates a bi-directional a-ERD, FIG. 44B illustrates a directed hypergraph, and FIG. 44C illustrates bi-directional containment element including two unidirectional relations.

Figure 45:
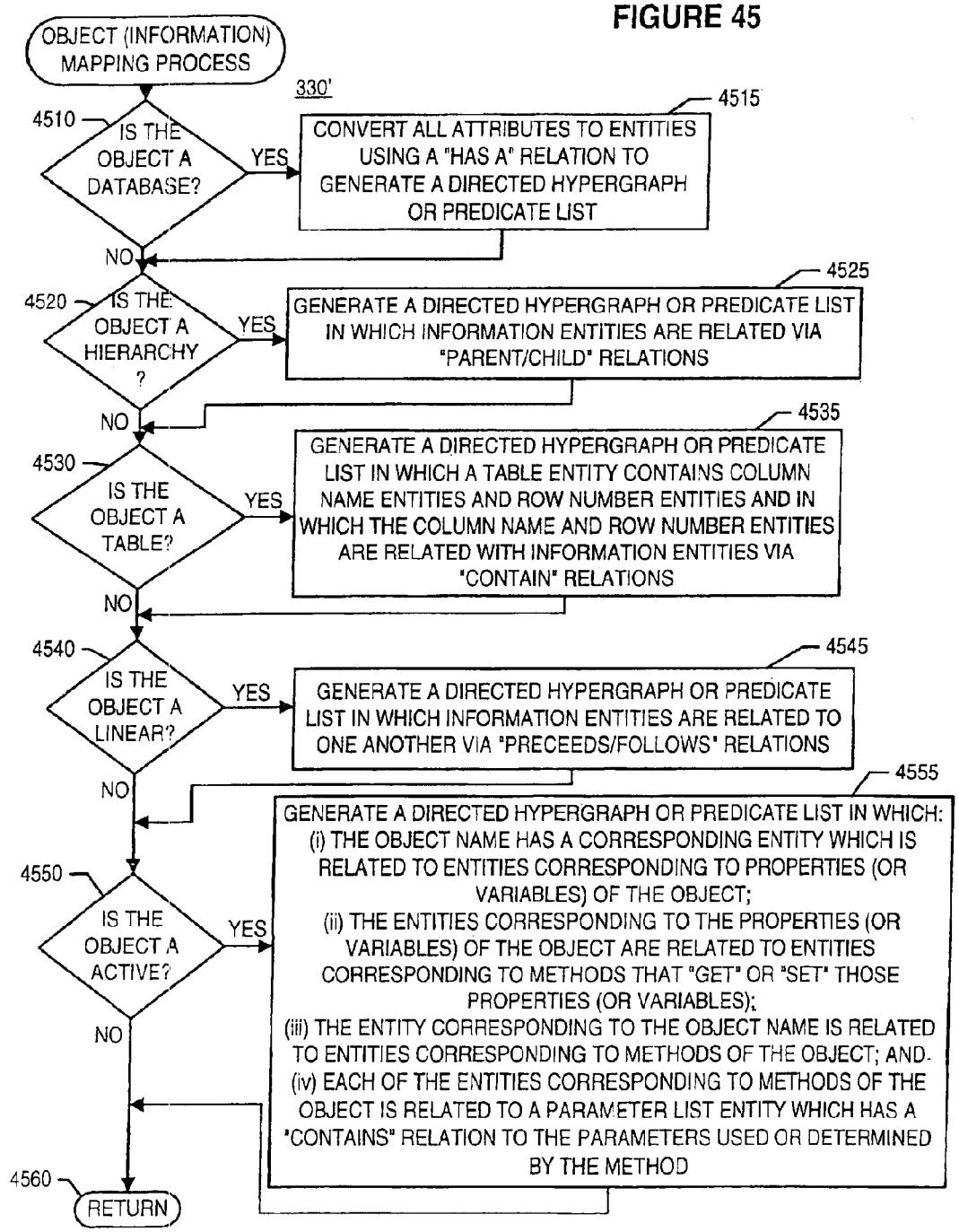

FIG. 45 is a flow diagram of an exemplary process for mapping different types of objects (or information) to a uniform representation.

[§] 4 DETAILED DESCRIPTION

The present invention concerns novel methods and apparatus for analyzing tasks being performed by users and for analyzing how such tasks are being performed. The present invention also concerns novel methods, apparatus, and data structures for representing various types of objects in a uniform way. The following description is presented to enable one skilled in the art to make and use the invention, and is provided in the context of particular applications and their requirements. Various modifications to the disclosed embodiments will be apparent to those skilled in the art, and the general principles set forth below may be applied to other embodiments and applications. Thus, the present invention is not intended to be limited to the embodiments shown.

Below, function(s) of the present invention will be described in § 4.1. Thereafter, the structures of exemplary embodiments and exemplary methods of the present invention will be described in § 4.2. Finally, examples of operations of the present invention will be described in § 4.3.

[§] 4.1 Functions of the Present Invention

In this section, the basic functions performed by the present invention will be introduced. The functions may be divided into functions that may be performed when a user is not performing a task (also referred to as "off-line") and those that may be performed while the user is performing a task (also referred to as "run-time"). The off-line functions are introduced in § 4.1.1 below. The run-time functions are introduced in § 4.1.2 below.

[§] 4.1.1 Off-line Functions

There are five (5) basic off-line functions that may be carried out by the present invention. Each of the five (5) off-line functions is introduced below. First, the present invention may function to gather usage data. That is, when performing tasks, users will interact with the computer and perform a number of steps (i.e., user inputs) in an attempt to complete the task. These steps (user inputs) are logged in a usage log for further analysis. An example of this function is described in § 4.2.3.1 below.

Second, the present invention may function to convert logged usage data into a uniform format. More specifically, objects or information (e.g., software executables, various types of database resources, etc.) invoked pursuant to the user inputs may be expressed in a common manner. An example of this function is described in § 4.2.3.2 below.

Third, the present invention may function to determine or define task boundaries. That is, a computer user may interact with a computer to perform a number of tasks during a single session (a "session" may be defined as a predetermined period of activity followed by a predetermined period of inactivity) or may perform a single task over a number of sessions. Examples of this task boundary definition function are described in §4.2.3.3 below.

Fourth, the present invention may function to determine a task analysis model from the converted (or non-converted, uniform) usage data. More specifically, the present invention may function to "cluster" similar tasks together. The task model may use a limit on (a) the number of clusters, and/or (b) the distance (i.e., "dissimilarity") between the clusters, when generating the model. An example of this function is described in § 4.2.3.4 below.

Finally, the present invention may function as a design tool which uses the task analysis model for designing application user interfaces such as tool bars, hierarchical menus, gratuitous help, etc. In this instance, probabilities of tasks from the task analysis model may be used to determine what tasks users will likely want to perform. Human design factors, such as how many functions users like on a toolbar or how many levels of menus they like may be used when generating the task analysis model to determine how many clusters the model should have.

The present invention may also function as a design tool which uses the task analysis model for designing a topology of a resource server, such as an Internet website for example. As was the case with designing application user interfaces, in this instance, probabilities of tasks from the task analysis model may be used to determine what tasks users will likely want to perform. Human design factors, such as how many hyper-text links or query boxes on a single web page users like may be used when determining the topology of the resource server interface.

[§] 4.1.2 Run-time Functions

Having introduced off-line functions that the present invention may perform, run-time functions that the present invention may perform are now introduced.

First, the present invention may function to help users complete a task based on a task analysis model. Such help, for example, may be in the form of a gratuitous help function. Basically, a run-time application will look at steps being performed by the user and determine if such steps "belong to" a task cluster of the task analysis model. If the steps performed by the user appear to "belong to" a task cluster, the user may be provided with gratuitous help for completing that task. For example, the application may communicate to the user, "It seems that you are trying to generate an annual report. May I help you complete this task?" Alternatively, when it can be established, with a requisite degree of certainty, that the user is trying to perform a particular task, the application may automatically complete that task without further input from the user or the application may guide the user through remaining steps for completing the task in an efficient manner. Examples of-these functions are described in § 4.2.3.5 below.

Second, the present invention may function to target marketing information to users based on user inputs and a task analysis model. For example, the Internet has permitted companies to target marketing information to narrow niches of potential customers. For example, a web page providing stock quotes may advertise a stock broker, a web page providing telephone numbers may advertise a long distance telephone carrier, etc. However, the present invention permits tasks to be more generalized. For example, it may recognize that an Internet user submitting queries for a restaurant in a certain neighborhood may be planning a date including dinner and a movie. Thus, in this case, the present invention might function to provide movie advertisements along with the restaurant information resources. Examples of this "task associated advertising" function are described in. § 4.2.3.6 below.

[§] 4.2 Structures and Methods of Exemplary Embodiments of the Present Invention Having introduced various functions which may be performed by the present invention, exemplary embodiments of the present invention will now be described. First, exemplary environments in which the present invention may operate will be described in § 4.2.1 below. Then, exemplary processes for effecting one or more of the functions discussed above will be described, at a high level, in § 4.2.2 below. Thereafter, details of the exemplary processes for effecting the functions discussed above will be described in § 4.2.3 below.

[§] 4.2.1 Exemplary Operating Environments

FIG. 1A is diagram of processes of a first exemplary environment 100 (referred to as a "client-server environment") in which the present invention may operate. The environment 100 includes a client 110 (e.g., a personal computer) and a server 120 (e.g., a computer) which can communicate with one another via a network 130 (e.g., a local area network (or "LAN"), a wide area network (or "WAN"), or an internetwork).

The client 110 includes an user interface process 112 (e.g., a graphical user interface (or "GUI")), an input/output interface processes 114 (e.g., a serial port, a video driver, and a network interface card (or "NIC")), and a front end application process 116 (e.g., an Internet browser, a database front end, etc.). The user interface process 112 and the front end, application process 116 may communicate with each other by means of an input/output interface process 114.

The server 120 includes an input/output interface processes 122 (e.g., a bank of network interface cards and a SCSI interface) and a back end application process 124 (e.g., an Internet resource server, a database manager, etc.). Stored objects and/or resources 126 may be accessed by the back end application process 124 by means of an input/output interface process 122 (e.g., the SCSI interface).

Thus, a user at the client 110 may access stored objects and/or resources 126 at the server 120 by means of the user interface process 112 (e.g., a GUI), a input/output interface process 114 (e.g., a serial port), the front end application process 116 (e.g., an Internet browser), an input/output interface process (e.g., a NIC), the network 130 (e.g., the Internet), an input/output interface process 122 (e.g., a NIC), the back end application process 124 (e.g., an Internet resource server), and an input/output interface process 122 (e.g., a SCSI port). As will be discussed below, processes for effecting one or more of the functions of the present invention may be carried out at the client 110 and/or at the server 120.

FIG. 1B is a diagram of processes of a second exemplary environment 100' (referred to as a "desktop environment") in which the present invention may operate. In this case, all of the processes may be executed at a single location (e.g., on a personal computer). The second exemplary environment 100' includes a user interface process 140 (e.g., a GUI), a program management process 150 (e.g., a word processor), a storage management process 160, and stored resource and/or application program objects 170. A user interacts with the program management process 150 by means of the user interface process 140. The program management processes 150 invokes (or renders) appropriate objects 170, via the storage management process 160, in response such user inputs.

Figure 2A:
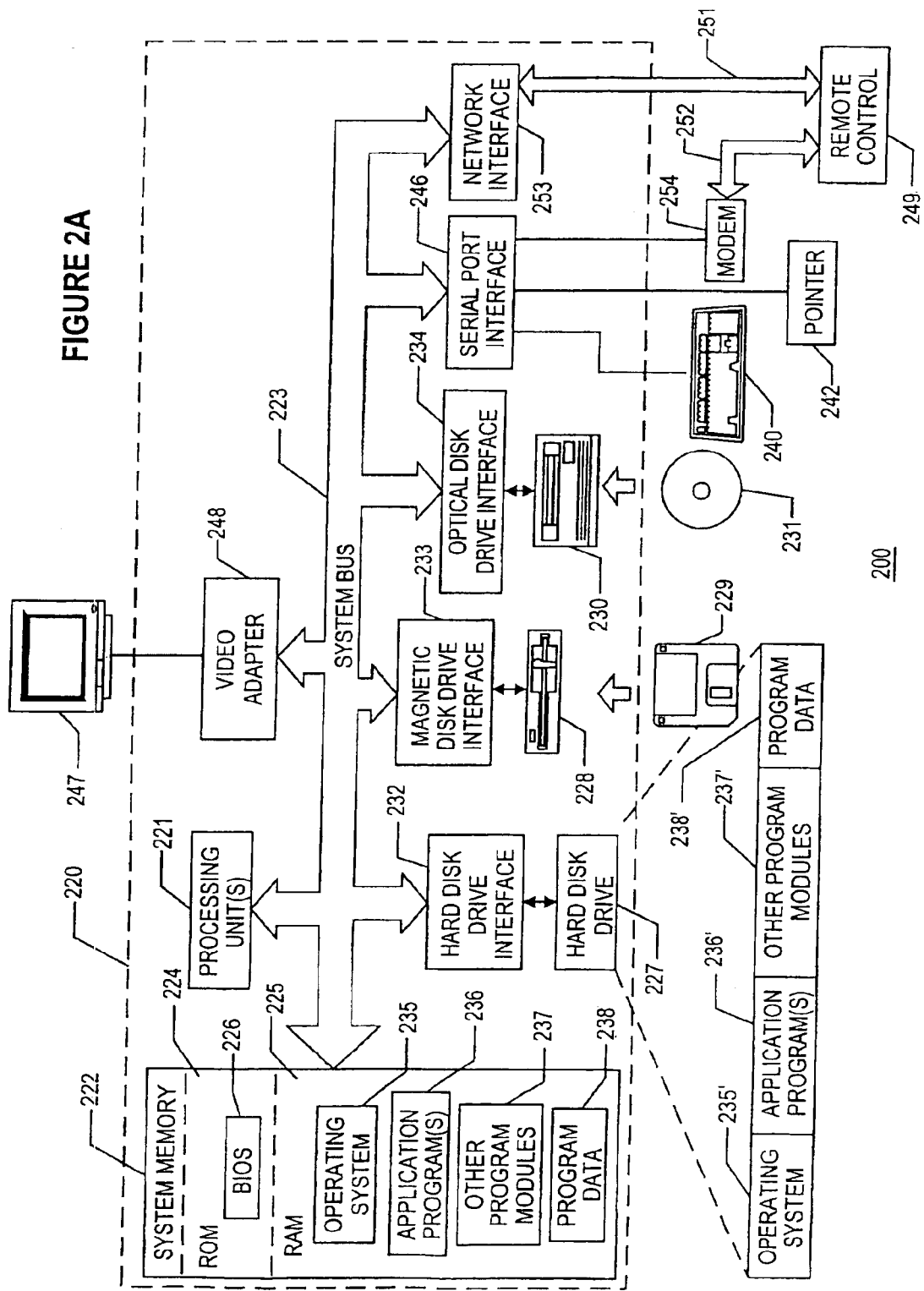
FIG. 2A is a block diagram of an exemplary system which may be used in the exemplary environments of FIGS. 1A and 1B.

FIG. 2A and the following discussion provide a brief, general description of an exemplary apparatus in which at least some aspects of the present invention may be implemented. The present invention will be described in the general context of computer-executable instructions, such as program modules, being executed by a personal computer. However, the methods of the present invention may be effected by other apparatus. Program modules may include routines, programs, objects, components, data structures, etc. that perform a task(s) or implement particular abstract data types. Moreover, those skilled in the art will appreciate that at least some aspects of the present invention may be practiced with other configurations, including hand-held devices, multiprocessor systems, microprocessor-based or programmable consumer electronics, network computers, minicomputers, set top boxes, mainframe computers, and the like. At least some aspects of the present invention may also be practiced in distributed computing environments where tasks are performed by remote processing devices linked through a communications network. In a distributed computing environment, program modules may be located in local and/or remote memory storage devices.

With reference to FIG. 2A, an exemplary apparatus 200 for implementing at least some aspects of the present invention includes a general purpose computing device in the form of a conventional personal computer 220. The personal computer 220 may include a processing unit(s) 221, a system memory 222, and a system bus 223 that couples various system components including the system memory 222 to the processing unit 221. The system bus 223 may be any of several types of bus structures including a memory bus or memory controller, a peripheral bus, and a local bus using any of a variety of bus architectures. The system memory may include read only memory (ROM) 224 and/or random access memory (RAM) 225. A basic input/output system 226 (BIOS), containing basic routines that help to transfer information between elements within the personal computer 220, such as during start-up, may be stored in ROM 224. The personal computer 220 may also include a hard disk drive 227 for reading from and writing to a hard disk, (not shown), a magnetic disk drive 228 for reading from or writing to a (e.g., removable) magnetic disk 229, and an optical disk drive 230 for reading from or writing to a removable (magneto) optical disk 231 such as a compact disk or other (magneto) optical media. The hard disk drive 227, magnetic disk drive 228, and (magneto) optical disk drive 230 may be coupled with the system bus 223 by a hard disk drive interface 232, a magnetic disk drive interface 233, and a (magneto) optical drive interface 234, respectively. The drives and their associated storage media provide nonvolatile storage of machine readable instructions, data structures, program modules and other data for the personal computer 220. Although the exemplary environment described herein employs a hard disk, a removable magnetic disk 229 and a removable optical disk 231, those skilled in the art will appreciate that other types of storage media, such as magnetic cassettes, flash memory cards, digital video disks, Bernoulli cartridges, random access memories (RAMs), read only memories (ROM), and the like, may be used instead of, or in addition to, the storage devices introduced above.

A number of program modules may be stored on the hard disk 223, magnetic disk 229, (magneto) optical disk 231, ROM 224 or RAM 225, such as an operating system 235, one or more application programs 236, other program modules 237, and/or program data 238 for example. A user may enter commands and information into the personal computer 220 through input devices, such as a keyboard 240 and pointing device 242 for example. Other input devices (not shown) such as a microphone, joystick, game pad, satellite dish, scanner, or the like may also be included. These and other input devices are often connected to the processing unit 221 through a serial port interface 246 coupled to the system bus. However, input devices may be connected by other interfaces, such as a parallel port, a game port or a universal serial bus (USB). A monitor 247 or other type of display device may also be connected to the system bus 223 via an interface, such as a video adapter 248 for example. In addition to the monitor, the personal computer 220 may include other peripheral output devices (not shown), such as speakers and printers for example.

The personal computer 220 may operate in a networked environment which defines logical connections to one or more remote computers, such as a remote computer 249. The remote computer 249 may be another personal computer, a server, a router, a network PC, a peer device or other common network node, and may include many or all of the elements described above relative to the personal computer 220, although only a memory storage device 250 has been illustrated in FIG. 2A. The logical connections depicted in FIG. 2A include a local area network (LAN) 251 and a wide area network (WAN) 252, an intranet and the Internet.

When used in a LAN, the personal computer 220 may be connected to the LAN 251 through a network interface adapter (or "NIC") 253. When used in a WAN, such as the Internet, the personal computer 220 may include a modem 254 or other means for establishing communications over the wide area network 252. The modem 254, which may be internal or external, may be connected to the system bus 223 via the serial port interface 246. In a networked environment, at least some of the program modules depicted relative to the personal computer 220 may be stored in the remote memory storage device. The network connections shown are exemplary and other means of establishing a communications link between the computers may be used.

Figure 2B:
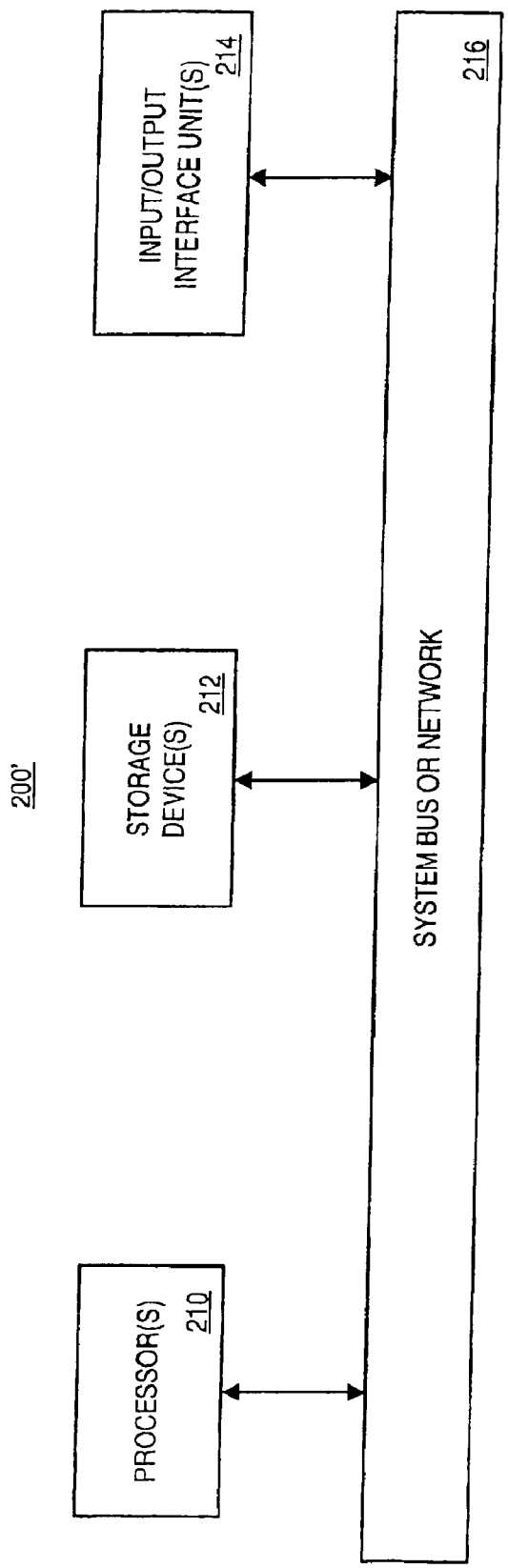
FIG. 2B is an exemplary computer which may perform at least some aspects of the present invention.

FIG. 2B is a block diagram of an exemplary system 200' which may be used in the exemplary environments of FIGS. 1A and 1B. The system 200 includes a processor(s) 210 (e.g., microprocessor(s)), a storage device(s) 212 (e.g., magnetic disk(s), optical disk(s), RAM, ROM, etc.), and an input/output interface unit(s) 214 (e.g., SCSI adapters, serial ports, parallel ports, NICs, modems, etc.), all of which may communicate with one another by means of a system bus or network 216. Each of the processes discussed above with reference to FIGS. 1A and 1B, as well as the processes described below, may be program instructions executed on the processing unit(s) 221 or the processor(s) 210. The program instructions may be stored on the storage device(s) 222, 227 or 212 and/or may be received from an external source via the serial port interface 246, the network interface 253, or the input/output interface unit(s) 214.

[§] 4.2.2 High Level Diagrams of Processes

Figure 3A:
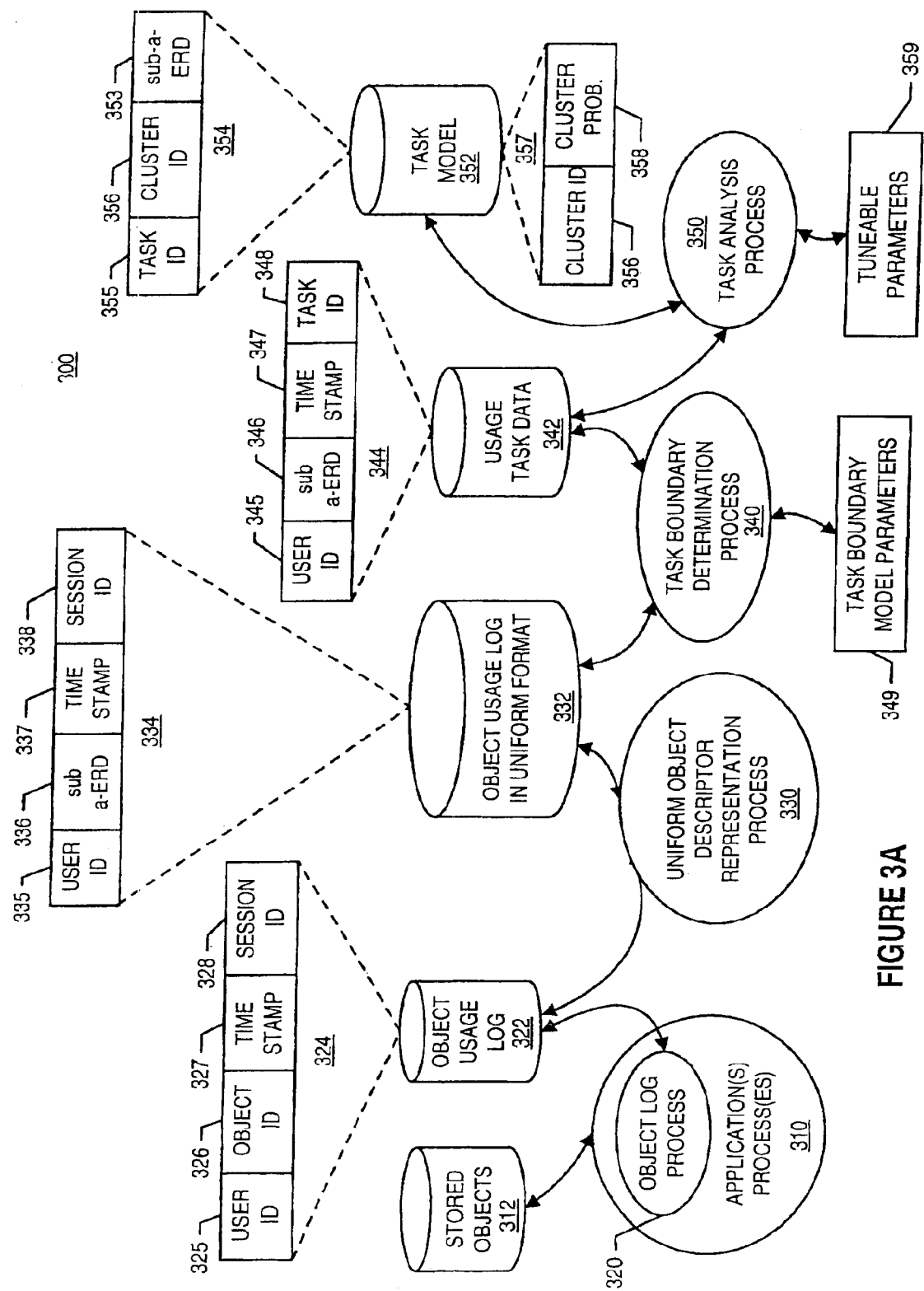
FIG. 3A is a diagram of exemplary processes which may be used to effect certain aspects of the present invention.
Figure 3B:
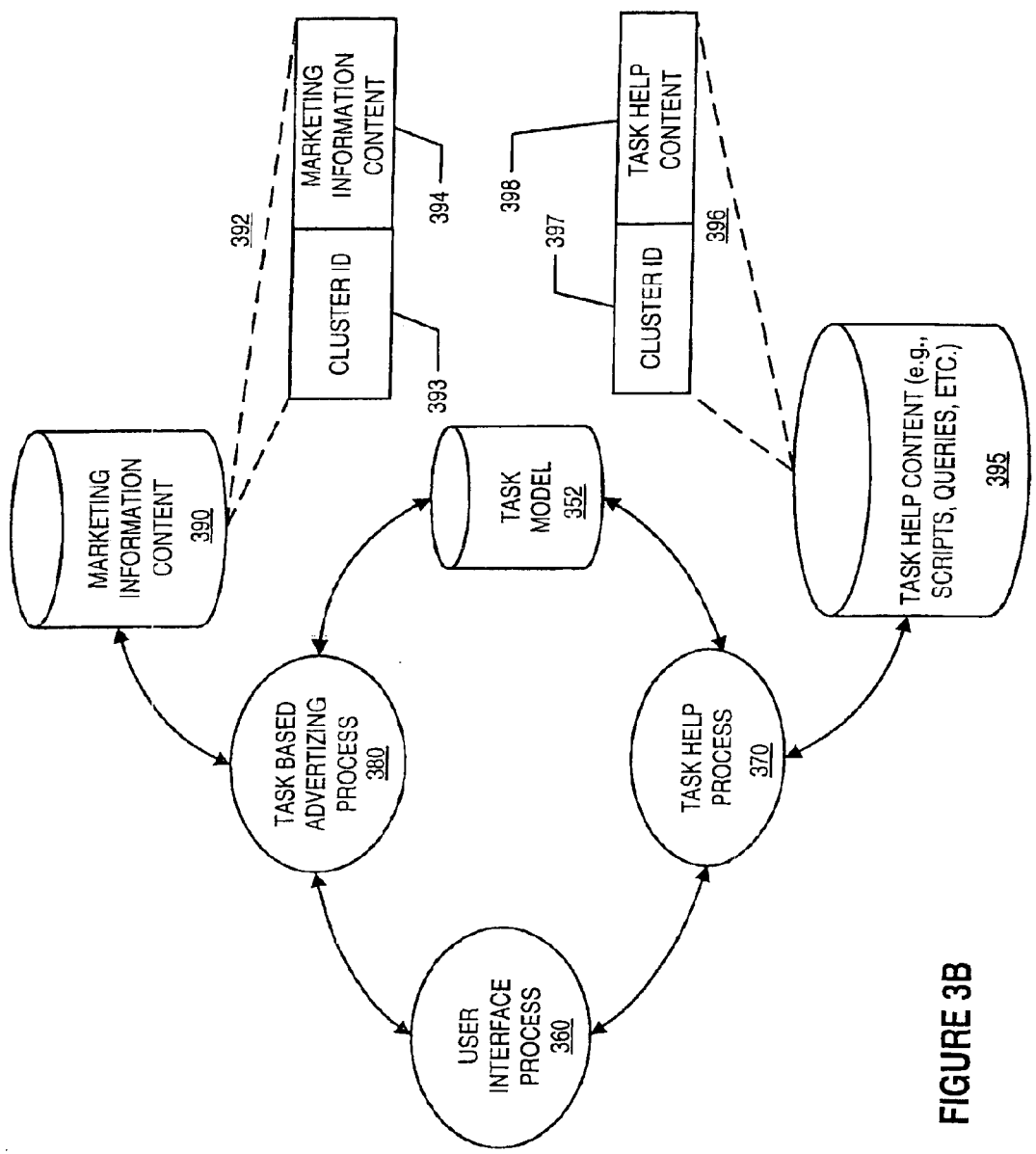
FIG. 3B is a diagram of exemplary processes which may be used to effect certain other aspects of the present invention.

Having described a number of environments within which the present invention may operate, exemplary processes for performing one or more of the functions of the present invention will now be introduced with reference to FIGS. 3A and 3B. Recall that functions that may be performed by the present invention may be characterized as off-line functions and run-time functions. Exemplary processes for performing the off-line functions will be briefly described, with reference to FIG. 3A, in § 4.2.2.1 below. Exemplary processes for performing the run-time functions will be briefly described, with reference to FIG. 3B, in § 4.2.2.2 below.

[§] 4.2.2.1 Off-line Processes

FIG. 3A is a diagram of exemplary processes which may be used to effect certain aspects of the present invention. More specifically, the processes depicted in FIG. 3A may be used to effect off-line functions in accordance with the present invention. The off-line processes may include an object log process (or more generally, a log generator) 320, a uniform object representation generation process (or more generally, a uniform object generator) 330, a task boundary determination process (or more generally, a task boundary generator) 340, and a task analysis process (or more generally, a task analyzer) 350.

Application(s) process(es) 310 may effect a computer application such as an Internet browser or a word processor for example. Referring to FIG. 1A, the application(s) process(es) 310 may include a front end 116 at a client 110 and a back end 124 at a server 120 in a client-server environment 100. Referring to FIG. 1B, the applications() processes(es) 310 may include a program management process 150 in a desktop environment 100'. The application (s) process(es) 310 uses (e.g., renders, executes, activates, updates, generates, etc.) stored objects 312 in response to user input. The objects may be information such as executable objects, database objects, renderable resources, etc. For example, if the application process 310 is a word processor, the stored objects 312 may be toolbar objects or menu objects for performing document editing and formatting functions or a linear object of a stream of entered text. If the application process 310 is an Internet or Intranet browser, the stored objects 312 may be renderable resources such as hyper-text mark-up language (or "HTML") pages, joint photographic experts group (or "JPEG") encoded images, motion pictures experts group (or "MPEG") encoded video, encoded audio, etc., a structured object of a hierarchy of an Internet web site, or a linear object of an order of web sites visited by a user, for example. Thus, as can be appreciated from the foregoing examples, each application may invoke more than one type of object (or information). Each of the stored objects 312 should have an unique identifier, also referred to as an "object ID". The object ID can then be used to cross reference an action against a schema or an a-ERD (described in § 4.2.3.2.4 below).

As shown in FIG. 3A, the object log process 320 creates an object usage log 322 based on stored objects (or information) utilized by and/or objects (or information) generated or updated by, the application(s) process(es) 310. The object usage log 322 may include records 324 having a user ID field 325 (optional), an object ID field 326, a time/date stamp field 327, and a session ID field 328 (optional). The user ID field 325 may contain information to identify or distinguish users. If, for example, the application (s) process(es) 310 is a word processor carried out on a personal computer (See, e.g., FIGS. 1B and 2.), then the value in the user ID field 325 may be determined based on user information associated with the computer or log on information. If, for example, the application(9) process(es) 310 is an Internet browser carried out on a client and server (See, e.g., FIGS. 1A and 2.), then the value in the user ID field 324 may be a so-called cookie. A cookie, as known to those skilled in the art, is a unique tag, that may be downloaded from an Internet resource server (See, e.g., element 120 of FIG. 1A) to a client (See, e.g., element 110 of FIG. 1A.), where it is stored (See, e.g., hard disk 227 of FIG. 2A and storage devices 212 of FIG. 2B.). As discussed above, the object ID values stored in the object ID field 326 serve to uniquely identify the objects. The time and date at which the application(s) process(es) 310 invoked, requested, retrieved, updated, generated and/or rendered the stored object 312 is stored in the time stamp field 327. Finally, the optional session ID field 328 includes a session number during which the object was invoked, requested, retrieved, updated, generated and/or rendered by the application(s) process(es) 310. A session may be defined as a period of activity followed by a period of inactivity. Thus, a session ID value in the session ID field 328 may be derived from values in the time stamp field 327. Although the application(s) process(es) 310 and the object log generation process 320 have been grouped with off-line processes, they may actually be characterized as a run-time process since the object ID 326 and time stamp 327 values are stored while the application(s) process(es) 310 are running. However, the session ID, which may be derived from the time/date stamp, may be generated off-line.

Since different types of stored objects (or information) 312 may be used by, and/or updated or generated by, one or more application(s) process(es) 310, a uniform object (or information) representation generation process 330 may be used to generate an object usage log having a uniform (universal) format 332. This process 330 will be described in detail later, with reference to FIGS. 4 through 10 and 31 through 45. At this point, it suffices to say that the uniform object representation process 330 converts object usage logs 322 having the record format 324, to object usage logs 332 having the uniform (universal) record format 334. The record format 334 has a user ID field 335 (optional) which corresponds to the user ID field 325, a time stamp field 337 which corresponds to the time stamp field 327, and a session ID field 338 (optional) which corresponds to the session ID field 328. However, the record 334 includes a sub-a-ERD field 336 instead of, or in addition to, the object ID field 326. The sub-a-ERD field includes parts of sub-graphs of annotated-entity relation diagram data structures, which will be described in detail later. In this case, each of the application(s) process(es) 310 may have an associated annotated-entity relationship diagram (or "a-ERD"). Naturally, if the tasks carried out with the application(s) process(es) 310 use only one type of stored object 312, then the uniform object representation process 330 may be unnecessary.

During a given session, more than one task may be performed or attempted. Moreover, one task may be performed over more than one session. Again, each task may have a number of steps. Thus, a task boundary determination process 340 uses task boundary model parameters 349 to define task boundaries within a session(s). Examples of this process 340 will be described in detail in § 4.2.3.3 below. The defined tasks are stored as usage task data 342. The usage task data 342 may include records 344, each of which include an optional user ID field 345, a sub-a-ERD field 346, an optional time/date stamp field 347, and a task ID field 348. The user ID field 345 of the usage task data records 344 corresponds to the user ID field 325 of the object (or information) usage log records 324 and the user ID field 335 of the object (or information) usage log in universal format records 334. The sub-a-ERD field 346 of the usage task data records 344 corresponds to the sub-a-ERD field 336 of the object usage log in universal format records 334. The time stamp field 347 of the usage task data records 344 corresponds to the time stamp field 337 of the object (or information) usage log in uniform format records 334 and the time stamp field 327 of the object (or information) usage log records 324. Finally, the task ID field 348 is generated by the task boundary determination process 340. To reiterate, examples of this process 340 will be described in § 4.2.3.3 below.

As discussed above, one of the functions which may be carried out by the present invention is to generate a task analysis model in which tasks are clustered, sequenced, and assigned probabilities. The task analysis process 350 performs one or more of these functions based on the usage task data 342 and tunable parameters 359, to generate a task model 352. As shown, the task model 352 may include records 354 having a task ID field 355 and a cluster ID field 356, as well as records 357 having a cluster ID field 356 and a cluster probability field 358. The task ID fields 355 of the records 354 of the task model 352 correspond to the task ID fields 348 of the records 344 of the task usage data 342. The records 354 may also include sub-a-ERD fields 353 which correspond to the sub-a-ERD fields 346 of the records 344 of the usage task data 342. Typically, each cluster will have one or more associated tasks.

[§] 4.2.2.2 Run-time Processes

Having provided an overview of off-line processes which may be carried out in accordance with the present invention, run-time processes which may be carried out by the present invention are now introduced with reference to FIG. 3B. FIG. 3B is a diagram of exemplary processes which may be used to effect run-time functions of the present invention. The task model 352, which was generated by the off-line processes introduced above with reference to FIG. 3A, together with task help content 395, may be used by a task help process 370 and a user interface process 360 to help a user perform a task. This process 370 is described in § 4.2.3.5 below.

The task help content storage 395 may include records 396, each having a cluster ID field 397 and a task help content field 398. The task help content may be scripts, queries, executable objects, etc., designed to help a user perform a given task. The task help content field 398 may include the task help content itself or, may include an address(es) of a location(s) at which the task help content is stored.

The task model 352, together with marketing information content 390, may be used by a task based advertising process 380 to retrieve appropriate marketing information content 390 and present such content to a user via the user interface process 360. This process 380 is described in § 4.2.3.6 below.

The marketing information content storage 390 may include records 392, each having a cluster ID field 393 and a marketing information content field 394. The marketing information content may be image, audio, video, and/or text files which, when rendered, convey marketing information. The marketing information content field 394 may include the marketing information content itself or, may include an address(es) of a location(s) at which the advertising content is stored.

[§]4.2.3 Details of Processes

Having introduced the processes which the present invention may perform with reference to FIGS. 3A and 3B, details of those processes will now be presented below. First, an exemplary object log process 320' will be described in § 4.2.3.1. Then, an exemplary uniform object representation process 330' will be described in § 4.2.3.2. Thereafter, an exemplary task boundary determination process 340' will be described in § 4.2.3.3. Then, an exemplary task analysis process 350' will be described in § 4.2.3.4. Thereafter, an exemplary task help process 370' will be described in § 4.2.3.5. Finally, an exemplary task based advertising process 380' will be described in § 4.2.3.6.

[§] 4.2.3.1 Object Log Process

Recall from the description of FIG. 3A above, that the application(s) process(es) 310 may effect a computer application such as an Internet browser or a word processor for example. The application(s) process(es) 310 requests, retrieves, renders, updates, generates and/or invokes stored objects (or information) 312 in response to user inputs. The objects (or information) may be executable objects, database objects, renderable resources, etc. For example, if the application process 310 is a word processor, the stored objects 312 may be toolbar objects or menu objects for performing document editing and formatting functions, or a linear object of a stream of entered text. If the application process 310 is an Internet or Intranet browser, the stored objects 312 may be renderable resources such as hyper-text mark-up language (or "HTML") pages, joint photographic experts group (or "JPEG") encoded images, motion pictures experts group (or "MPEG") encoded video, encoded audio, etc., a structured objects of a hierarchy of an Internet web site, or a linear objects of an order of web sites visited by a user. Recall that each of the stored objects 312 should have an unique identifier, also referred to as an "object ID".

Figure 4:
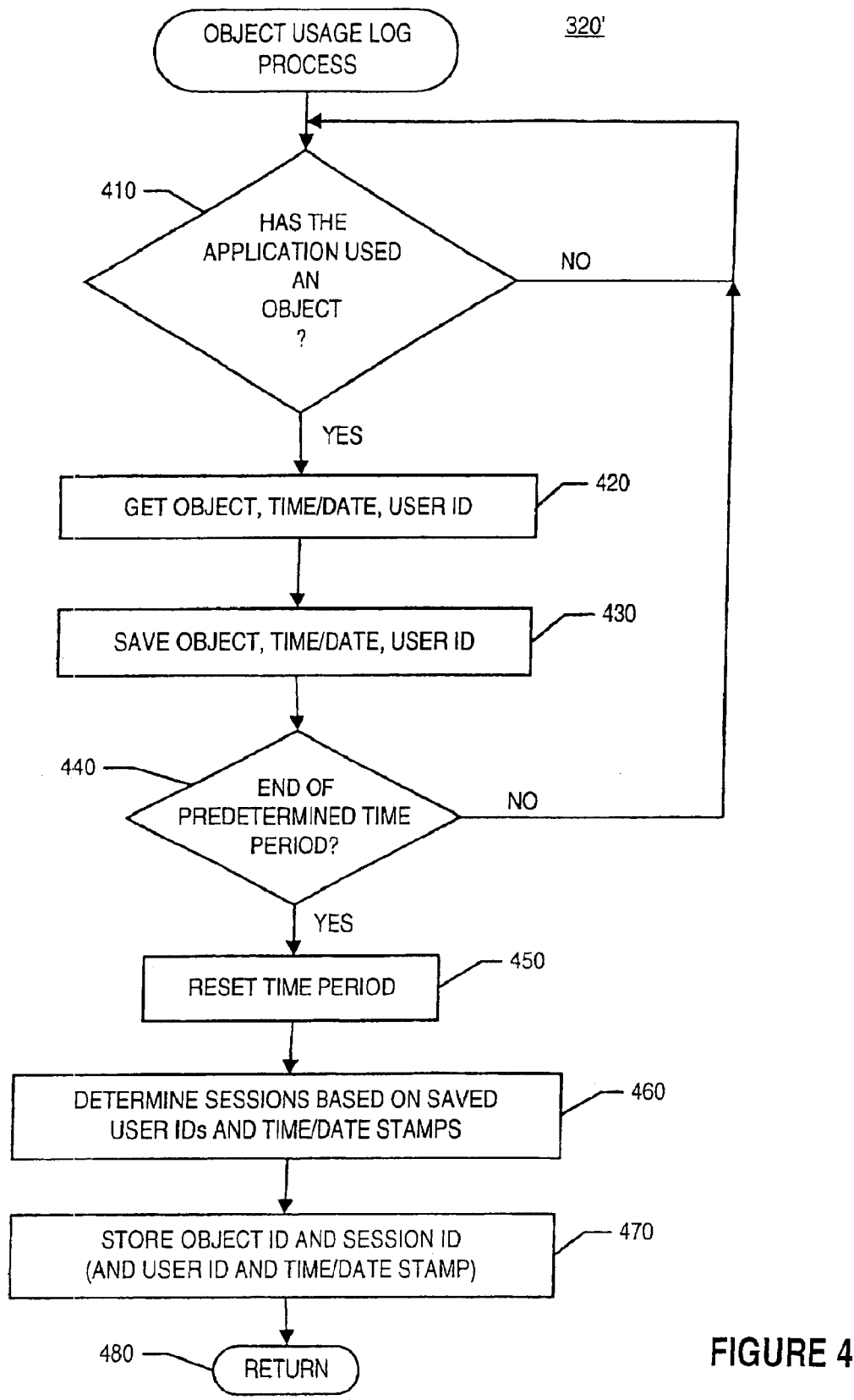
FIG. 4 is a flow diagram of an object usage log process which may be carried out by the present invention.

The object usage log process 320 creates an object usage log 322 based on stored objects used by the application(s) process(es) 310. FIG. 4 is a flow diagram of an exemplary object usage log process 320'. First, as shown in step 410, it is determined whether an application has requested, retrieved, rendered, updated, generated and/or invoked an object. If not, processing loops back such that the determination 410 is repeatedly made. If, on the other hand, it is determined that an application has requested, retrieved, rendered, updated, generated and/or invoked an object, the object ID is obtained, the time and date of the occurrence is obtained (e.g., from a system clock utility), and a user ID may be obtained (e.g., from a log in utility or application program registration utility) in step 420. However, determining and storing a user ID is not an essential step of the invention. As shown in step 430, this information is saved.

As shown in step 440, at the end of a predetermined time period since the last user input (e.g., a day, a week, etc.), the time period is reset in step 450 and sessions are determined and assigned to the object ID values based on the saved user ID values and time/date stamp values in step 460. To reiterate, a session is defined as a period of activity (e.g., by a given user, or at a given computer) followed by a period of inactivity (e.g., by the given user, or at the given computer). Next, as shown in step 470, records including object ID and session ID (and optionally user ID and time/date stamp) information are stored. Processing then continues via return node 480.

[§] 4.2.3.2 Uniform (Universal) Object Representation Process

As discussed above with reference to FIG. 3A, the system 300 may include a uniform (universal) object representation process 330. More specifically, there may be many different types of stored objects (or information). One or more different applications may use one or more types of objects.

Below, § 4.2.3.2.1 introduces different types (e.g., structured, active, and linear) objects (or information). Then, advantages of representing various type of objects (or information) in a uniform way are discussed in § 4.2.3.2.2 below. Thereafter, an exemplary architecture in which the uniform representation of the present invention, as well as the task analysis engine of the present invention, are depicted is described in § 4.2.3.2.3 below. Next, an exemplary uniform representation, namely annotated ERDs, is described in § 4.2.3.2.4 below. The ways in which various types of objects (or information) are mapped to a uniform representation is described in § 4.2.3.2.5 below. Finally, certain aspects of the uniform representation are described in § 4.2.3.2.6 below.

[§] 4.2.3.2.1 Types of Objects

Some objects, such as relational database structures, XML (Extensible Markup Language), and,RDF (Resource Description Framework), for example, may be characterized as "structured objects". More specifically, relational databases are defined by elements structured into rows and columns of tables. XML defines trees based on containment relationships (e.g., an organization contains groups, and each of the groups contains members). In general, structured objects may be characterized as information having elements arranged in a regular organization. Typical structures used in information systems are reviewed in the text: Aho et al, *Data Structures and Algorithms*.

Other objects, such as DCOM and JAVA runtime objects for example, may be characterized as "active objects". Active objects may be "objects", in the object oriented language sense of the term. That is, objects consist of code which can change the state (or variables) of the object as a result of computations performed by a computer on behalf of an application or computer user. The code of an object makes the information "active" since the execution of the code can change the state information, independently of the representation itself. Further, techniques are available (See, e.g., U.S. Pat. Nos. 5,740,439, 5,682,536, 5,689,703, and 5,581,760, each of which is incorporated herein by reference) to "expose" machine executable instructions as objects.

Still other objects, such as text documents for example, may be characterized as "linear objects." Linear objects (or information) are typified by a text stream, which is a linear arrangement of bytes. Linear information may also be encoded into a binary representation. Linear information may include in-line tags which divide the linear stream into segments. An example is a markup language, such as HTML, which inserts tags delimiting the text stream into paragraphs, font runs, and style elements.

Some objects may have more that one type. For example, HTML (Hyper-Text Markup Language) documents may include linear text, and may include hyper-text links defining a hierarchical structure.

[§] 4.2.3.2.2 Advantages of a Uniform Object (or Information) Representation

Mapping different types of objects (or information) into a uniform representation has a number of advantages. First, instead of requiring different computational processes for the different types of objects (or information), computation or inference can occur uniformly over different types of information when a uniform representation is used. The results of such a computation can then be "mapped back" into a particular type of object (or information) such that processes intrinsic to that type of object can use the results. Thus, by permitting different types of objects (or information) to be mapped to a uniform representation and a uniform representation to be mapped back to a particular type of object (or information), a wide variety of application or user information may be shared between computational processes. Such computational processes may be of uniform construction, while particular object (or information) class information (e.g., linear, active, or structured) need not be dictated to the applications or users. The task analysis methods of the present invention are examples of such computational processes.

[§] 4.2.3.2.3 Exemplary Software Architecture

Figure 5:
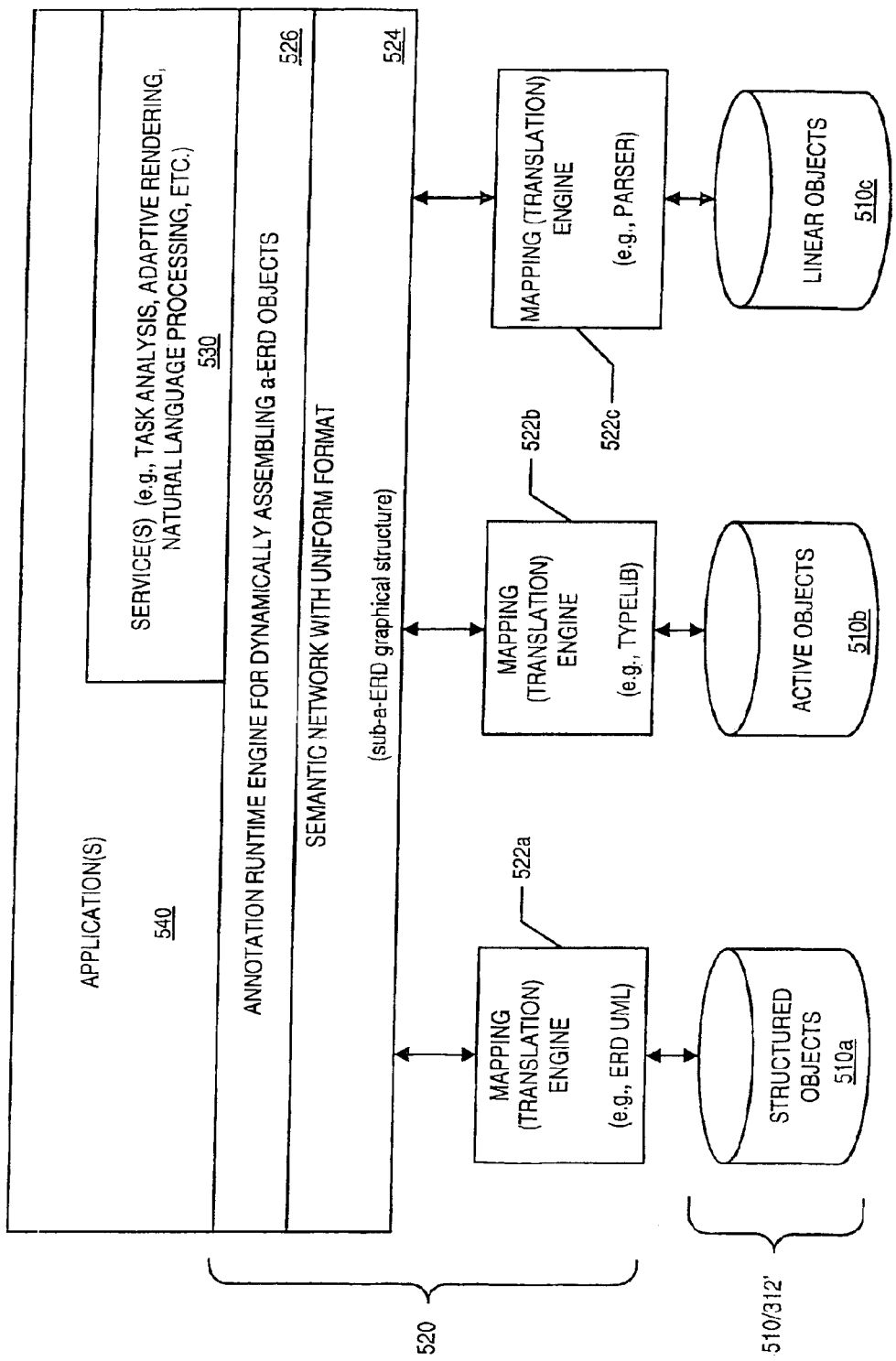
FIG. 5 is a block diagram of layers of an exemplary software architecture which may be used to effect at least a portion of the present invention.

FIG. 5 is a block diagram of an environment 500 in which an exemplary software architecture 520 permits applications 540 and services 530 to use different types of stored objects 510/312'. In this case, the stored objects (or information) 510/312' may include structured objects (or information) 510*a*, active objects 510*b*, and linear objects 510*c*. Mapping (or translation) engines 522 map the different types of objects (or information) to a uniform representation, or a uniform semantic network (or representation), in this instance, an annotated ERD (or a-ERD) to be described in more detail in § 4.2.3.2.4 below. More specifically, a translator 522*a* may be used to map structured objects (or information) 510*a* to the a-ERD format 524. For example, an ERD UML (entity relation diagram—unified modeling language) may be used to map objects having an entity relationship diagram (or ERD) structure to the a-ERD format 524. Another translator 522*b* may be used to map active objects (or information) 510*b* to the a-ERD format 524. For example, a "type library" which describes all elements of an active object or a JAVA reflection API may be used to map COMS or JAVA objects, respectively, to the a-ERD format 524. Finally, a translator 522*c* may be used to map linear objects (or information) 510*c* to the a-ERD format 524. For example, a parser 522*c* may be used to parse words found in a text document. Examples of mapping structured, linear, and active objects will be described in § 4.2.3.2.5 below. An example of the uniform representation, namely annotated ERDs is described in § 4.2.3.2.4 below.

Referring back to FIG. 5, an annotation runtime engine for dynamically assembling a-ERD formatted objects 526 may be thought of as an application program interface (or "API") over the a-ERD layer 524 for dynamically assembling a-ERD objects according to some commands. More specifically, application programs 540 may use the annotation runtime engine 526 to use a-ERD objects. In addition, some applications programs 540 may use software services 530 which use the annotation runtime engine 526 to use RDF objects. The software services may include task analysis, which is the subject of the present application, natural language processing, and adaptive rendering (See, e.g., U.S. patent application Ser. No. 08/669,781, filed on Jun. 25, 1996 and entitled ADAPTIVE RENDERING OF HYPERMEDIA DOCUMENTS, which is expressly incorporated herein by reference.).

[§] 4.2.3.2.4 Exemplary Uniform Relationship (Annotated ERDs)

In the following, an annotated ERD representation of objects (or information) is described. First, an overview of the known ERD semantic representation of databased data is presented in § 4.2.3.2.4.1. Then, a description of the annotated ERD representation, as well as some of its properties, is described in § 4.2.3.2.4.2.

[§] 4.2.3.2.4.1 ERDs

To reiterate, the a-ERD (or annotated-Entity Relationship Diagram) format 524 provides a uniform way to gather and use different types of objects. The a-ERD 524 has a "vocabulary" and a "syntax". The a-ERD vocabulary is defined by symbols. The a-ERD syntax defines rules for expressing objects as a graph structured in the a-ERD format. Basically, the a-ERD format 524 uses a sub-a-ERD (or "sub-graph or an annotated-entity relation diagram") structure to express objects. Although ERDs are known to those skilled in the art, they are discussed below for the readers' convenience.

ERDs provide a semantic model of data in a database. Semantic modeling permits a database to (i) respond more intelligently to user interactions, and (ii) support more sophisticated user interfaces. ERDs were introduced in the paper, Peter Pin-Shan Chen, "The Entity Relationship Model-Toward a Unified View of Data," *International Conference on Very Large Data Bases*, Framingham, Mass., (Sep. 22–24, 1975), reprinted in *Readings in Database Systems, Second Edition*, pp. 741–754, edited by in Michael Stonebraker, Morgan Kaufmann Publishers, Inc., San Francisco, Calif. (1994) (hereafter referred to as "the Chen paper").

Basically, the Chen paper defines an "entity" as a thing that can be distinctly identified. A "weak entity" is defined as an entity whose existence depends on some other entity. An entity may have a "property" or an "attribute" which draws its value from a corresponding value set. A "relationship" is an association among entities. Entities involved in a given relationship are "participants" in that relationship. The number of participating entities in a relationship defines the "degree" of the relationship. In entity relationship diagrams, entities are depicted with rectangles, properties are depicted with ellipses, and relationships are depicted with diamonds.

Figure 6A:
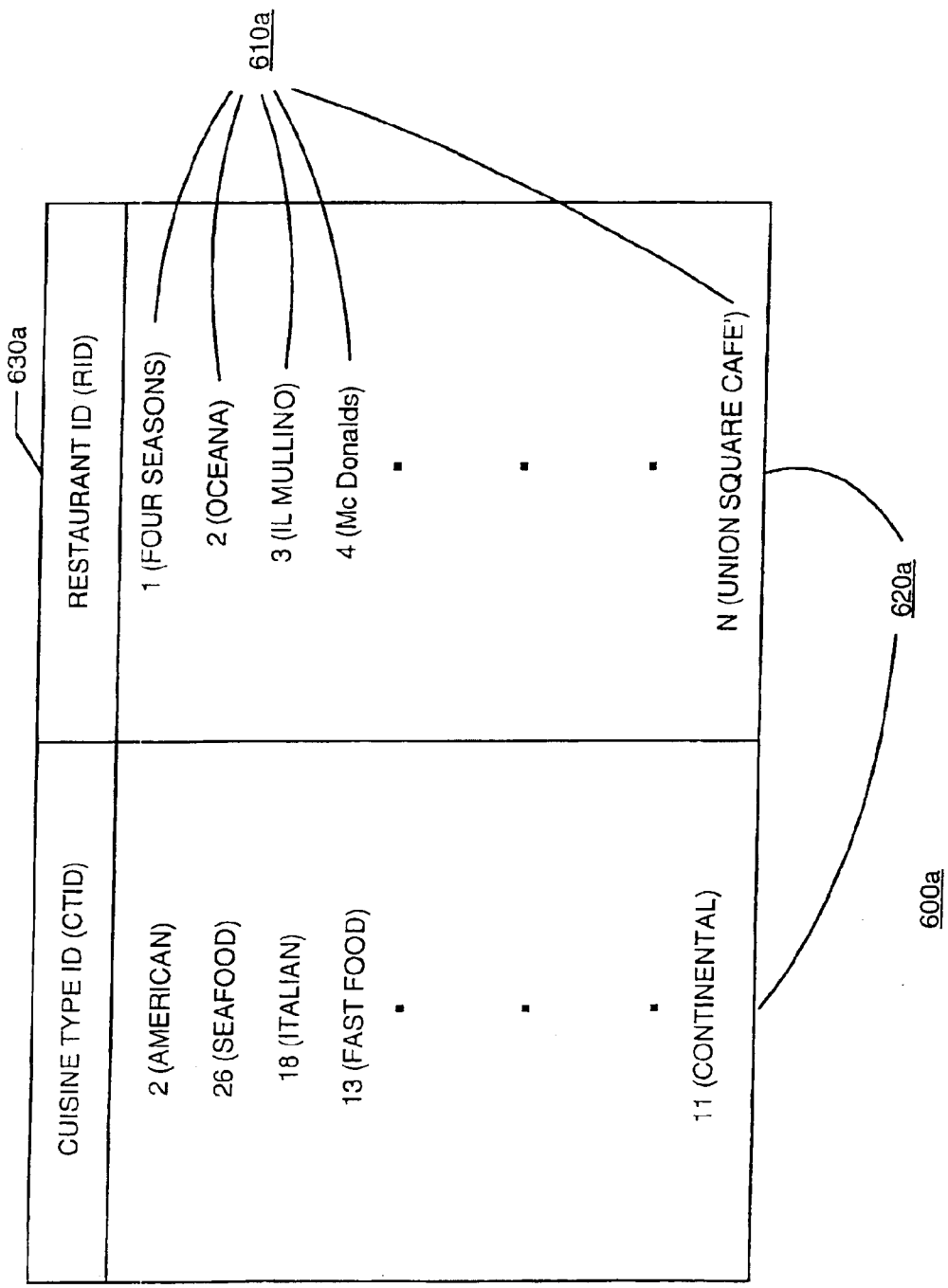
FIGS. 6A and 6B are tables which depict examples of relations of relational databases.
Figure 6B:
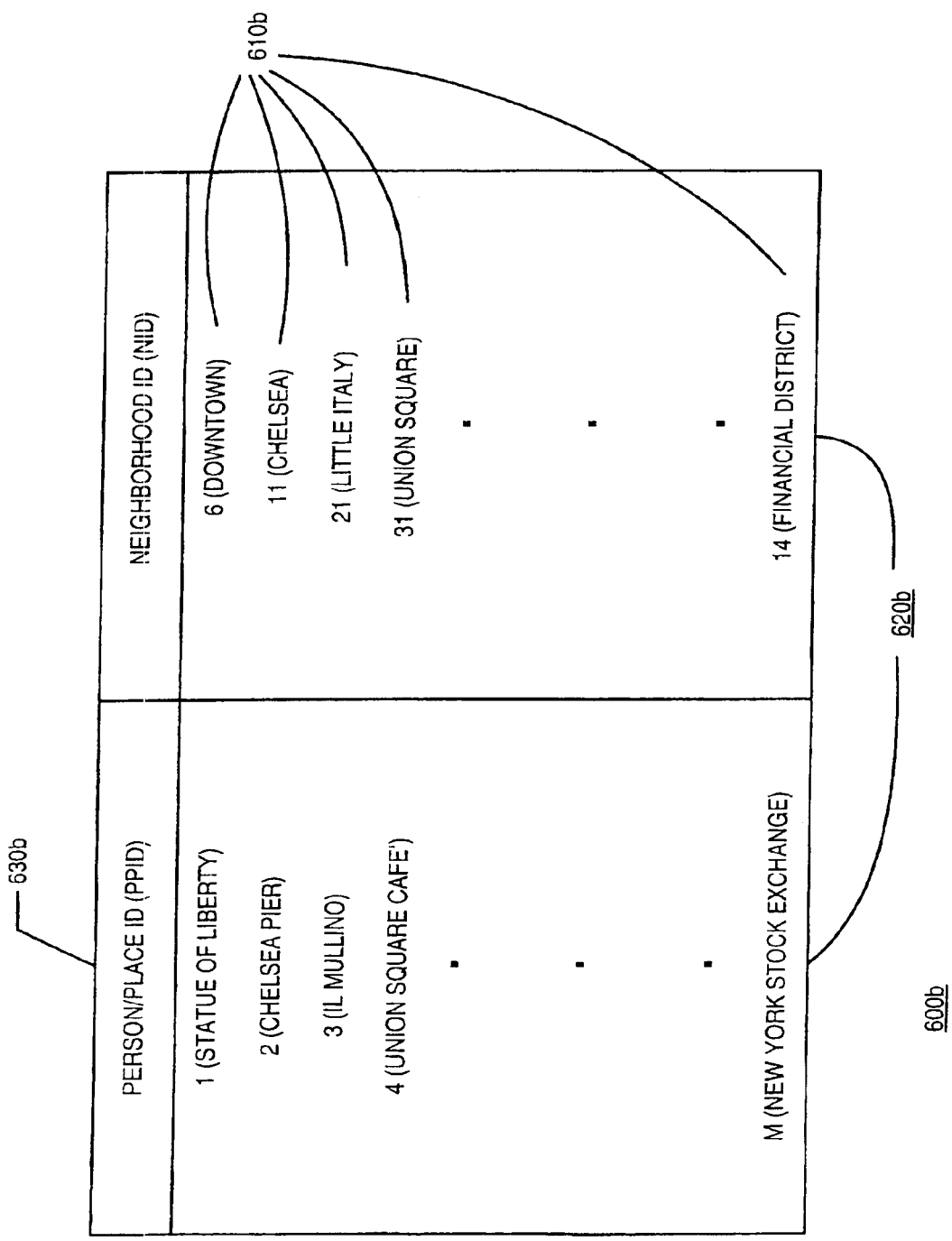
Figure 7B:
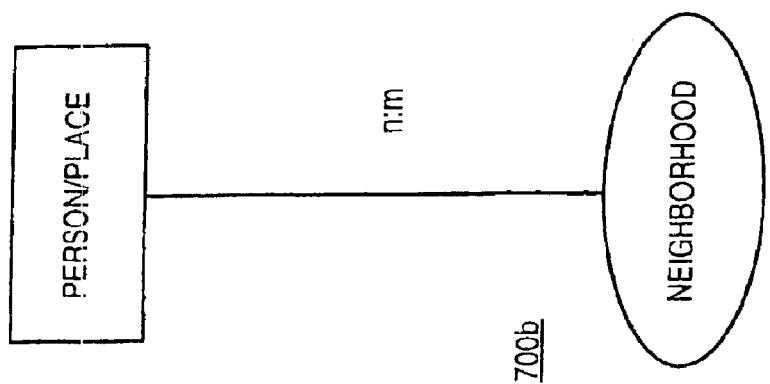
FIGS. 7A and 7B are exemplary entity relation diagrams (or "ERDs") of the relations of FIGS. 6A and 6B, respectively.
Figure 7A:
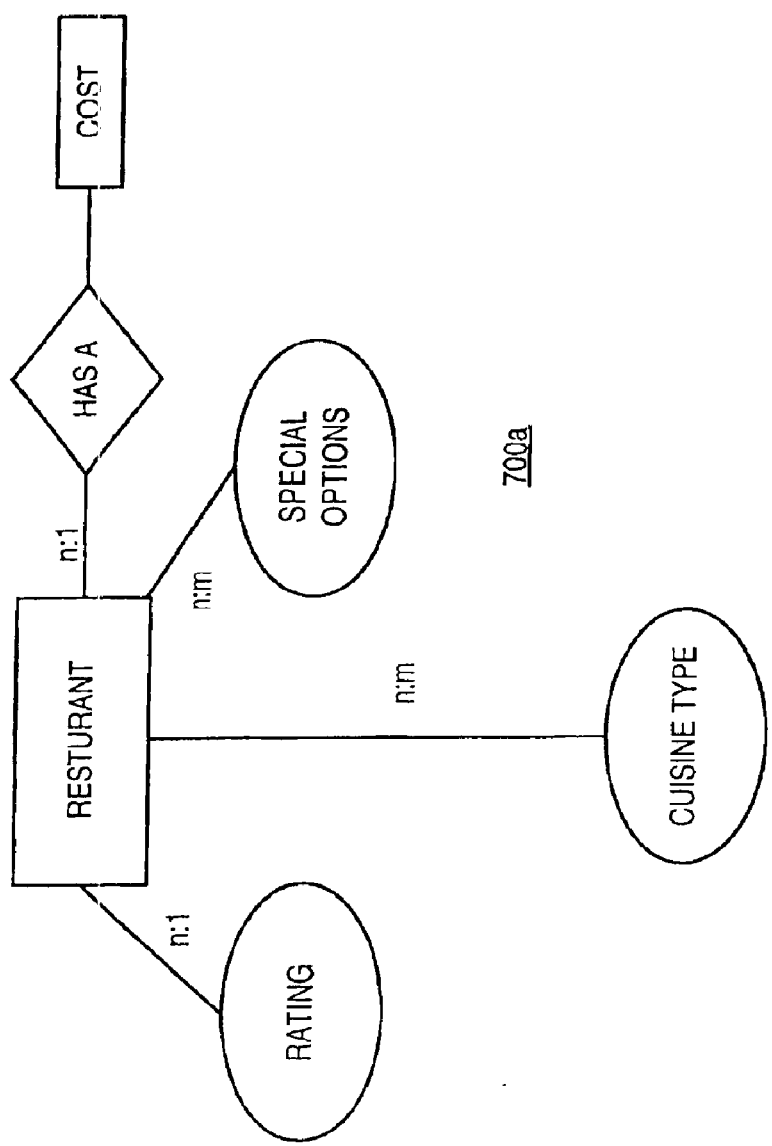
Figure 9A:
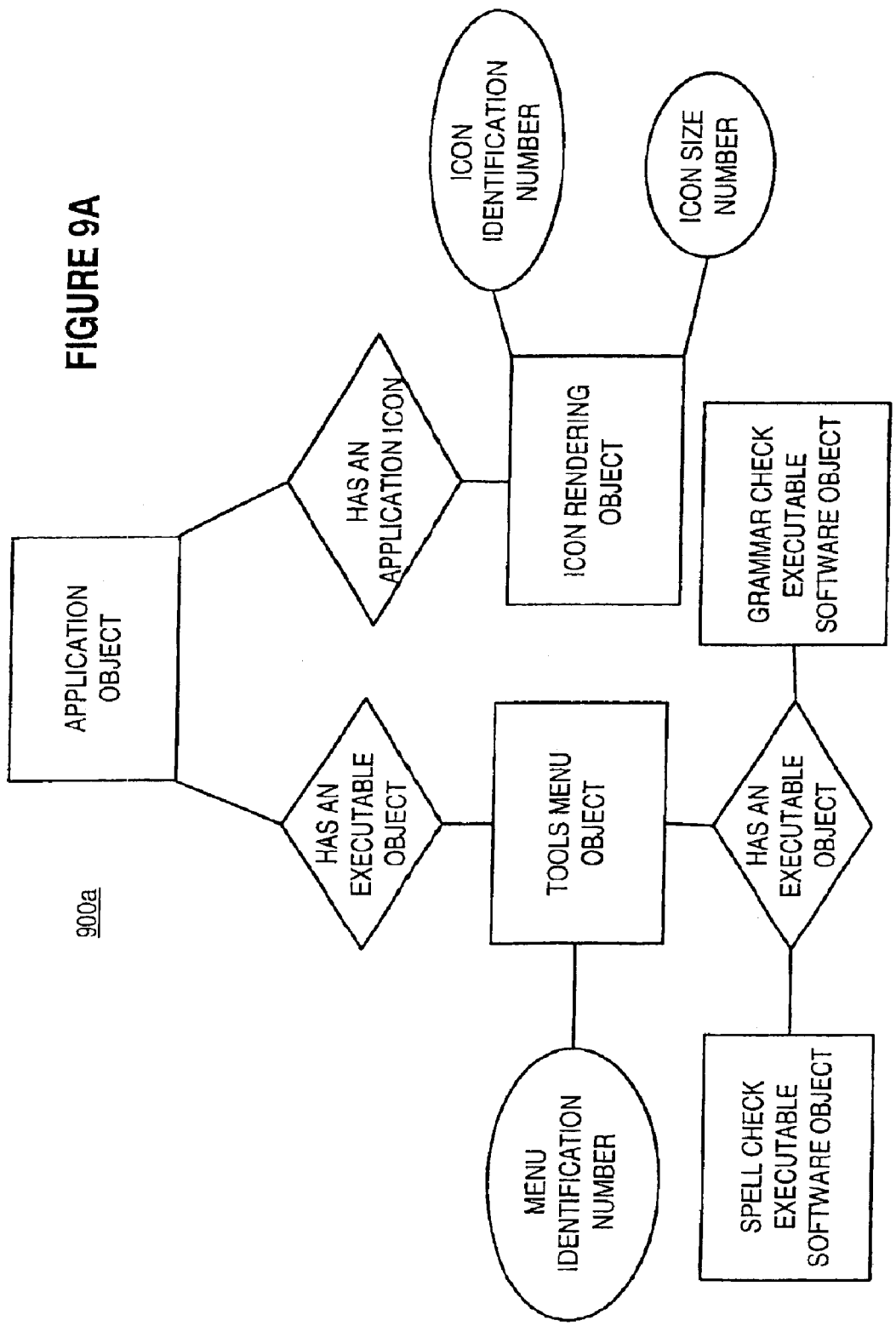
FIG. 9A is an exemplary entity relation diagram.

Exemplary entity relationship diagrams are shown in FIGS. 7A, 7B, and 9A. Before describing these diagrams, a brief overview of the relational model of database design is presented here with reference to FIGS. 6A and 6B. FIG. 6A depicts a relational model of a database which relates a cuisine type identifier(s) (or "CTID") to a restaurant identifier (or "RID"). FIG. 6B depicts a relational model of a database which relates a person/place identifier ("PPID") to a neighborhood(s) identifier (or "NID"). In the relational database vernacular, the table 600a/600b is referred to as the "relation", each row (or record) 610a/610b of the relation 600a/600b is referred to as a "tuple", the number of tuples 610a/610b in the relation 600a/600b is referred to as the "cardinality" of the relation 600a/600b, each column (or field) 620a/620b of the relation 600a/600b is referred to as an "attribute" of the relation 600a/600b, and the number of attributes 620a/620b of the relation 600a/600b is referred to as the "degree" of the relation 600a/600b. A "primary key" 630a/630b is a unique identifier for the relation. Basically, the primary key may be one or more attributes for which no two (2) tuples (or records) have the same value. The degree of the relation will not change with time, though the cardinality of the relation may change with time as tuples (or records) are added and/or deleted. The cardinality of the relation 600a is "N" and the cardinality of the relation 600b is "M". Finally, a domain is a pool of legal values, excluding the "null" value, from which one or more attributes draw their actual values.

In the relation 600a, a restaurant ID number is associated with a particular restaurant and the cuisine type ID number is associated with a particular cuisine type. For example, restaurant ID number 4 corresponds to McDonalds. The following table lists exemplary cuisine types and associated ID numbers.

| CUISINE TYPE ID NUMBER | CUISINE TYPE |
|---|---|
| 1 | African, Ethiopian, Morocan |
| 2 | American |
| 3 | Asian |
| 4 | Bar Food, Sandwiches, Hamburgers |
| 5 | Barbecue, Ribs |
| 6 | Bistro |
| 7 | Diners, Cafés, Coffee Bars |
| 8 | Cajun, Creole |
| 9 | Caribbean, Latin American |
| 10 | Chinese |
| 11 | Continental, Belgian |
| 12 | Eclectic |
| 13 | Fast Food, Deli |
| 14 | French |
| 15 | German, Irish, English |
| 16 | Greek, Mediterranean, Turkish |
| 17 | Indian, Pakistani, Afghan |
| 18 | Italian |
| 19 | Japanese, Sushi |
| 20 | Kosher |
| 21 | Mexican, Southwestern |
| 22 | Middle Eastern |
| 23 | New American |
| 24 | Pizza |
| 25 | Russian, Eastern European |
| 26 | Seafood |
| 27 | Southern, Soul Food |
| 28 | Spanish, Portuguese |
| 29 | Steak |
| 30 | Vegetarian, Organic |

Although not shown in the relations, each restaurant may have other attributes such as a star rating (e.g., *, , *, **, or ***), a cost rating (e.g., $, $$, $$$, $$$$, or $$$$$) and special options (e.g., Good Deal, Child Friendly, New, Romantic, 24-Hour, Afternoon Tea, Brunch, Delivery, Late Night, Live Entertainment, Noteworthy Wine List, Outdoor Seating, Pre-Theater Menu, Prix Fixe, Smoke Free, Smoke Friendly, View, etc.)

In the relation 600b, a neighborhood ID number is associated with a particular neighborhood and the person/place ID number is associated with a person or place. For example, neighborhood ID number 14 corresponds to the "Financial District" neighborhood of New York City. The following table lists exemplary New York City neighborhoods and associated ID numbers.

| NEIGHBORHOOD ID NUMBER | NEW YORK CITY NEIGHBORHOOD |
|---|---|
| 1 | Manhattan |
| 2 | Brooklyn |
| 3 | Bronx |
| 4 | Queens |
| 5 | Staten Island |
| 6 | Downtown |
| 7 | Midtown |
| 8 | Upper East Side |
| 9 | Upper West Side |
| 10 | Battery Park City |
| 11 | Chelsea |
| 12 | Chinatown |
| 13 | East Village |
| 14 | Financial District |
| 15 | Flatiron |
| 16 | Garment District |
| 17 | Gramercy Park |
| 18 | Greenwich Village |
| 19 | Harlem |

-continued

| NEIGHBORHOOD ID NUMBER | NEW YORK CITY NEIGHBORHOOD |
| --- | --- |
| 20 | Hell's Kitchen |
| 21 | Little Italy |
| 22 | Lower East Side |
| 23 | Midtown East |
| 24 | Midtown West |
| 25 | Morningside Heights |
| 26 | Murray Hill |
| 27 | NoHo |
| 28 | SoHo |
| 29 | Theater District |
| 30 | TriBeCa |
| 31 | Union Square |
| 32 | West Village |

FIG. 7A depicts an exemplary entity relationship diagram 700a of a restaurant database. As shown, the "restaurant" entity has "rating", "cuisine type" and "special option" attributes or properties. As denoted by the "n:1" between the restaurant entity and its rating attribute, each restaurant has only one rating, though more than one restaurant may have the same rating. As denoted by the "n:m" between the restaurant entity and its cuisine type attribute, each restaurant may have more than one cuisine type, and more than one restaurant may offer the same cuisine type. Similarly, as denoted by the "n:m" between the restaurant entity and its special options attribute, each restaurant may have more than one special option, and more than one restaurant may have the same special option. Further, as shown in FIG. 7A, the restaurant and cost entities are participants in a has a" relationship. As depicted by the "n:1" of the "has a" relationship, each restaurant has only one cost, but more than one restaurant may have the same cost.

FIG. 7B depicts an exemplary entity relationship diagram 700a of a neighborhood database. As shown, the "person/place" entity has a "neighborhood" attribute or property. As denoted by the "n:m" between the person/place entity and its neighborhood attribute, each person/place may have more than one neighborhood, and more than one person/place may be in the same neighborhood. For example, there may be many McDonalds restaurants throughout various neighborhoods in New York City.

Executable software objects may also be expressed in a computer program application relation. For example, referring to FIG. 9A, an application object entity and an icon rendering object entity are participants in a "has an application icon" relation. The icon rendering object entity has icon identification number and icon size number attributes or properties. The application object entity and the tools menu object entity are participants in a "has an executable object" relation. The tools menu object entity has a menu identification number attribute or property, and along with a spell check executable software object entity and a grammar check executable software object entity, is a participant in a "has an executable object" relation.

[§] 4.2.3.2.4.2 Annotated ERDs

One problem with the entity relationship diagram model of database design is that it is subjective, as is apparent from the entity relationship diagrams depicted in FIGS. 7A, 7B, and 9A. The Chen paper concedes that different people may view the same thing as either an entity or a relationship. The Chen paper leaves it to the enterprise administrator to define what are entities and what are relationships so that the distinction is suitable in their environment. (See the Chen paper at page 741, note 1.) This subjectivity of ERDs has been criticized. (See, e.g., C. J. Date, *An Introduction to Database Systems: Volume* 1, (Fifth ed.), pps. 607–8, Addison-Wesley Publishing Company, Inc. (1990) (hereafter referred to as "the Date text").

The a-ERD structure of the resource description format 524 removes such subjectivity from semantic representations of data (or objects). For example, in an ERD, a restaurant entity may have a cuisine type property. On the other hand, in an a-ERD, a restaurant entity may participate in a "has a" relationship with a cuisine type entity, and the cuisine type entity may participate in an "is served at" relationship with a restaurant entity. Basically, the a-ERD structure functions to (i) convert all attributes to entities by means of a "has a" relation, for example, (ii) permit relationships on relationships (e.g., a "location of" is an "attribute of") or "n-arym relationships, (iii) annotate the relations with text, and (iv) permit computed relationships. Each of these functions will be discussed below.

Thus, the annotated ERD uniform representation may be thought of as a collection of "elements". Each element may have an (i) optional "label" which names the element (and may be non-unique), (ii) an optional "identifier" which uniquely identifies the element, and (iii) an optional value.

In the ERD vernacular, an element is either an entity or a relation. (See; e.g., FIG. 44A.) A relation connects two (2) ordered elements (each of which may be an entity or a relation). Since elements participating in a relation are ordered, a relation from element A to element B is distinct from a relation from element B to element A (though, as discussed below, there may be bi-directional relations). (See, e.g., FIGS. 44B and 44C.) An entity is an element that can optionally "contain" other elements (i.e., any combination of entity or relation). An entity that "contains" one or more elements may be referred to as a "container." (See, e.g., element 4404' of FIG. 44C.)

An a-ERD representation may be expressed in two (2) ways—as a list of predicates or as a directed hypergraph. For example, FIG. 31 illustrates the information "Mary ate the tasty cake" as a directed hypergraph 3100. A "time of" relation 3195 relates an "event" entity 3110 and a "past" entity 3190. The "event" entity 3110 is a container which contains Mary 3114, agent 3116, eat 3112, patient 3118, cake 3120, attribute 3122 and tasty 3124 elements. The agent relation 3116 relates the eat entity 3112 to the Mary entity 3114. The patient relation 3118 relates the eat entity 3112 to the cake entity 3120. Finally, the attribute relation 3122 relates the cake entity 3120 to the tasty entity 3124. FIG. 32 illustrates the same information as a list of predicates 3200. These two expressions 3100 and 3200 of the uniform representation permit computational engines to use well-studied, as well as newly developed, algorithms in graph theory and predicate logic to efficiently infer and compute.

[§] 4.2.3.2.5 Mapping Various Types of Objects (or Information) to a Uniform Representation As mentioned above, various types of objects (or information) may be mapped to a uniform representation. Examples of such mapping processes are presented below.

Tabular, graph, or hierarchical (e.g., tree) structures can all be mapped to a graph. First, as shown in FIGS. 33A and 33B, a graph 3310 can be mapped directly to a hypergraph 3320 representation. Note that the entity elements 3312 of the graph 3300 correspond directly to the nodes 3322 of the hypergraph 3320 and that the relation elements 3314 of the graph 3300 correspond directly to the directed arcs 3324 of the hypergraph 3320.

As shown in FIGS. 34A and 34B, a hierarchical tree structure 3410 can be mapped to a hypergraph representation 3450. The entries 3412 of the tree 3410 correspond directly to the nodes 3452 of the hypergraph 3450. The structure of the tree 3410 is reflected in the arcs of the hypergraph 3450 labeled "parent/child". In this example, a "manages/reports-to" relation may be used instead of the more general "parent/child" relation. As discussed above, examples of tree structures include XML (eXteneded Markup Language), organizational charts, and binary trees.

Finally, as shown in FIGS. 35A and 35B, a tabular structure 3510 can be mapped to a hypergraph representation 3550. A table entity (or node) 3552 of the hypergraph is related to row entities (or nodes) 3554 and column entities 3556. The row and column entities (or nodes) 3554 and 3556, respectively, are related to values from the table 3510.

Tables of a relational database may be mapped to a hypergraph as follows. First, regarding the conversion of all attributes to entities, recall that in FIG. 7A, the restaurant entity has rating, cuisine type, and special options attributes or properties. FIG. 8A depicts an a-ERD 800a derived from the ERD 700a. As shown, in the a-ERD 800a, the rating and cuisine type attributes are now entities which participate in a "has a" relationship with the restaurant entity. Similarly, in the a-ERD 800a, the special options attribute is now an entity which participates in an "offers" relationship with the restaurant entity.

Similarly, recall that in the ERD 700b of FIG. 7B, the person/place entity has a neighborhood attribute or property. However, in the a-ERD 800b of FIG. 8B, neighborhood is now an entity which participates in a "is in a" relationship with the person/place entity.

Finally, recall that in the ERD 900a of FIG. 9A, the tools menu object entity had a menu identification number attribute or property, and the icon rendering object entity had an icon identification number and an icon size number attributes or properties. However, in the a-ERD 900b of FIG. 9B, the icon size number and icon identification number attributes are now entities which participate in a "has a" relationship with the icon rendering object entity. Finally, the menu identification number attribute is now an entity which participates in a "has a" relationship with the tools menu object entity.

Figure 8B:
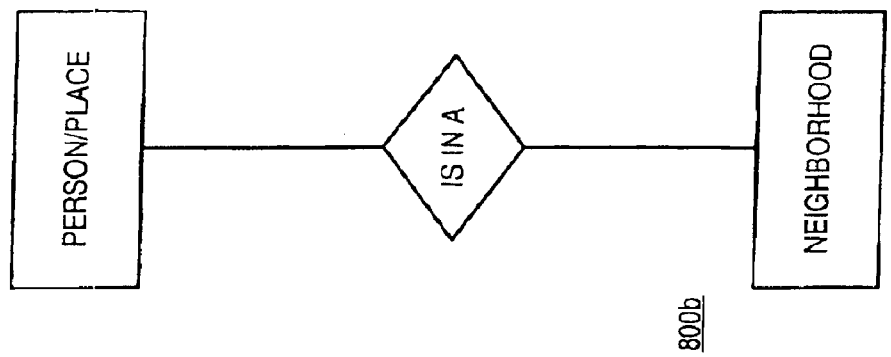
FIGS. 8A and 8B are annotated-entity relation diagrams (or "a-ERDs") derived from the entity relation diagrams of FIGS. 7A and 7B, respectively, in accordance with the present invention.
Figure 8A:
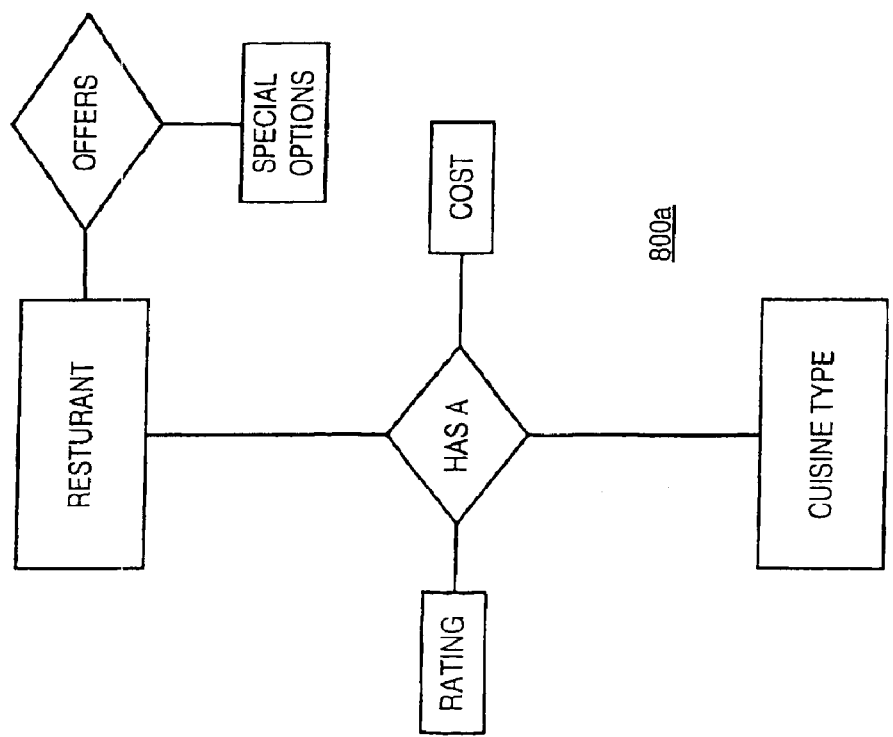
Figure 9B:
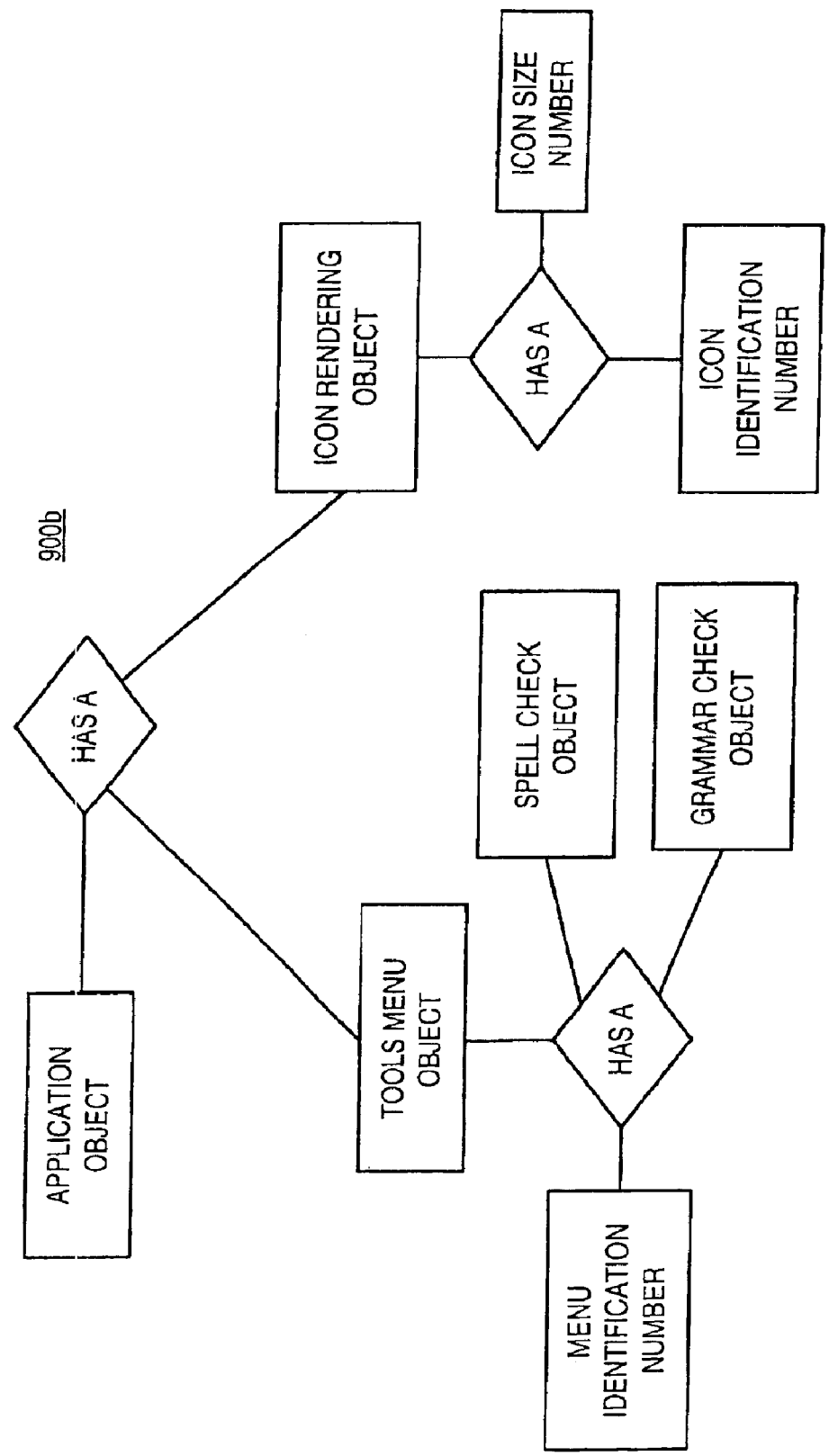
FIG. 9B is an annotated-entity relation diagram derived from the entity relation diagram of FIG. 9A, in accordance with the present invention.
Figure 10:
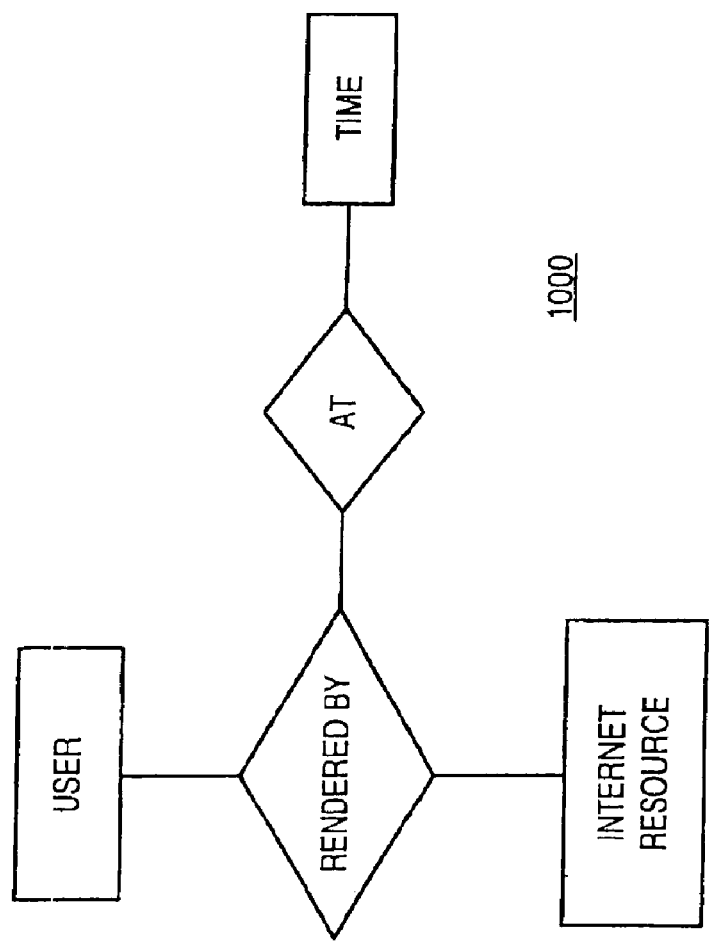
FIG. 10 depicts an annotated-entity relationship diagram in which a relationship participates in a relationship with an entity.

Although the a-ERD format 526 was described with reference to graphs in FIGS. 8A, 8B, and 9B, the resource description format is a textual predicate—it is not graphed. (Recall, e.g., FIG. 32.) Thus, for example, the a-ERD of FIG. 10 may be represented as:

rendered by, at (internet resource, user, time)

where the entities are provided in parenthesis and the relationships precede the entities. Similarly, the a-ERD of FIG. 8A may be represented as:

offers (restaurant, special options), has a (restaurant, rating/cost/cuisine type)

and the a-ERD of FIG. 8B may be represented as:

is in a (person/place, neighborhood).

Each application process 310 may be represented by a full a-ERD. If, for example, the application is a word processor, the a-ERD may denote the relationship(s) among (executable software) "object" entities. If, on the other hand, the application is a resource browser, the a-ERD may denote the relationship(s) among databased resources.

Linear objects (or information) may be mapped to a hypergraph representation by providing a "precedes" or "follows" relationship, or a "preceeds/follows" bi-directional relationship between pieces (e.g., words) of the linear information. For example, referring to FIG. 36, the linear object (or information) "one, two, three" may be mapped to the hypergraph representation in which entities, corresponding to the pieces (e.g., words) are related to one another by "preceeds/follows" relations. Once again, an equivalent textual predicate list may be used instead of a directed hypergraph.

Finally, active objects (or information) may be mapped to a hypergraph representation. In the following description, two (2) types of active objects (or information) are considered. The first type is an object with both properties (or variables) and methods. The second type is an object with methods but no properties (or variables), also referred to as code.

The first type of active object, that is, one with both properties (or variables) and methods, may be mapped to a hypergraph representation as follows. First, an entity is created for each property (or variable) of the object, as well as for the object itself. Then relations that relate the property (or variable) entities to the object entity are created. For example, referring to FIGS. 37A and 37B, an object 3710 called "person" has "name" and "birthday" properties. As shown in FIG. 37b, the object and its properties are represented as related entities. Next, methods associated with any of the properties (i.e., methods that "set" or "get" a property) are mapped through the same entity. Thus, when a process accesses an entity in the representation, the object's "get" method is invoked for the corresponding property. When the process writes information into an entity, the object's "set" method is invoked for the corresponding property. Likewise, when the property of an object is called programmatically, the representation is updated with appropriate values of the property. For example, referring to FIGS. 37A and 37B, the "person" object 3710 has a "card-reminder" method that "gets" a "name" property. This is depicted in the hypergraph by the "card-reminder" entity and the "name" entity having a "get" relation.

For the second type of active object, that is, object methods with no corresponding properties (or variables), each method is mapped to a set to a set of entities that represent input and output parameters of the method. Appropriate relations are created between such entities. Finally, a container (or parameter list) is built for all of the entities. For example, referring again to FIGS. 37A and 37B, the "age" and "change-password" methods have no corresponding properties. As shown in the hypergraph representation, the "age" and "change-password" methods are depicted as entities, each related to a "parameter list" (or container) entity. The "parameter list" entities are related to entities corresponding to parameters of the method (i.e., "old password", "new password" and "age") via "contains" relations. Once again, an equivalent textual predicate list may be used instead of a directed hypergraph.

Note that all properties (or variables) and methods of an object need not be mapped to the uniform representation. For example, referring to FIGS. 38A and 38B, a person object 3800 from an address book application is mapped to a uniform representation. Note that the "full name" property is not mapped to the hypergraph representation. (It is not needed since it is redundant to the "given name" property.) Further, the "password" property is not mapped. (The application is not interested in sharing, via the uniform representation, that property with outer applications or computational processes.)

Note that mapping objects (or information) to the uniform representation may result in inefficient representations. For example, referring back to FIG. 36, a linear stream can increase significantly in size when mapped to the uniform hypergraph representation. Similarly, referring back to FIGS. 35A and 35B, a table can increase quite significantly in size when mapped to the uniform hypergraph. However, the uniform representation may be compressed. For example, referring to FIG. 39, the uniform hypergraph representation of the linear object found in FIG. 36 may be compressed to two related entities. Referring to FIG. 40, the uniform hypergraph representation of the table object found in FIG. 35B may be compressed to dimension, schema (e.g., column name) and data entities all related to a table entity.

FIG. 45 is a flow diagram of an exemplary process 330' for mapping various types of objects (or information) to the uniform representation. As shown in decision step 4510 and step 4515, if the object is a database (or an ERD of a database), all attributes are converted to entities using a "has a" relation. (Recall, e.g., FIGS. 8A, 8B, and 9B.) As shown in decision step 4520 and step 4525, if the object has a hierarchical structure, then a directed hypergraph or predicate list in which information entities are related via "parent/child" relations is generated. (Recall, e.g., FIGS. 34A and 34B.) As shown in decision step 4530 and step 4535, if the object has a tabular structure, then a directed hypergraph or predicate list in which a table entity contains column name entities and row number entities and in which the column name and row number entities are related with information entities via "contain" relations is generated. (Recall, e.g., FIGS. 35A and 35B.) Recall that this structure may be compressed as was illustrated with reference to FIG. 40 above. As shown in decision step 4540 and step 4545, if the object has a linear structure, then a directed hypergraph or predicate list in which information entities are related to one another via "preceeds/follows" relations is generated. (Recall, e.g., FIG. 36.) Recall that this structure may be compressed as was illustrated with reference to FIG. 39 above. Finally, as shown in decision step 4550 and step 4555, if the object is an active object (i.e., has methods and perhaps properties), then a directed hypergraph or predicate list in which: (i) the object name is an entity which is related to entities corresponding to properties (or variables) of the object; (ii) the entities corresponding to the properties (or variables) of the object are related to entities corresponding to methods that "get" or "set" those properties (or variables); (iii) the entity corresponding to the object name is related to entities corresponding to methods of the object; and (iv) each of the entities corresponding to methods of the object is related to a parameter list entity which has a "contains" relation to the parameters used or determined by the method, is generated. (Recall, e.g., FIGS. 37A and 37B.)

[§] 4.2.3.2.6 Other Aspects of the Uniform Representation

The uniform representation of the present invention can also handle intentional and extensional definitions. As shown in FIG. 41, intentional definitions are created by attaching code (active information) 4120 to predicates and supporting logic symbols 4110. Line 4130 is an example which illustrates and extensional definition.

The uniform representation of the present invention can also handle incremental attribution. That is, the uniform representation has been designed with the understanding that knowledge in the representation may be incomplete. For example, statements (or code) such as:

marriage(A,B)^husband(A)^wife(B)

may be made by later attributed as a "heterosexual marriage" as opposed to a "homosexual marriage" as circumstances (e.g., laws) or applications change. This can be done through a contextual containment, that is, using containment as a context. More specifically, under certain contexts, the original statement is still valid, though it may be incorrect or incomplete. For example, if Hawaii recognizes homosexual marriages, the following statement (or code):

context-of(marriage(a,b)^partner(a)^partner(b), Hawaii)

is appropriate. The same mapping techniques described above may be used to map between contexts.

The uniform representation of the present invention can handle ambiguity. Many predicate logic based systems, such as deductive databases or deductive object oriented databases for example, require logical consistency in the database. Thus, for example, in such applications, facts such as "color(A, Red)" and "color(A, Blue)" can't exist in the database if only one color is permitted for A. In particular, this will result in both of the following to be true: color(A, Red) and color(A, ~Red) (where ~ is the logical NOT), which is a logical contradiction. The uniform representation of the present invention does not constrain knowledge to a particular logical formalism. Accordingly, both predicates may be simultaneously represented, notwithstanding the fact that they may define a logical contradiction. It is left to other computational processing to disambiguate these statements, possibly by searching for other contextual information (as illustrated below), or waiting for additional attribution as noted above (as illustrated below). For example, referring to FIGS. 42A through 42C, note that in FIG. 42A, a truck entity is permitted to have two, seemingly contracting, colors—red and blue. However, as shown in FIG. 42B, additional attribution resolves the seeming contraction. That is, the truck had color red before Mar. 1, 1998, and had color blue after Mar. 1, 1998. (It was possibly painted on Mar. 1, 1998.) FIG. 42C illustrates both additional attribution and contextual information. That is, Tom said before Mar. 1, 1998, that the truck is red and after Mar. 1, 1998, that the truck is blue. Nancy said before Mar. 1, 1998, that the truck is red and after Mar. 1, 1998, the truck is green. It is noted that Tom is color blind. Thus, for example, it is left for an application using the information from the uniform representation of the present invention to discount Tom's statements of color.

The uniform representation of the present invention handles multiple attribution. Since the uniform representation of the present invention handles ambiguity, incremental attribution, and multiple contexts, as described above, different applications with different "points of view" can add their attributes into the uniform representation. For example, referring to FIG. 43, different applications may be concerned with different things about Tom. Thus, a medical application may be concerned with the fact that Tom is color blind. A personal address book application may be concerned with the fact that Tom is a friend that lives at an address. Finally, a human resources application may be concerned with the fact that Tom was hired on Jul. 1, 1992, is a senior manager, and has an address. As in the example of FIG. 43, sometimes the attributes do not conflict. However, attributes may conflict, as noted above. However, to reiterate, mapping and contexts may be used to disambiguate them.

The a-ERD format permits relations on relations. Referring, for example, the a-ERD of FIG. 10, an Internet resource entity participates in a "rendered by" relationship with a user entity, and the "rendered by" relationship participates in an "at" relationship with a time entity. That is, a user rendered an Internet resource at a time.

The a-ERD format 524, the relationships are annotated with text using the vocabulary of the a-ERD format (e.g., "has a", "is a", "belongs to", etc.). Basically, in ERDS, the text is typically for use by humans when designing a database or database application—the database or database application itself does not use the text. This is not the case with the a-ERD format.

The a-ERD format 524 permits computed relations. For example, referring to FIG. 6B, a restaurant may be within a number of overlapping neighborhoods in New York City. In this instance, for example, Il Mulino is within the Little Italy, Downtown, and Manhattan neighborhoods of New York City. Rather than have a separate "within" relationship for each of these overlapping neighborhoods, since Little Italy is always within Downtown Manhattan, and since Little Italy and Downtown Manhattan are always within Manhattan, the Il Mulino restaurant will only have a "within" relationship with the Little Italy neighborhood. The fact that the Il Mulino restaurant is also within downtown and Manhattan can be computed. In anther example, distances between person/place entities would be calculated as needed, rather than predetermined for each case.

The foregoing features enable the uniform representation of the present invention to handle real world cases of natural language query, where users make ambiguous statements in context, as well as applications having different "world views". More formal representation systems are useful for very specific reasoning, but are too fragile for real world use.

Another uniform object format is Unified Modeling Language (or "UML") which is used by Repository from Microsoft Corporation of Redmond Washington, Yet another uniform object format is Meta Content Format (or "MCF") from Apple Computer of Cupertino, Calif.

[§] 4.2.3.3 Task Boundary Determination Process

Having described exemplary object log 320 and uniform representation 330 processes, exemplary task boundary determination processes 340 are now presented. Recall that the object log process defined sessions based on, for example, a period of activity followed by a period of inactivity. However, a user or users may perform more than one task in a given session or may perform only one task over a number of sessions. Thus, task boundaries should be defined. Defining task boundaries is not necessary, but it is believed that modeling task boundaries is far easier than modeling the tasks themselves. Naturally, the task boundary model used may introduce artifacts in the task analysis process.

There are a number of ways that task boundaries may be defined, some examples of which are presented below. Initially, simple, less sophisticated task boundary definition models are presented. Then, more sophisticated models are discussed.

In a first method for defining task boundaries, a task boundary is defined after an arbitrary number of user interactions. The arbitrary number may be stored as a task boundary model parameter 349. Although this model is easy to implement, it would produce a number of arbitrary boundaries assuming that different tasks require different numbers of steps by the user.

In a second method for defining task boundaries, each of a number of sub-a-ERDs are defined to correspond to a given task. A task boundary is defined whenever two consecutive user interactions use different sub-a-ERDs. The sub-a-ERDs may be stored as task boundary model parameters. The problem with this model is that it is based on predetermined assumptions of what tasks users will want to perform. Thus, the model is based on a static set of assumptions that may not anticipate tasks actually performed.

In a third method for defining task boundaries, the application process 310 has a defined a-ERD as discussed above. The a-ERD may be stored as a task boundary model parameter 349. Sub-a-ERDs are composed corresponding to user inputs (e.g., commands, queries, etc.) A task boundary is defined when two (2) consecutive disjoint sub-a-ERDs of the a-ERD are greater than a predetermined distance apart. The subject of determining the distance between sub-a-ERDs is described in § 4.2.3.4 below.

In a fourth method for defining task boundaries, like the third method, the application process 310 has a defined a-ERD, and sub-a-ERDs are composed corresponding to user inputs, as discussed above. The a-ERD may be stored as a task boundary model parameter 349. A task boundary is defined when two (2) consecutive disjoint sub-a-ERDs of the a-ERD are not joined in a query or user input. For example, sub-a-ERDs corresponding to the queries "Restaurants in the Theater District" and "Movies in TriBeCa" are disjoint and unconnected. On the other hand, sub-a-ERDs corresponding to the queries "Restaurants in the Theater District" and "Movies in the Theater District" are connected by the context of the queries (i.e., common neighborhood) or sub-a-ERDs corresponding to the queries "Romantic restaurants" and "Price of the same restaurant" are related by the context of the queries (i.e., "same restaurant").

Other methods for defining task boundaries may use a combination of any of the above four models.

If the user's interaction is supervised or limited such that task boundaries are explicitly entered by the user or explicitly defined, the steps of defining task boundaries need not be performed.

Referring back to FIG. 3A, the task boundary determination process generates usage task data 342 having records 344 with, at least, a sub-a-ERD field 346 and a task ID field 348.

[§] 4.2.3.4 Task Analysis Process

Having described exemplary object log 320, uniform object representation 330, and task boundary determination 340 processes, an exemplary task analysis process 350 is now described. Referring first to FIG. 3A, the task analysis process 350 uses tunable parameters 358 to convert usage task data 342 into task model data 352. The task model data 352 may include records 354 having a task ID field 355 and a cluster ID field 356 (and an optional sub-a-ERD filed 353), and may also include records 357 having a cluster ID field 356 and a cluster probability field 358.

Figure 11:
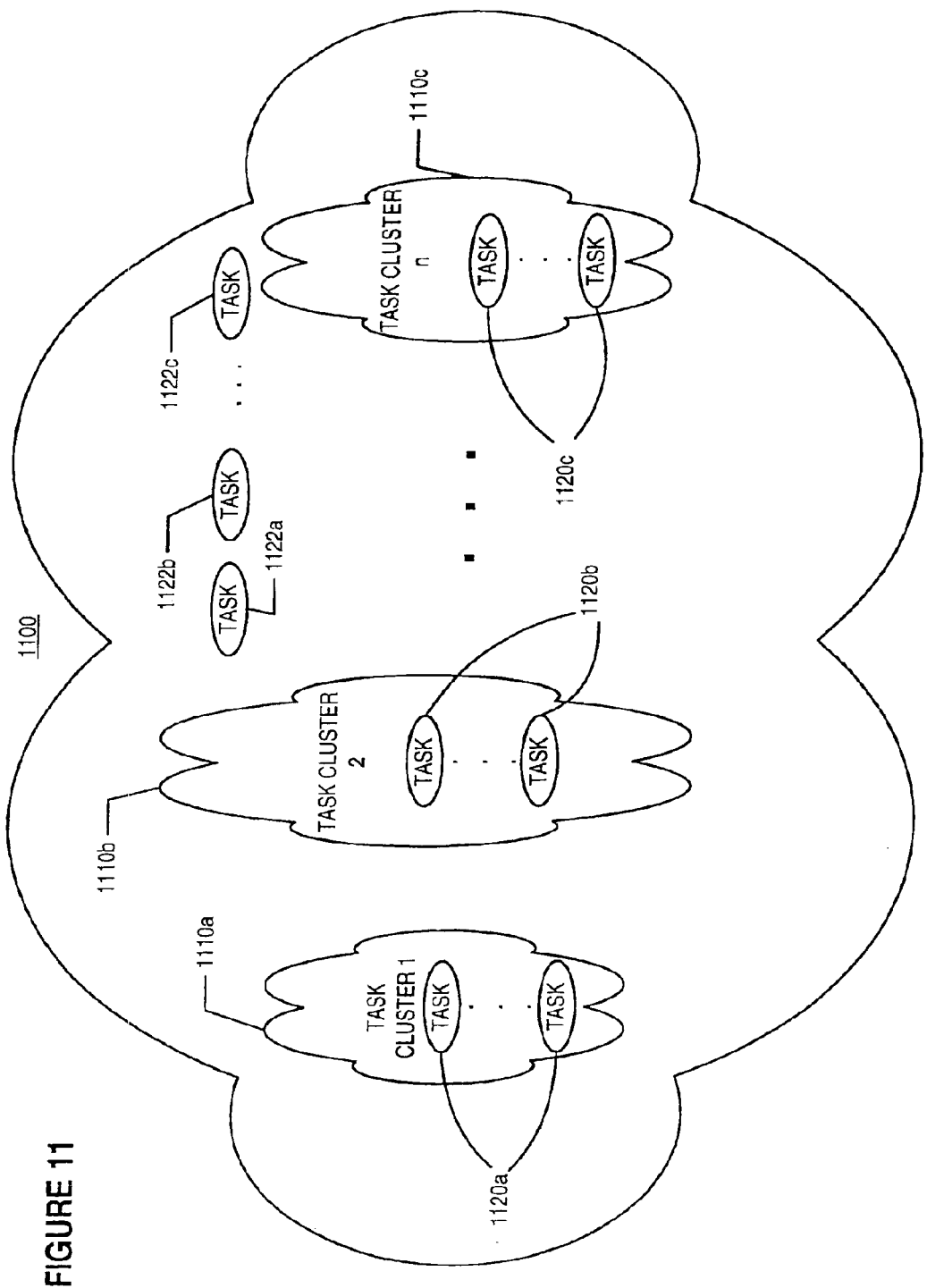
FIG. 11 depicts tasks and clustered tasks.

FIG. 11 graphically depicts the task model data 352 as a set 1100 of all tasks. The set 1100 of all tasks includes sets 1110a, 1110b, ... and 1110c of clustered tasks. Each set 1110 of clustered tasks includes two (2) or more tasks 1120. The set 1100 of all tasks may also include tasks 1122 which do not belong to any set 1110 of clustered tasks. The sets 1110 of clustered tasks may have an associated probability corresponding to the probability that a user will perform a task belonging to that set of clustered tasks. The use of this model 352/1100 for providing run-time help and run-time advertising will be described in §§ 4.2.3.5 and 4.2.3.6., respectively, below.

Figure 12:
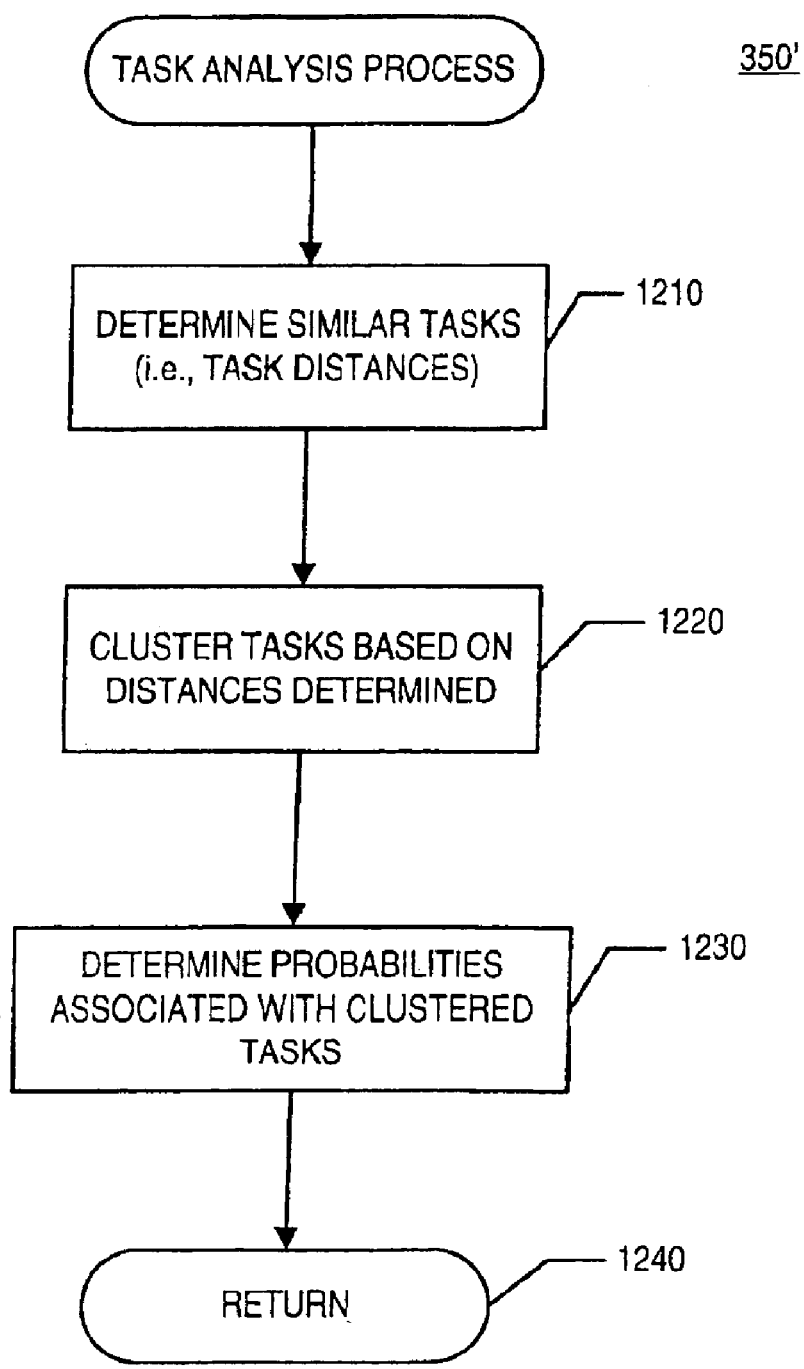
FIG. 12 is a flow diagram of a task analysis process.

FIG. 12 is a high level flow diagram of an exemplary task analysis process 350'. First, as shown in step 1210, similar tasks are determined. More specifically, distances between tasks are determined. This step is described in more detail with reference to FIGS. 13, 14, and 15 below. Next, as shown in step 1220, tasks are clustered based on the distances determined. This step is described in more detail with reference to FIG. 16 below. Finally, in optional step 1230, probabilities associated with the clustered tasks are determined. This step is described in more detail with reference to FIG. 17 below. Processing continues via return node 1240.

Figure 13:
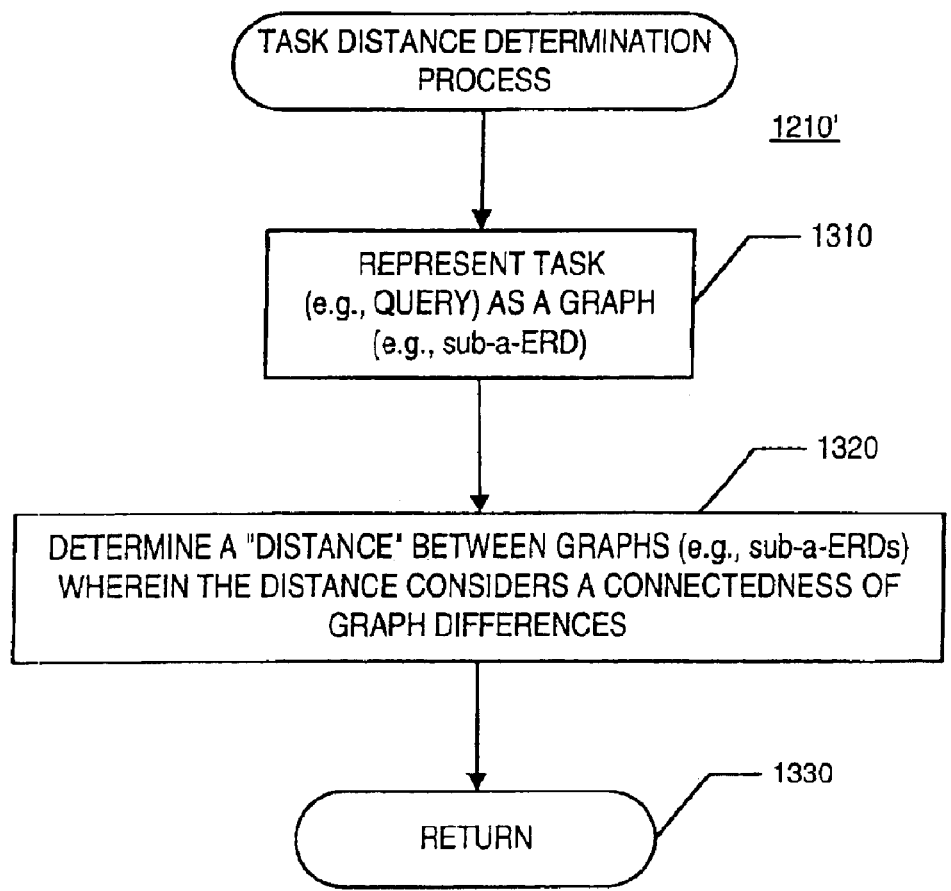
FIG. 13 is a flow diagram of a task distance determination process which may be used in the task analysis process of FIG. 12.

The details of the exemplary step for determining task distances is now described with reference to FIGS. 13, 14, and 15. FIG. 13 is a high level flow diagram of an exemplary process 1210' for performing a step of determining task distances (Recall, e.g., step 1210 of FIG. 12.). First, as shown in step 1310, the task (e.g., a database query) is represented as a graph (e.g., a sub-a-ERD). Details of this step are described with reference to FIG. 14 below. Next, as shown in step 1320, a distance between task graphs, which considers a connectedness of the task graphs differences, is determined. Details of this step are described with reference to FIG. 15 below. Processing then continues via return node 1330.

Figure 14:
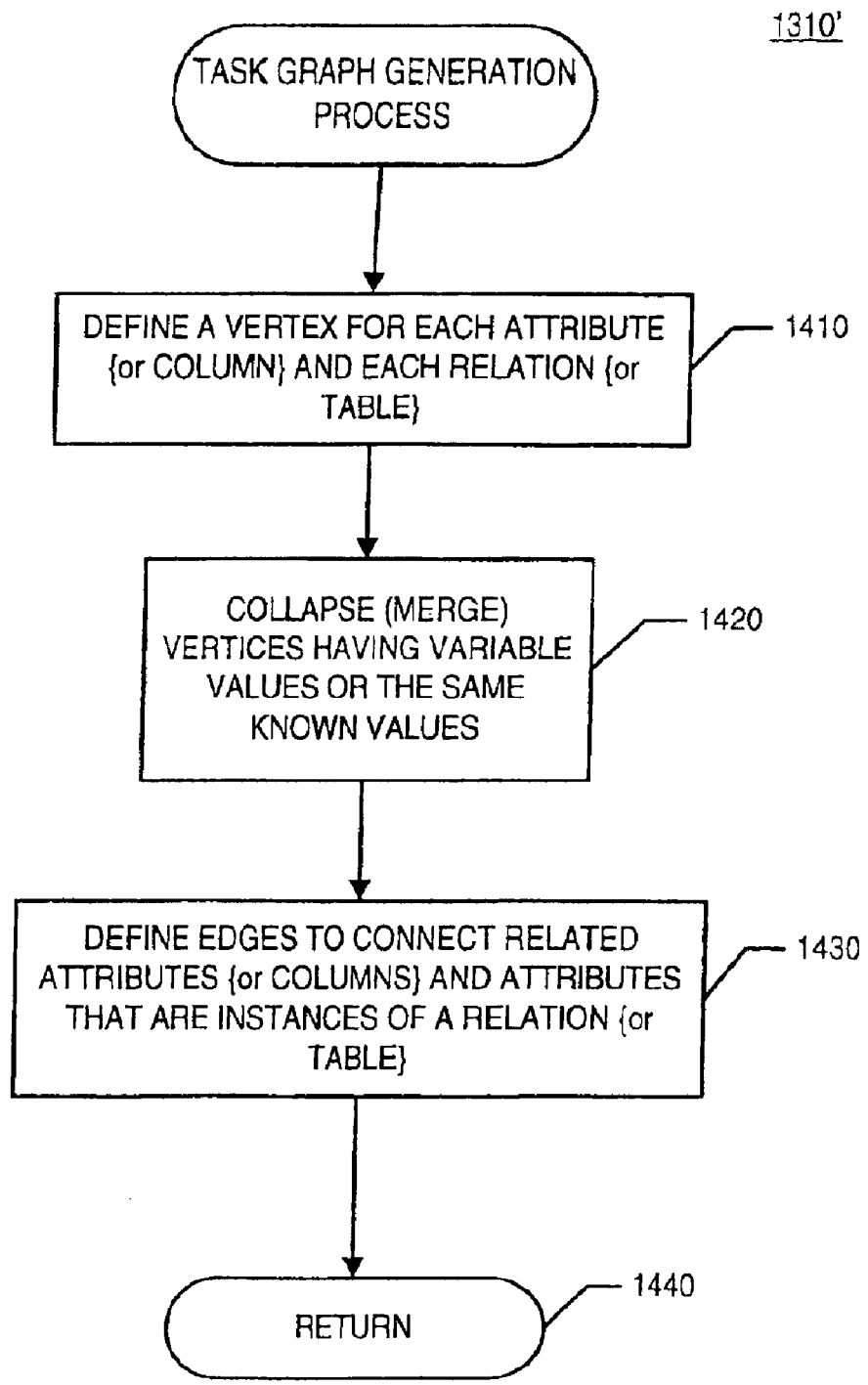
FIG. 14 is a flow diagram of a task graph generation process which may be used in the task distance determination process of FIG. 13.

FIG. 14 is a flow diagram of an exemplary process 1310' for performing the step of-representing a task as a graph. (Recall, e.g., step 1310 of FIG. 13.) First, as shown in step 1410, a vertex is defined for each attribute and each relation, in the relational database vernacular or, for each entity in the a-ERD vernacular. Each entity may have an associated known or variable value. Next, as shown in step 1420, vertices having variable values or the same known values are merged. Thereafter, as shown in step 1430, edges are defined (a) which connect related attributes and attributes that are instances of a relation (in the relational database vernacular), or (b) for each relationship (in the a-ERD vernacular). Processing then continues via return node 1440.

Figure 15:
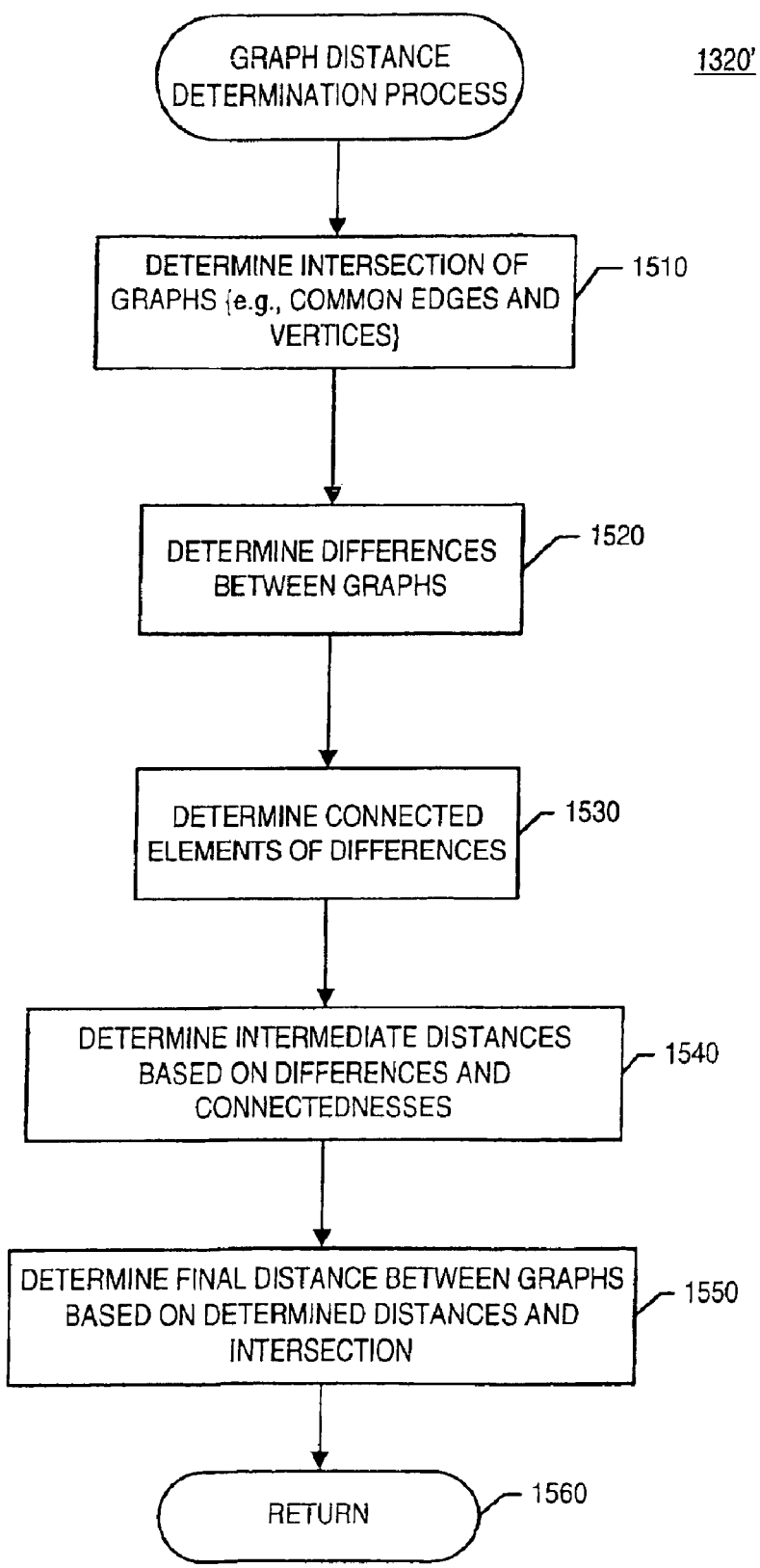
FIG. 15 is a flow diagram of a task graph distance determination process which may be used in the task distance determination process of FIG. 13.

FIG. 15 is a flow diagram of an exemplary process 1320' for performing the step of determining a distance between graphs wherein the distance considers a connectedness of graph differences. (Recall, e.g., step 1320 of FIG. 13.) First, as shown in step 1510, an intersection (e.g., common edges and vertices) of the graphs is determined. Vertices are common (i.e., are the same) if (a) they are labeled with the same relation, (b) they are labeled with the same attribute and have the same constant value, or (c) they are labeled with the same attribute and have two variable (e.g., wildcard) values. Edges are common (i.e., are the same) if they are labeled the same and they have the same end point vertices. Next, as shown in step 1520, differences between the graphs are determined. That is, elements of the graphs which are not common are determined. Next, as shown in step 1530, connected elements of the differences are determined. Thereafter, as shown in step 1540, intermediate distances between the graphs are determined based on properties of subgraphs and the ambient graph, such as the differences and connectedness of the symmetric difference. Alternatively, such properties could be the size and number of components in a symmetric difference of two subgraphs. For example, the intermediate distance, d*, may be defined as:

$$d*(B, A) = \sum_{i \in \text{all graph pieces}} v^{|c_i^i|}$$

where: A and B are the graphs,
v is a tunable parameter >1, and
c is the number of connected elements in the difference A−B, and
i is the number of disjoint pieces of the difference A−B.
Other methods for penalizing connectedness in graph differences may also be used. Finally, as shown in step 1550, a final distance between the graphs is determined based on the determined intermediate distances and intersection. The final distance, d, may be defined as:

$$d(A, B) = \frac{\max[d*(A, B), d*(B, A)]}{n_{\text{intersect}}}$$

where: $n_{INTERSECT}$=the number of vertices and edges in A∩B

Processing continues via return node 1560.

Figure 16:
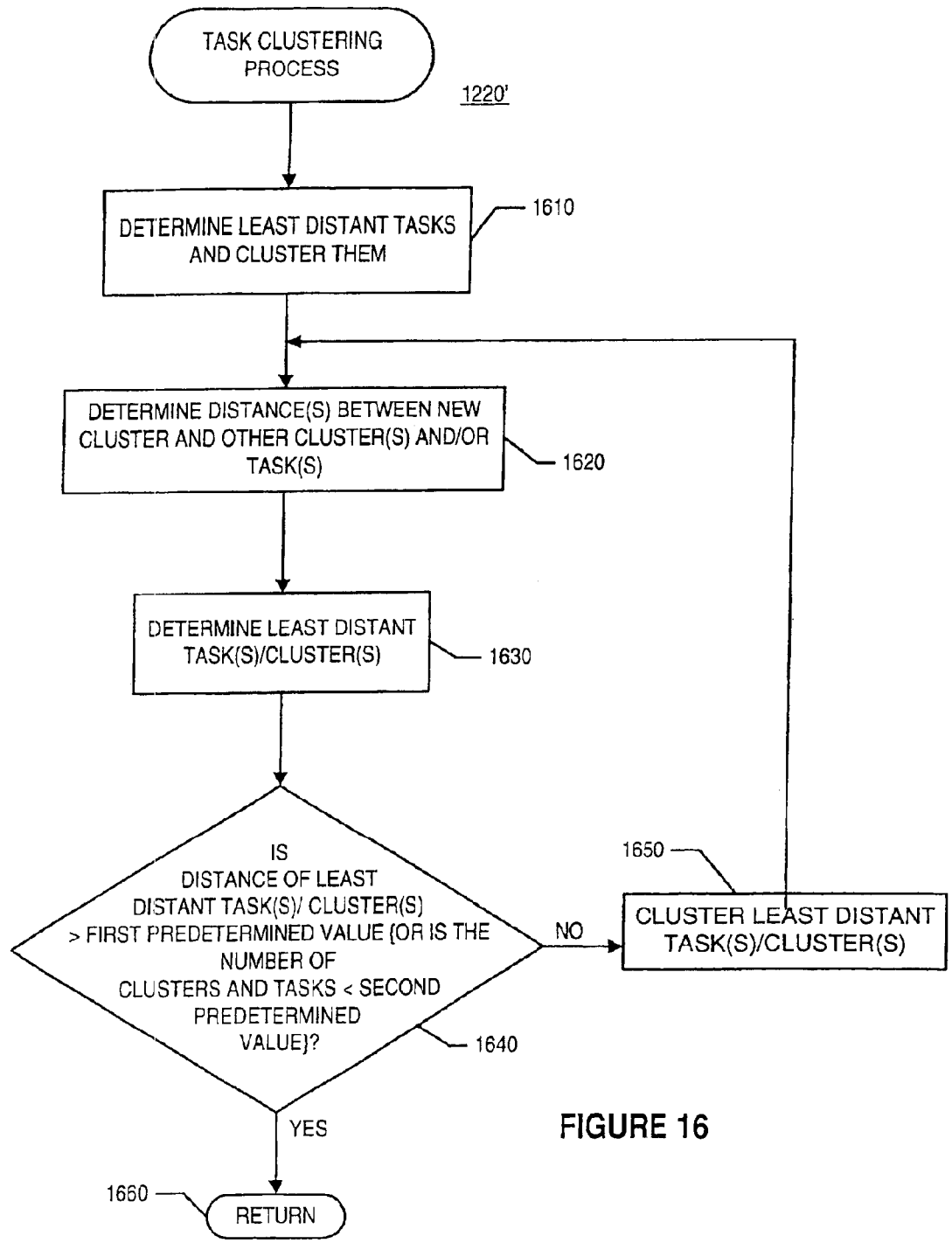
FIG. 16 is a flow diagram of a task clustering process which may be used in the task analysis process of FIG. 12.

FIG. 16 is a flow diagram of an exemplary process 1220' for performing a step of clustering tasks based on distances. (Recall, e.g., step 1220 of FIG. 12.) This exemplary process 1220' is based on known agglomerative hierarchical clustering techniques. First, as shown in step 1610, the least distant tasks are determined and clustered. Thereafter, as shown in step 1620, a distance between the newly clustered tasks and other cluster(s) and/or tasks is determined. The distance between a task and a cluster of tasks may be defined as (a) the maximum distance between the task and each task of the cluster, (b) the minimum distance between the task and each task of the cluster, or (c) the average distance between the task and each task of the cluster. In this example, it will be assumed that the distance between a task and a cluster of tasks is the maximum distance between the task and each task of the cluster. Next, as shown in step 1630, the least distant task(s) and/or clusters(s) (i.e., task to task distance, task to cluster distance, or cluster to cluster distance) is determined. Then, as shown in decision step 1640 and return node 1660, if the distance of the least distant task(s) and/or cluster(s) is greater than a first predetermined value, processing continues via return node 1660. Alternatively, if the number of clusters (and tasks) is less than a second predetermined value, processing continues via return node 1660. If, on the other hand, the distance of the least distant task(s) and/or cluster(s) is not greater than the first predetermined value (or alternatively, if the number of clusters (and tasks) is not less than the second predetermined value), then, as shown in step 1650, the least distance task(s) and/or cluster(s) are clustered together and processing continues at step 1620. The first and second predetermined values may be stored as tunable parameters 359.

In some instances, the task analysis (e.g., clustering) should be performed on sequence independent tasks. In such cases, all of the sub-a-ERDs associated with users and tasks may be united into one large sequence independent task (or "SIT") sub-a-ERD. Pattern matching algorithms may then be used to classify and cluster the SITs.

Results of the task clustering process may be used to further abstract the a-ERD representation of the application process 310. Recall, for example, that the a-ERD representation of the application process 310 may be a task boundary model parameter 349.

Figure 17:
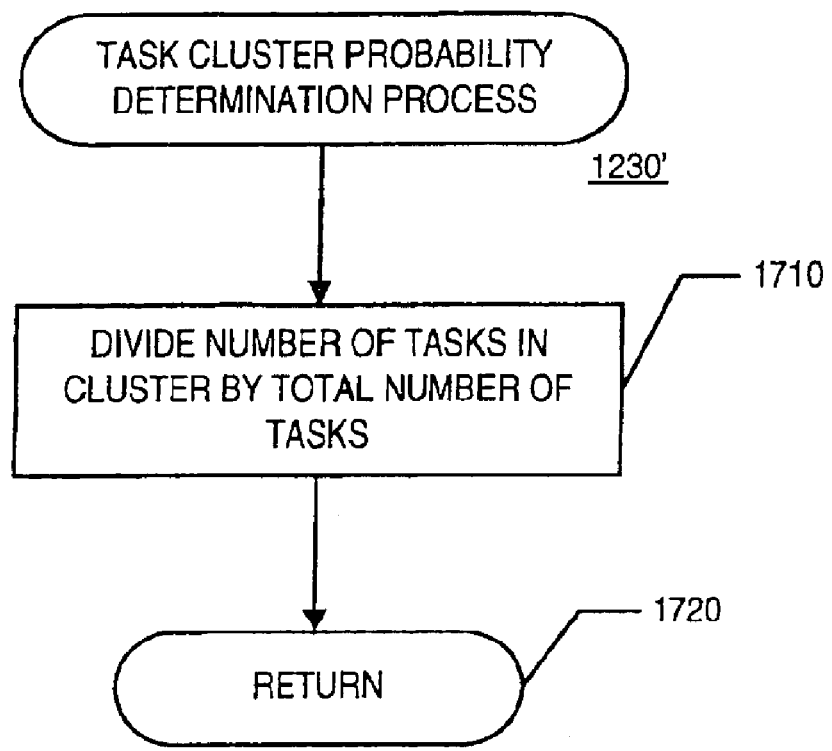
FIG. 17 is a flow diagram of a task cluster probability determination process which may be used in the task analysis process of FIG. 12.

FIG. 17 is a flow diagram of an exemplary process 1230' for performing a step of assigning probabilities to task clusters. (Recall, e.g., optional step 1230 of FIG. 12.) As shown in step 1710, the probability associated with a given cluster may be simply defined by dividing the number of tasks in that cluster (Recall, e.g., tasks 1120 in a cluster 1110 depicted in FIG. 11.), by the total number of tasks (Recall, e.g., all tasks 1120, 1122 in set 1100 depicted in FIG. 11.). Processing continues via the return node 1720.

Other probabilities related to the analyzed tasks may also be determined. A hypergraph of the a-ERD (or "HAG") corresponding to the application process 310 may be defined by (i) nodes corresponding to sub-a-ERDs corresponding to steps taken (or queries made) in a defined task, and (ii) directed edges corresponding to the order of steps taken (or queries made) in the defined task. In the HAG, nodes of degree one (1) having an exiting edge are defined as "start nodes" of the task and nodes of degree one (1) having an entering edge are defined as "end nodes" of the task. Probabilities corresponding to each HAG (or task) may be determined as discussed above with reference to FIG. 17. In addition, task start nodes may be assigned a probability—P (start node$_j$|HAG$_i$). Edges of the HAG (task) may be labeled with a probability associated with taking that particular edge—$P(node_k \rightarrow node_j | HAG_i)$. Similarly, the probability of taking an edge given a particular start node—$P(node_k \rightarrow node_j | HAG_i,\text{ start } node_j)$—may be determined.

[§] 4.2.3.5 Task Help Process

Having described exemplary processes for performing the off-line functions of the present invention, exemplary processes for performing the run-time functions of the present invention, namely task help and task based advertising, are now described. An exemplary process for performing the task help function will be described in this section with reference to FIGS. 3B and 18. Then, an exemplary process for performing the task based advertising function will be described in § 4.2.3.6, below.

Figure 18:
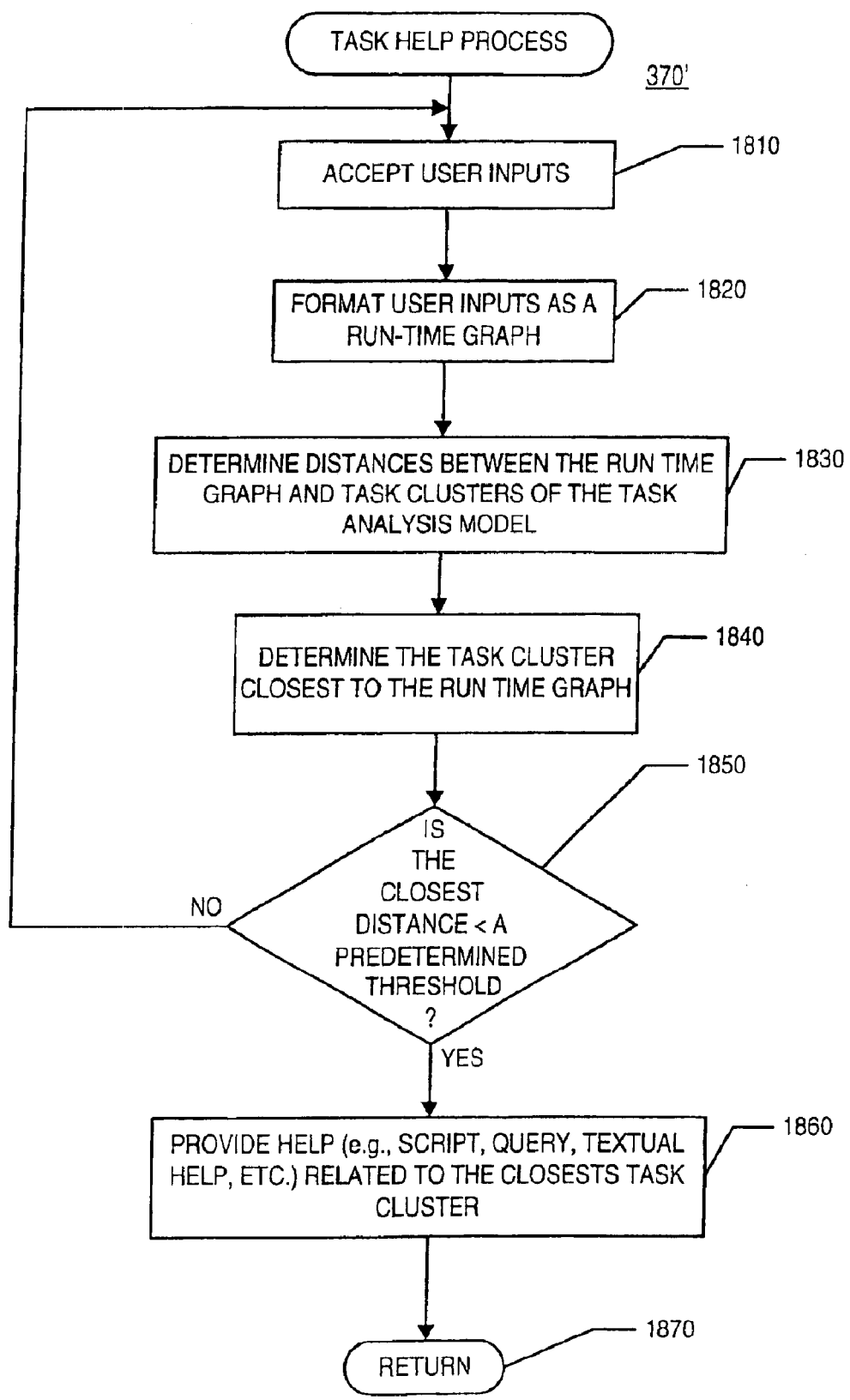
FIG. 18 is a flow diagram of a task help process for performing a function which may be carried out by the present invention.

FIG. 18 is a flow diagram of an exemplary process 370' for performing a task help function in accordance with the present invention. Recall from FIG. 3B that the task help process 370 has access to (i) the task model 352, which includes records 354 which associate task IDs 355 (and sub-a-ERDs 353) with cluster IDs 356, and (ii) task help content 395, which includes records 396 which associate cluster IDs 397 with task help content 398. Basically, if (a graph composed based on) steps input by a user are sufficiently "close" to a task cluster, the user is offered help to perform the task associated with the task cluster.

Referring now to FIG. 18, first, as shown in step 1810, user inputs are accepted. Then, as shown in step 1820, the user inputs are formatted as a run-time graph. The run-time graph may be generated in the same manner as discussed in § 4.2.3.4 above with reference to FIG. 14. Next, as shown in step 1830, distances between the run-time graph and the task clusters of the task model 352 are determined. This distance determination may be carried out in the same manner as discussed in § 4.2.3.4 above with reference to FIG. 15. Next, as shown in step 1840, the closest task cluster to the run-time graph is determined. Next, as shown in decision step 1850, if the closest distance is not less than a predetermined threshold, then processing continues at step 1810. If, on the other hand, the closes distance is less than the predetermined threshold, then help related to accomplishing the task related to the closest task cluster is provided to the user as shown in steps 1850 and 1860. Processing then continues via return node 1870.

The help provided may be in the form of a script (or "wizard"), a query, a hint, navigational assistance, etc. For example, in the context of a word processing application, the task help process 370' may recognize that the user is performing steps "close to" a "generate food recipe card" task cluster. In this case, the application may prompt the user, "IT SEEMS THAT YOU ARE TRYING TO ENTER A RECIPE. WOULD YOU LIKE HELP IN FORMATTING A RECIPE CARD?" If the user replies yes, recipe card formatting help is provided. In the context of an Internet website for providing information about things to do in a particular city, the task help process may recognize that the user is performing steps "close to" a "plan a romantic date" task cluster. For example, the user may have requested romantic restaurants located at the upper east side of New York City. In this case, the Internet website may provide gratuitous information regarding romantic things to do in the same neighborhood. For example, the Internet website may convey to the user, "IT SEEMS THAT YOU MAY BE PLANNING A ROMANTIC EVENING IN THE UPPER EAST SIDE. YOU MAY CONSIDER A HORSE DRAWN CARRIAGE RIDE THROUGH CENTRAL PARK. ALSO, "THE ENGLISH PATIENT" IS PLAYING AT THE FOLLOWING MOVIE THEATERS IN THE UPPER EAST SIDE . . . ."

To summarize, the task help process 370 basically, determines a task that a user is trying to perform, gets the associated task cluster ID from the task model 352, and uses the associated task cluster ID to find task help content 398 in the task help content storage 395. Naturally, the task help content field 398 may include an addressees) to a storage location(s) of task help content.

[§] 4.2.3.6 Task Based Advertising Process

Figure 19:
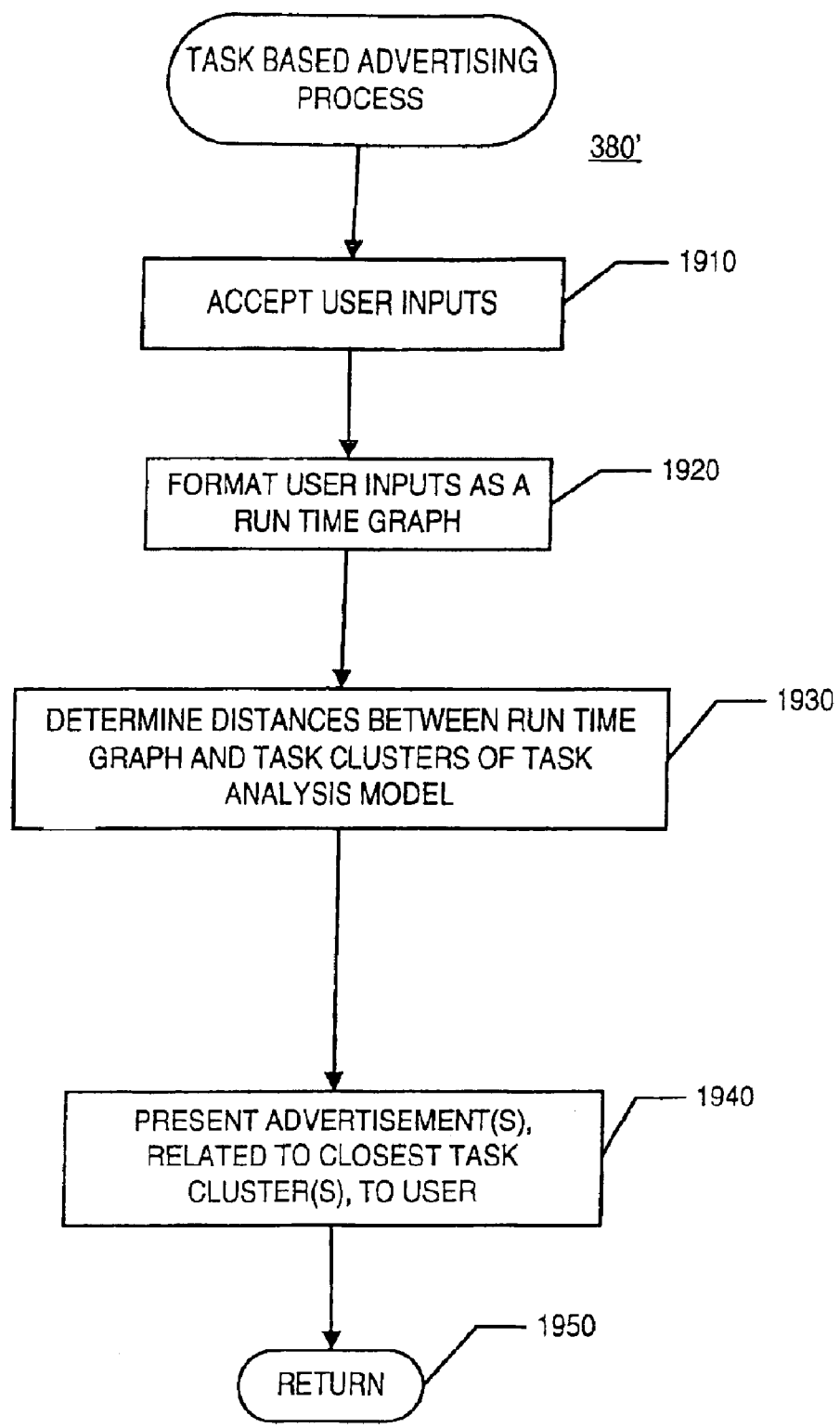
FIG. 19 is a flow diagram of a task based advertising process for performing a function which may be carried out by the present invention.

Having described an exemplary process for performing the task help function of the present invention, an exemplary process for performing the task based advertising function will be described with reference to FIGS. 3B and 19. FIG. 19 is a flow diagram of an exemplary process 380' for performing a task based advertising function in accordance with the present invention. Recall from FIG. 3B that the task based advertising process 380 has access to (i) the task model 352, which includes records 354 which associate task IDs 355 (and sub-a-ERDs 353) with cluster IDs 356, and (ii) marketing information content storage 390, which includes records 392 which associate cluster IDs 393 with marketing information content 394. Basically, if (a graph composed based on) steps input by a user match a task cluster to a sufficient degree, the user is presented with related marketing information.

Referring now to FIG. 19, first, as shown in step 1910, user inputs are accepted. Next, as shown in step 1920, the user inputs are formatted as a run-time graph 1920. As was the case with the task help process 370' discussed above with reference to FIG. 18, the run-time graph may be generated in the same manner as discussed in § 4.2.3.4 above with reference to FIG. 14. Next, as shown in step 1930, distances between the run-time graph and the task clusters of the task model 352 are determined. As was the case with the task help process 370' discussed above with reference to FIG. 18, this distance determination may be carried out in the same manner as discussed in § 4.2.3.4 above with reference to FIG. 15. Next, as shown in step 1940, advertisement(s) related to the closest task cluster(s) are presented to the user. For example, in the context of an Internet website for providing information about things to do in a particular city, the task help process may recognize that the user is performing steps "closest to" planning a romantic date task cluster, and also "close to" an eating out task cluster. For example, the user may have requested romantic restaurants located at the upper east side of New York City. In this case, the Internet website may provide advertisements regarding romantic things to do in the same neighborhood. For example, the Internet website may advertise horse drawn carriage rides through central park and local movie theaters playing romantic movies. A second closest task cluster may be eating out. Thus, the Internet website may also provide advertisements regarding coffee bars or pastry shops in the same neighborhood.

[§]4.2.4 Data Structures and Instructions

The above mentioned processes may be carried out by machine readable instructions. Referring to FIGS. 30A and 30B, these instructions 3010 may be stored on a machine readable medium 3000a and/or communicated over a communications medium 3000b. Similarly, the data used by the processes may have particular data structures. Referring to FIGS. 30A and 30B, these data structures 3020 may be stored on a machine readable medium 3000a and/or communicated over a communications medium 3000b.

[§] 4.3 Operation of the Present Invention

Examples of building object usage logs in the environments depicted in FIGS. 1A and 1B are depicted in FIGS. 25 and 26, respectively, and described § 4.3.1 below. Examples of performing run-time functions (e.g., task help and task-based advertising) in the environments depicted in FIGS. 1A and 1B are depicted in FIGS. 27 and 28, respectively, and described in § 4.3.2 below.

Examples of the operation of various processes, which may be performed by the present invention, are described in the context of an Internet website for providing content in response to queries in § 4.3.3 below.

[§]4.3.1 Building Object Usage Log Operation

Operations for building an object usage log, both in the context of the client-server environment 100 depicted in FIG. 1A, and in the context of the desktop environment 100' depicted in FIG. 1B, will now be described with reference to FIGS. 25 and 26, respectively.

[§] 4.3.1.1 Client-server Environment

FIG. 25 is a high level messaging diagram depicting inter-process communications which may occur when logging object or resource usage in a client-server environment, such as that 100 depicted in FIG. 1A. To simplify the drawing, the input/output interface processes 114 and 122 are not shown. First, a user submits a request or a command, via the user interface process 112 (not shown), to the front end application process 116 in communication 2510. If, for example, the front end application process 116 is an Internet browser, then the communication 2510 may include a request for a resource, such as an HTML page for example. If, on the other hand, the front end application process 116 is a word processor, then the communication 2510 may include a spell check command for example.

In response to the communication 2510, the front end application process 116 forwards a request or command, in communication 2520, to the back end application process 124 via an output interface process (not shown), a network (not shown), and an input interface process (not shown). (See, e.g., elements 114, 130, and 122 of FIG. 1A.) In response, the back end application process 124 submits a request or command, in communication 2530, to the stored objects/resources 312 which returns, in communication 2550, a resource (e.g., an HTML page) corresponding to the request in the communication 2530 or an object (e.g., a spell check executable software object) corresponding to the command in communication 2530. The back end application process 124 then returns, in communication 2570, the resource (e.g., the HTML page) or the object (e.g., the spell check executable software object). Depending on the allocation of tasks between the front and back end application processes 116 and 124, respectively, rather than returning the executable object, the back-end application process 124 may return, in the communication 2570, a product of the object activity (i.e., the value returned when the software object is executed) to the front end application process 116. Thereafter, the front end application process 116 returns, in communication 2580, the requested resource or the product of the object activity corresponding to the command.

Before, after, or concurrently with the communications 2530 and 2570, the back end application process 124 will also forward, in communication 2540, the object ID associated with the request or command of communications 2520 and 2530 to the object log process 320. In response, the object log process 320 submits, in communication 2560, the object ID and the time, to the object usage log 322 for storage. The time may be provided by a service process (not shown) of the server. The communication 2560 may also include a user ID.

[§] 4.3.1.2 Desktop Environment

FIG. 26 is a high level messaging diagram depicting inter-process communications which may occur when logging object or resource usage in a desktop environment, such as that 100' depicted in FIG. 1B. First, a user submits a request or a command, via the user interface process 140, to the application program management process 150 in communication 2610. If, for example, the application process is a file browser, then the communication 2610 may include a request for a file, such as a employee record for example. If, on the other hand, the application process is a word processor, then the communication 2610 may include a spell check command for example.

In response to the communication 2610, the application program management process 150 forwards a request/command, in communication 2620, to the storage management process 160. In response, the storage management process 160 submits a request/command, in communication 2630, to the stored objects/resources 312 which returns, in communication 2640, a resource (e.g., an employee record) corresponding to the request in the communications 2620 and 2630 or an object (e.g., a spell check executable software object) corresponding to the command in communications 2620 and 2630. The storage management process 160 then returns, in communication 2650, the resource (e.g., the employee record) or the object (e.g., the spell check executable software object) to the application program management process 150. Thereafter, the application management process 150 returns, in communication 2660, the requested resource or the product of the object activity corresponding to the command.

Before, after, or concurrently with the communications 2620 and 2660, the application program management process 150 will also forward, in communication 2670, the object ID associated with the request or command of communication 2610 to the object log process 320. In response, the object log process 320 submits, in communication 2680, the object ID and the time, to the object usage log 322 for storage. The time may be provided by a service process (not shown) of the server. The communication 2680 may also include a user ID.

[§] 4.3.2 Run-time Functions Operations

The operations of the run-time functions (e.g., task help and task-based advertising), both in the context of the client-server environment 100 depicted in FIG. 1A, and in the context of the desktop environment 100' depicted in FIG. 1B, will now be described with reference to FIGS. 27 and 28, respectively.

[§] 4.3.2.1 Client-server Environment

FIG. 27 is a high level messaging diagram depicting inter-process communications which may occur when performing task help and/or task-based advertising operations in a client-server environment such as that 100 depicted in FIG. 1A. To simplify the drawing, the input/output interface processes 114 and 122 are not shown. First, a user submits a request or a command, via the user interface process 112, to the front end application process 116 in communication 2705. If, for example, the front end application process 116 is an Internet browser, then the communication 2705 may include a request for a resource, such as an HTML page for example. If, on the other hand, the front end application process 116 is a word processor, then the communication 2705 may include a spell check command for example.

In response to the communication 2705, the front end application process 116 forwards a request/command, in communication 2710, to the back end application process 124 via an output interface process (not shown), a network (not shown), and an input interface process (not shown). (See, e.g., elements 114, 130, and 122 of FIG. 1A.) In response, the back end application process 124 submits a request/command, in communication 2720, to the stored objects/resources 312 which returns, in communication 2725, a resource (e.g., an HTML page) corresponding to the request in the communication 2520 or an object (e.g., a spell check executable software object) corresponding to the command in communication 2520. The back end application process 124 then returns, in communication 2730, the resource (e.g., the HTML page) or the object (e.g., the spell check executable software object) to the front end application process 116. Depending on the allocation of tasks between the front and back end application processes 116 and 124, respectively, rather than returning the executable object, the back end application process 124 may return, in the communication 2530, a product of the object activity to the front end application process 116. Thereafter, the front end application process 116 returns, in communication 2735, the requested resource or the product of the object activity corresponding to the command.

Before, after, or concurrently with the communications 2720 and 2730, the back end application process 124 will also forward, in communication 2715, the object ID associated with the request or command of communication 2710 to the task help process 370 and/or the task-based advertising process 380. In response to the communication 2715, the task help process 370 and/or the task-based advertising process 380 compares the received object ID(s) with one or more task clusters of the task model 352 requested in communication 2740 and accepted in communication 2745. (Note that the task help process 370 or the task-based advertising process 380 may use a run-time graph constructed based on a number of user inputs as discussed above.) If the object ID(s) (or run-time graph) correspond to a task which is "close to" a given task cluster, then the task cluster ID is used to access appropriate help content 395 and/or marketing information content 390. More specifically, the task help process 370 and/or the task-based advertising process 380 submits a request 2750, including the cluster ID, to the task help content 395 and/or the marketing information content 390, respectively. In response, the task help and/or marketing information corresponding to the cluster ID of the request 2750 is returned to the task help process 370 and/or the task-based advertising process 380 in communication 2755. The task help process 370 and/or the task-based advertising process 380 then sends the help content and/or the marketing information content to the back end application process 124 in communication 2760. The back end application process 124 then forwards the help content and/or the marketing information content to the front end application process 116 in communication 2765. Finally, the help and/or marketing information is sent, in communication 2770, to the user interface process 112 where the help and/or marketing information is rendered.

[§] 4.3.2.2 Desktop Environment

FIG. 28 is a high level messaging diagram depicting inter-process communications which may occur when performing task help and task-based advertising operations in a desktop environment such as that 100' depicted in FIG. 1B. First, a user submits a request or a command, via the user interface process 140, to the application program management process 150 in communication 2805. If, for example, the application program process 150 is a file browser, then the communication 2805 may include a request for a file, such as an employee record for example. If, on the other hand, the application program process 150 is a word processor, then the communication 2805 may include a spell check command for example.

In response to the communication 2805, the application program management process 150 forwards a request/command, in communication 2810, to the storage management process 160. In response, the storage management process 160 submits a request or command, in communication 2820, to the stored objects/resources 312 which returns, in communication 2825, a resource (e.g., an employee record) corresponding to the request in the communication 2820 or an object (e.g., a spell check executable software object) corresponding to the command in communication 2820. The storage management process 160 then returns, in communication 2830, the resource (e.g., the employee record) or the object (e.g., the spell check executable software object) to the application program management process 150. Thereafter, the application management process 150 returns, in communication 2835, the requested resource or the product of the object activity corresponding to the command.

Before, after, or concurrently with the communications 2810 and 2835, the application program management process 150 will also forward, in communication 2815, the object ID associated with the request or command of communication 2805 to the task help process 370 and/or the task-based advertising process 380. In response to the communication 2815, the task help process 370 and/or the task-based advertising process 380 compares the object ID(s) received with one or more task clusters of the task model 352 requested in communication 2840 and accepted in communication 2845. (Note that the task help process 370 or the task-based advertising process 380 may use a run-time graph constructed based on a number of user inputs as discussed above.) If the object ID(s) (or run-time graph) correspond to a task which is "close to" a given task cluster, then the task cluster ID is used to access appropriate help content 395 and/or marketing information content 390. More specifically, the task help process 370 and/or the task-based advertising process 380 then submits a request 2850, including the cluster ID, to the task help content 395 and/or the marketing information content 390, respectively. In response, the help and/or marketing information corresponding to the cluster ID of the request 2850 is returned to the task help process 370 and/or the task-based advertising process 380 in communication 2855. The task help process 370 and/or the task-based advertising process 380 then sends the help content and/or the marketing information content to the application management process 150 in communication 2760. Finally, the help or marketing information is sent, in communication 2870, to the user interface process 140 where the help and/or marketing information is rendered.

[§] 4.3.3 Examples of Operations of Processes of the Present Invention

In the following examples, it is assumed that an Internet website includes databased information regarding restaurants and movie theaters in New York City. In the following sections, FIGS. 6A, 6B, 14, 15, 16, 20A, 20B, 21A–21C, 22A, 22B, 23A–23D, and 24 will be referenced.

[§] 4.3.3.1 Operation of the Task Graph Generation Process

An example of the operation of the task graph generation process 1310' of FIG. 14, in the context of the Internet website for providing content in response to queries regarding restaurants and movie theaters in New York City, is now presented with reference to FIGS. 6A, 6B, 14, 20A, and 20B.

Figure 20A:
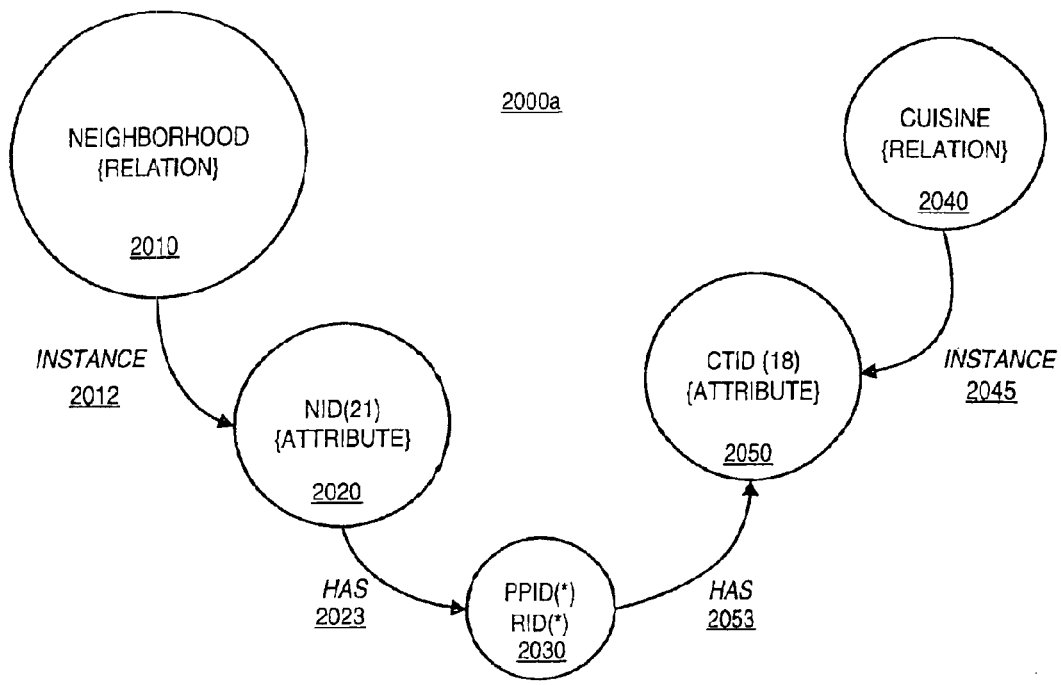
FIGS. 20A and 20B are graphs of queries to an resource server, which illustrate an operation of the present invention.
Figure 20B:
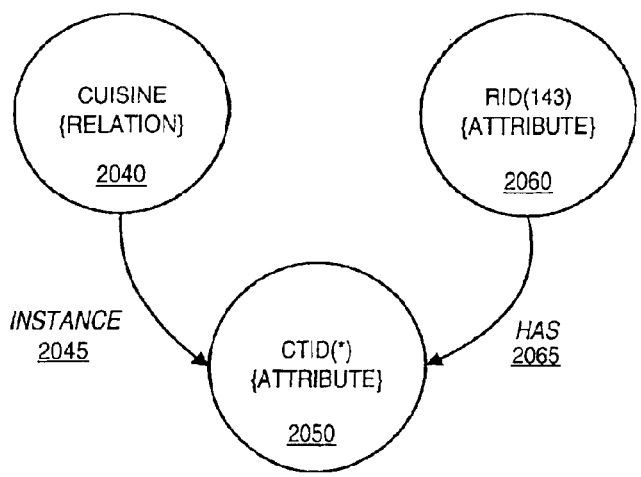

FIGS. 20A and 20B depict a graphical representation of queries. A user may first query, "WHAT ITALIAN RESTAURANTS ARE IN LITTLE ITALY?" and may then query, "WHAT TYPES OF FOOD DOES OCEANA SERVE?" A natural language processor (the details of which are not described here) first converts the queries into a canonical form that can be interpreted. Alternatively, the query interface may be designed so that queries are entered in canonical form. An example of such a query interface is shown in the New York City SIDEWALK™ Internet Website at http://newyork.sidewalk.com/find restaurant, a portion of which is shown in FIG. 29. The canonical form of the first query may be:

[cuisine, CTID (18), RID (*)], and

[neighborhood, PPID (*), NID (21)]

where: "cuisine" is the name of a relation (table) in the database (See, e.g., relation 600*a* of FIG. 6A.);

"CTID" is a "cuisine type ID" attribute of the cuisine relation;

"(18)" is a value—specifically "Italian"—associated with the CTID attribute;

"RID" is a "restaurant ID" attribute of the cuisine relation;

"(*)" is a wildcard value associated with the RID attribute;

"neighborhood" is the name of a relation in the database (See, e.g., relation 600*b* of FIG. 6B.);

"PPID" is a "person-place ID" attribute of the neighborhood relation;

"(*)" is a wildcard value associated with the PPID attribute;

"NID" is a "neighborhood ID" attribute of the neighborhood relation; and

"(21)" is a value—specifically "Little Italy"—associated with the NID attribute.

The canonical form of the second query may be:

[cuisine, CTID (*), RID (143)]

where: "cuisine" is the name of a relation (table) in the database (See, e.g., relation 600*a* of FIG. 6A.);

"CTID" is a "cuisine type ID" attribute of the cuisine relation;

"(*)" is a wildcard value associated with the CTID attribute;

"RID" is a "restaurant ID" attribute of the cuisine relation; and

"(143)" is a value—specifically "Oceana"—associated with the RID attribute.

Recall from FIG. 14 that a task graph is generated. FIG. 20A depicts a task graph generated from the first query and FIG. 20B depicts a task graph generated from the second query.

Recall from step 1410 of FIG. 14 that a vertex is defined for each attribute and each relation. Thus, referring first to FIG. 20A, the neighborhood and cuisine relations are assigned to vertices 2010 and 2040, respectively, and the NID(21) and the CTID(18) attributes are assigned to vertices 2020 and 2050, respectively. Since the PPID(*) and RID(*) have the same variable, they are merged into one vertex 2030. (Recall step 1420 of FIG. 14.) Similarly, referring to FIG. 20B, the cuisine relation is assigned to vertex 2040 and the RID(143) and CTID(*) attributes are assigned to vertices 2060 and 2050, respectively.

Recall from step 1430 of FIG. 14, that edges are defined which connect related attributes and attributes that are instances of a relation. Thus, referring first to FIG. 20A, an "instance" edge 2012 between vertices 2010 and 2020 indicates that the NID attribute is an instance of the neighborhood relation, a "has" edge 2023 between vertices 2020 and 2030 indicates that the NID attribute has PPID attributes (s), an "instance" edge 2045 between the vertices 2040 and 2050 indicates that CTID is an instance of the cuisine relation, and a "has" edge 2053 between vertices 2050 and 2030 indicates that the RID attribute has CTID attribute(s). Referring now to FIG. 20B, the "instance" edge 2045 between vertices 2040 and 2050 indicates that the CTID is an attribute of the cuisine relation, and the "has" edge 2065 between the vertices 2060 and 2050 indicates that the RID attribute has a CTID attribute(s).

[§] 4.3.3.2 Operation of the Distance Determination Process

An example of the operation of the graph distance determination process 1320' of FIG. 15, in the context of the Internet website for providing content in response to queries regarding restaurants and movie theaters in New York City, is now presented with reference to FIGS. 15, 21A–21C, 22A and 22B. In this example, three queries are processed to illustrate the operation of the graph distance determination process 1320'. The first query, which is graphically depicted in FIG. 21A, requests "movies" that are playing at a particular place (e.g., TriBeCa) within a particular time frame (e.g., tonight). The second query, which is graphically depicted in FIG. 21B, requests "movies" that have a particular actor (e.g., Tom Hanks) and a particular rating (e.g., PG). The third query, which is graphically depicted in FIG. 21C, requests "restaurants" that are opened at a particular time (e.g., late night) at a particular place (e.g., Chelsea). Assume in this example that movies are entities that participate in a "has" relation with time, place, actors, and rating entities and that restaurants are entities that participate in a "has" relation with time and place entities.

Recall from step 1510 of FIG. 15 that the intersection two task graphs is determined. The intersection of two graphs includes common edges and common vertices. Vertices are common (i.e., are the same) if (a) they are labeled with the same relation, (b) they are labeled with the same attribute and have the same constant value, or (c) they are labeled with the same attribute and have two variable (e.g., wildcard) values. Edges are common (i.e., are the same) if they are labeled the same and they have the same start and end point vertices.

Recall from step 1520 of FIG. 15 that the differences between task graphs is determined. FIG. 22A depicts the result of subtracting the graph of FIG. 21C from the graph of FIG. 21A. The result of subtracting the graph of FIG. 21A from the graph of 21*c* (not shown) would be similar except the "movie" vertex would be a restaurant vertex and the "has$_{movie,time}$" and "has$_{movie,place}$" edges would be "has$_{rest, time}$" and "has$_{rest,place}$" edges, respectively. FIG. 22B depicts the result of subtracting the graph of FIG. 21B from the graph of FIG. 21A. The result of subtracting the graph of FIG. 21A from the graph of FIG. 21B (not shown) would be similar except that the "time" and "place" vertices would be replaced with "actors" and "ratings" vertices, and the "has$_{movie,time}$" and "has$_{movie,place}$" edges would be replace with "has$_{movie,actors}$" and "has$_{movie,rating}$" edges. In any event, a comparison of the difference graphs of FIGS. 22A and 22B shows that the difference graph of FIG. 22A is more "connected" than the difference graph of FIG. 22B.

In general, the more connected the difference graph is, the more different the queries (or graphed tasks) are. Recall in § 4.2.3.4 above that an intermediate distance between graphs is based on a sum, over all pieces of the difference graph, of tunable parameters "V" to raised to the number of connected elements "$C_i$" in the piece "i" of the difference graph. Thus, graphed tasks are more distant, and hence more different, as the connectedness of their differences increases. In this example:

$d*(22a,22c)=d*(22c,22a)=v^3$ and $d*(22a,22b)=d*(22b,22a)=v^2+v^2$

Thus, for example, if the tunable parameter v is 10, $d*(22a, 22c)=d*(22c,22a)=10^3=1000$ while $d*(22a,22b)=d*(22b, 22a)=10^2+10^2=200$.

Since, in this example, $22a \cap 22c$ is 2 (i.e., the time and place vertices) and $22a \cap 22b$ is 1 (i.e., the movie vertex), the final distance d(22a,22c) is 1000/2=500 and the final distance d(22a,22b) is 200/1=200.

Figure 21A:
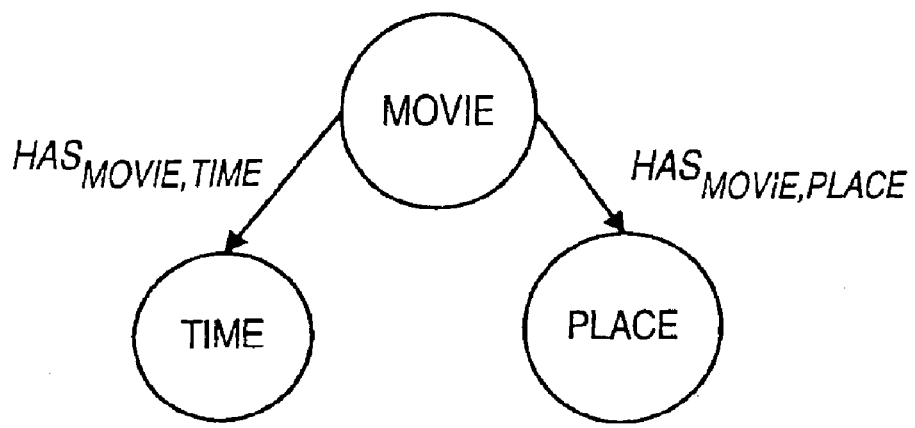
FIGS. 21A through 21C are graphs of queries to a resource server, which illustrate an operation of the present invention.
Figure 21B:
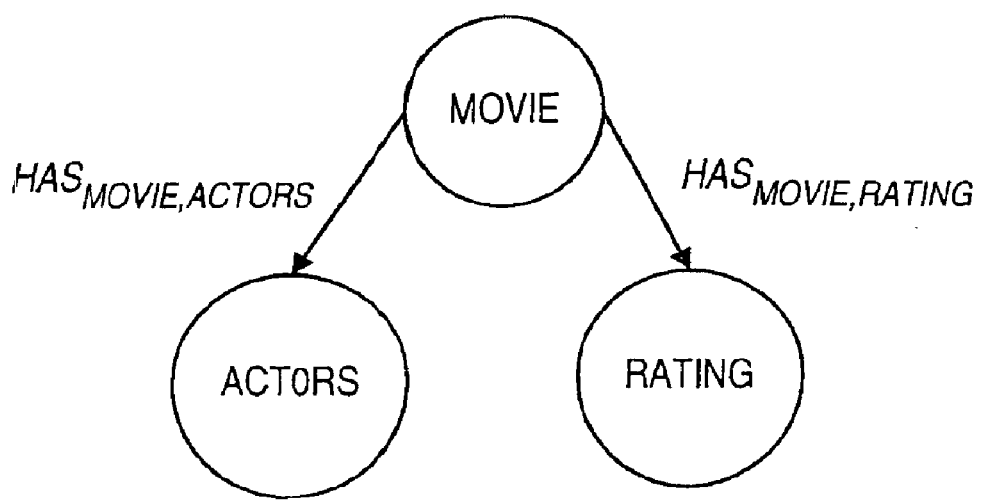
Figure 21C:
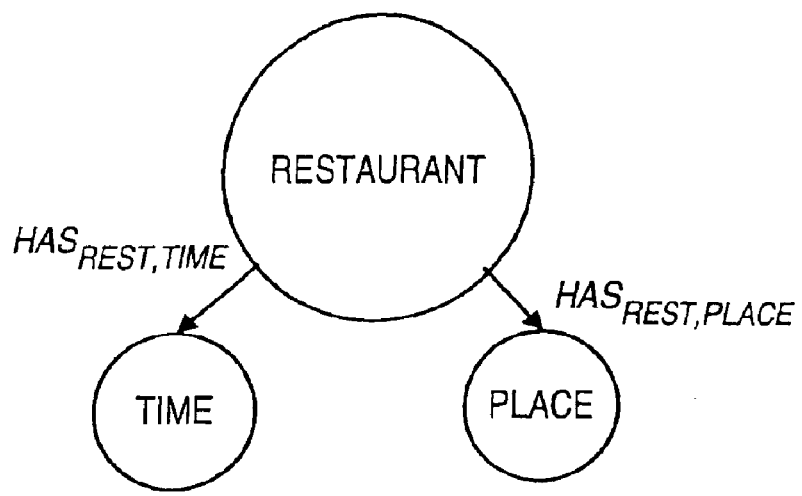
Figure 22A:
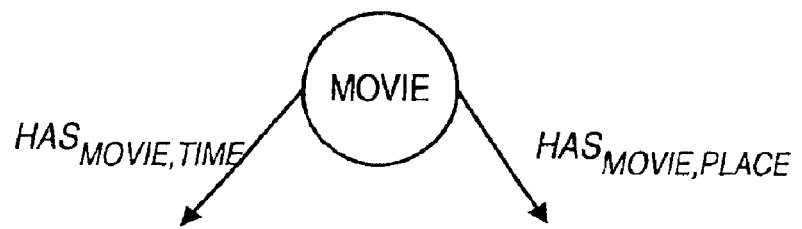
FIGS. 22A and 22B are difference graphs which illustrate a concept of connectedness which may be used by the present invention.
Figure 22B:
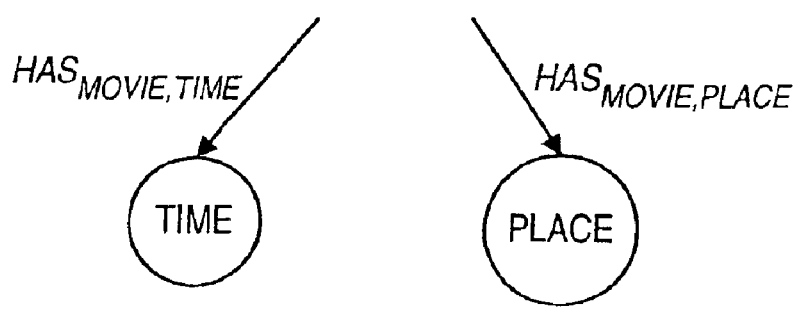

In this example, the tasks graphed in FIGS. 21A and 21*b* both are related to finding out information about a movie. Although the tasks graphed in FIGS. 21A and 21*c* both are related to finding something opened at a certain time and located at a certain place, the "something" differs (i.e., restaurants and movies). Thus, the results of the processing confirm the intuitive feeling that tasks for finding movies having a particular actor and rating and for finding movies playing at a particular time and place are more similar than tasks for finding movie playing at a particular time and place and finding a restaurant opened at a particular time and place. Naturally, the results may change depending upon the values of any attributes entered in the query. For example, tasks for finding the rating of, and actors in, a particular movie and for finding movies playing at on a Saturday afternoon in Midtown might not be more similar than tasks for finding movies playing at on a Saturday afternoon at Midtown and finding a restaurant opened on Saturday in Midtown. This is because the intersection and differences of the graphs will be depend, to some extent, on any values of attributes supplied in the query.

As can be appreciated, the tunable parameter "v" should always be larger than one. Further, the larger the value of the tunabale parameter v, the more relatively -connected" difference graphs are penalized—that is, they are made, or assumed to be, more distant.

[§] 4.3.3.3 Operation of the Task Clustering Process

An example of the operation of the task clustering process 1220' of FIG. 16 is now presented with reference to FIGS. 23A through 23D and 24. FIG. 23A depicts a distance matrix 2300*a* in which distance values between tasks are provided. Since the distance between a task and itself is zero, the task distance values for task pairs 1,1, 2,2, 3,3, 4,4, and 5,5 are indicated with a "*". Since the upper right hand of the matrix 2300*a* is the mirror image of the lower left had of the matrix 2300*a*, redundant distance values are depicted with a "-".

Recall from step 1610 of FIG. 16, that the least distant tasks are clustered. Thus, in the example shown in FIG. 23A, tasks 1 and 4 are clustered. Recall from step 1620 of FIG. 16 that distances between the new cluster and the other cluster (s) and/or tasks(s) are determined. The distance between a task and a cluster of tasks may be defined as (a) the maximum distance between the task and each task of the cluster, (b) the minimum distance between the task and each task of the cluster, or (c) the average distance between the task and each task of the cluster. In this example, it will be assumed that the distance between a task and a cluster of tasks is the maximum distance between the task and each task of the cluster. Thus, for example, the distance between the cluster 1,4 and the task 2 would be MAX[d(2,1), d(2,4)]=MAX [2.0, 1.0]=2.0. The results of the updated distance matrix 2300*b* is depicted in FIG. 23B. Next, tasks 2 and 3 are clustered and new distances are determined, the results of which are shown in matrix 2300*c* of FIG. 23C. Finally, the task 5 is clustered with task cluster 1, 4 and new distances are determined, the results of which are shown in matrix 2300*d* of FIG. 23D.

Recall from steps 1620, 1630, 1640 and 1650, the process of clustering and redetermining distances continues until the distance of the least distant task(s) and/or cluster(s) is greater than a first predetermine value or, alternatively, if the number of clusters is greater than a second predetermined value. The first and/or second predetermined values are tunable parameters. FIG. 24 is a graph of the distance of the least distant task(s) and/or cluster(s) versus the number of clusters for a particular set of tasks. In this example, the first predetermined value should be selected somewhere between 2 and 25 and/or the second predetermined value should be selected somewhere between 7 and 16. Otherwise, if the first predetermined value (distance) is set too high or the second predetermined value (number of clusters) is set too low, increasingly unrelated tasks will be clustered together. Naturally, the tunable first and/or second predetermined values may be determined based on the particular application. For example, if the task analysis is to be used for determining the most important toolbar buttons to include in a computer application, then the second predetermined value may be based on human factors which limit the number of toolbar buttons people are comfortable with. If the task analysis is to be used for providing gratuitous help, the first predetermine value may be based on a "help usefulness" versus a "degree of annoyance at unwanted help" tradeoff.

[§]4.4 Summary

As can be appreciated from the foregoing description, the present invention teaches a tool for analyzing tasks being performed by users on a computer. A generated task analysis model may then be used to help (i) users complete a task, (ii) application program developers to design programs which help users complete popular tasks, (iii) resource server developers to design a topology or resource server to help users complete popular tasks, and (iv) advertisers target "task-relevant" marketing information to computer users.

What is claimed is:

1. A computer implemented method for representing structured, linear, and active information in a uniform way, the method comprising steps of:
   a) mapping structured information to a uniform representation;
   b) mapping linear information to the uniform representation;
   c) mapping active information to the uniform representation;
   wherein the step of mapping structured information to a uniform representation, includes sub-steps of:
      if the information is structured as a table;
      A) representing the table as an entity;
      B) representing column names of the table as an entity;
      C) representing a dimension of the table as an entity;
      D) representing information contained in the table as an entity;
      E) generating a schema relation between the entity representing the table and the entity representing the column name;
      F) generating a data relation between the entity representing the table and the entity representing information contained in the table; and
      G) generating a dimension relation between the entity representing the table and the entity representing a dimension of the table; and
   wherein the uniform representation is a collection of elements,
      wherein each of the elements is one of an entity and a relation; and
      wherein a relation relates two ordered elements.

2. The method of claim 1 wherein a container entity contains other elements.

3. The method of claim 1 wherein the uniform representation is expressed as a list of predicates.

4. The method of claim 1 wherein the uniform representation is expressed as a list of predicates.

5. The method of claim 1 wherein the step of mapping structured information to a uniform representation, includes sub-steps of:
   i) if the information is structured as a hierarchy;
      A) representing nodes of the hierarchy as entities; and
      B) generating parent/child relations between the entities, consistent with the hierarchy.

6. The method of claim 1 wherein the step of mapping structured information to a uniform representation, includes sub-steps of:
   i) if the information is structured as a table;
      A) representing the table as an entity;
      B) representing column names of the table as entities;
      C) representing row numbers of the table as entities;
      D) generating contains relations between the entity representing the table and each of the entities representing the column names and row numbers;
      E) generating entities corresponding to information contained in the table; and
      F) generating contains relations between the entities representing the column names and row numbers and entities corresponding to the information contained in the table, consistent with the table.

7. The method of claim 1 wherein the step of mapping structured information to a uniform representation, includes sub-steps of:
   i) if the information is structured as an entity relationship diagram;
      A) representing each of any attributes as an entity; and
      B) generating has a relations between each of the entities representing attributes and the entities to which the attributes belonged, consistent with the entity relationship diagram.

8. The method of claim 1 wherein the step of mapping linear information to a uniform representation, includes sub-steps of:
   i) parsing the linear information into pieces;
   ii) representing each of the pieces with an entity; and
   iii) generating a proceeds/follows relation between each of the entities representing adjacent parsed pieces.

9. The method of claim 8 wherein the pieces are selected from a group consisting of (a) words, (b) sentences, (c) paragraphs, (d) sections, (e) headings, (f) phrases, and (g) alphanumeric strings.

10. The method of claim 1 wherein the step of mapping linear information to a uniform representation, includes sub-steps of:
    i) representing a name of the sequence with an entity;
    ii) representing the information of the sequence with an entity; and
    iii) generating a data relation between the entity representing the name of the sequence and the entity representing the information of the sequence.

11. The method of claim 1 wherein the step of mapping active information to a uniform representation, includes sub-steps of:
    i) representing a name of the active information as an entity;
    ii) representing properties, if any, of the active information as entities;
    iii) generating an of relation between the entity representing the name of the active information and each of the entities, if any, representing the properties of the active information;
    iv) representing methods, if any, of the active information as entities; and
    v) generating a to relation between the entity representing the name of the active information and each of the entities, if any, representing the methods of the active information.

12. The method of claim 11 wherein if a method gets a property, then further:
    vi) generating a get relation between an entity representing the method and an entity representing the property.

13. The method of claim 11 wherein if a method sets a property, then further:
    vi) generating a set relation between an entity representing the method and an entity representing the property.

14. The method of claim 11 wherein, if a method of the active information has parameters, then further:
    vi) generating entities representing each of the parameters;
    vii) generating a parameter list entity;
    viii) generating a parameters of relation between the entity representing the method and the parameter list entity; and
    ix) generating a contains relation between the parameter list entity and each of the entities representing the parameters.

15. The method of claim 1 wherein the uniform representation may include logical inconsistencies.

16. The method of claim 1 wherein the uniform representation may include ambiguities.

17. A machine readable medium having machine executable instructions which, when executed by the machine perform steps for representing structured, linear, and active information in a uniform way, the steps comprising:
    a) mapping structured information to a uniform representation;
    b) mapping linear information to the uniform representation; and
    c) mapping active information to the uniform representation;
    wherein the uniform representation is a collection of elements,
    wherein each of the elements is one of an entity and a relation; and
    wherein a relation connects two ordered elements; and
    wherein the instructions for mapping structured information to a uniform representation, includes sub-steps of:
    i) if the information is structured as a table;
       A) representing the table as an entity;
       B) representing column names of the table as an entity;
       C) representing a dimension of the table as an entity;
       D) representing information contained in the table as an entity;
       E) generating a schema relation between the entity representing the table and the entity representing the column name;
       F) generating a data relation between the entity representing the table and the entity representing information contained in the table; and
       G) generating a dimension relation between the entity representing the table and the entity representing a dimension of the table.

18. The machine readable medium of claim 17 wherein a container entity contains other elements.

19. The machine readable medium of claim 17 wherein the uniform representation is expressed as a list of predicates.

20. The machine readable medium of claim 17 wherein the uniform representation is expressed as a list of predicates.

21. The machine readable medium of claim 17 wherein the instructions for mapping structured information to a uniform representation, includes sub-steps of:
   i) if the information is structured as a hierarchy;
      A) representing nodes of the hierarchy as entities; and
      B) generating parent/child relations between the entities, consistent with the hierarchy.

22. The machine readable medium of claim 17 wherein the instructions for mapping structured information to a uniform representation, includes sub-steps of:
   i) if the information is structured as a table;
      A) representing the table as an entity;
      B) representing column names of the table as entities;
      C) representing row numbers of the table as entities;
      D) generating contains relations between the entity representing the table and each of the entities representing the column names and row numbers;
      E) generating entities corresponding to information contained in the table; and
      F) generating contains relations between the entities representing the column names and row numbers and entities corresponding to the information contained in the table, consistent with the table.

23. The machine readable medium of claim 17 wherein the instructions for mapping structured information to a uniform representation, includes sub-steps of:
   i) if the information is structured as an entity relationship diagram;
      A) representing each of any attributes as an entity; and
      B) generating has a relations between each of the entities representing attributes and the entities to which the attributes belonged, consistent with the entity relationship diagram.

24. The machine readable medium of claim 17 wherein the instructions for mapping linear information to a uniform representation, includes sub-steps of:
   i) parsing the linear information into pieces;
   ii) representing each of the pieces with an entity; and
   iii) generating a proceeds/follows relation between each of the entities representing adjacent parsed pieces.

25. The machine readable medium of claim 24 wherein the pieces are selected from a group consisting of (a) words, (b) sentences, (c) paragraphs, (d) sections, (e) headings, (f) phrases, and (g) alphanumeric strings.

26. The machine readable medium of claim 17 wherein the instructions for mapping linear information to a uniform representation, includes sub-steps of:
   i) representing a name of the sequence with an entity;
   ii) representing the information of the sequence with an entity; and
   iii) generating a data relation between the entity representing the name of the sequence and the entity representing the information of the sequence.

27. The machine readable medium of claim 17 wherein the instructions for mapping active information to a uniform representation, includes sub-steps of:
   i) representing a name of the active information as an entity;
   ii) representing properties, if any, of the active information as entities;
   iii) generating an of relation between the entity representing the name of the active information and each of the entities, if any, representing the properties of the active information;
   iv) representing methods, if any, of the active information as entities; and
   v) generating a to relation between the entity representing the name of the active information and each of the entities, if any, representing the methods of the active information.

28. The machine readable medium of claim 27 wherein if a method gets a property, then further:
   vi) generating a get relation between an entity representing the method and an entity representing the property.

29. The machine readable medium of claim 27 wherein if a method sets a property, then further:
   vi) generating a set relation between an entity representing the method and an entity representing the property.

30. The machine readable medium of claim 27 wherein, if a method of the active information has parameters, then further:
   vi) generating entities representing each of the parameters;
   vii) generating a parameter list entity;
   viii) generating a parameters of relation between the entity representing the method and the parameter list entity; and
   ix) generating a contains relation between the parameter list entity and each of the entities representing the parameters.

31. The machine readable medium of claim 17 wherein the uniform representation may include logical inconsistencies.

32. The machine readable medium of claim 17 wherein the uniform representation may include ambiguities.

* * * * *